US012099446B2

(12) United States Patent
Howard

(10) Patent No.: US 12,099,446 B2
(45) Date of Patent: Sep. 24, 2024

(54) METHOD AND SYSTEM FOR SOFTWARE MULTICORE OPTIMIZATION

(71) Applicant: C Squared IP Holdings LLC, Scottsdale, AZ (US)

(72) Inventor: Kevin David Howard, Mesa, AZ (US)

(73) Assignee: C SQUARED IP HOLDINGS LLC, Scottsdale, AZ (US)

( * ) Notice: Subject to any disclaimer, the term of this patent is extended or adjusted under 35 U.S.C. 154(b) by 0 days.

(21) Appl. No.: 18/131,348

(22) Filed: Apr. 5, 2023

(65) Prior Publication Data

US 2023/0325319 A1 Oct. 12, 2023

Related U.S. Application Data

(60) Provisional application No. 63/328,115, filed on Apr. 6, 2022.

(51) Int. Cl.
*G06F 12/08* (2016.01)
*G06F 12/0842* (2016.01)

(52) U.S. Cl.
CPC .. *G06F 12/0842* (2013.01); *G06F 2212/1021* (2013.01)

(58) Field of Classification Search
None
See application file for complete search history.

(56) References Cited

U.S. PATENT DOCUMENTS

| 6,421,665 | B1* | 7/2002 | Brye | G06F 16/2462 |
| | | | | 707/999.102 |
| 2010/0241828 | A1* | 9/2010 | Yu | H04L 12/44 |
| | | | | 712/30 |
| 2013/0332904 | A1* | 12/2013 | Howard | G06F 8/73 |
| | | | | 717/123 |
| 2014/0125683 | A1* | 5/2014 | Howard | G06F 9/54 |
| | | | | 345/505 |
| 2019/0220331 | A1* | 7/2019 | Duggal | G06F 9/542 |
| 2022/0043806 | A1* | 2/2022 | Crabtree | G06F 16/252 |

\* cited by examiner

*Primary Examiner* — Kevin Verbrugge
(74) *Attorney, Agent, or Firm* — Skaar Ulbrich Macari, P.A.

(57) ABSTRACT

Methods and systems for existing software applications to automatically take advantage of multicore computer systems outside of the conventional simultaneous processing of multiple applications and without performance problems from cache misses and mismatched task processing times are presented. Unlike other multicore optimization techniques, the present invention uses techniques that are applied to design graphs and work for scaled and standard speedup-based parallel processing. The methods and systems optimize software designs that are attached to code for maximum performance on multicore computer hardware by analyzing and modifying loop structures to produce a general parallel solution, not just simple loop unrolling.

20 Claims, 51 Drawing Sheets

Example Target Values

| Scaled Attribute Values | f=log,a | f=log₂a | f=a | f=a^1.5 | f=a² | ... |
|---|---|---|---|---|---|---|
| 1 | 0.000 | 0.000 | 1.000 | 1.000 | 1 | ... |
| 2 | 0.693 | 1.000 | 2.000 | 2.828 | 4 | ... |
| 3 | 1.099 | 1.585 | 3.000 | 5.196 | 9 | ... |
| ... | ... | ... | ... | ... | ... | ... |
| n | log_e n | log₂ n | n | n^1.5 | n² | ... |

Function figures as Column Header

| Attribute Values | | |
|---|---|---|
| 1 | | $|t_{S_1} - t_{T_1}|$ |
| 2 | | $|t_{S_2} - t_{T_2}|$ |
| ... | | ... |
| n | | $|t_{S_n} - t_{T_n}|$ |

L3 = $A_{\alpha \times \beta}$

| | Column$_0$ | Column$_1$ | Column$_2$ | Cell$_3$ | Cell$_4$ | Cell$_5$ | Cell$_6$ | Cell$_7$ |
|---|---|---|---|---|---|---|---|---|
| Row$_0$ | 0 | 1 | 2 | 3 | 4 | 5 | 6 | 7 |
| Row$_1$ | 8 | 9 | 10 | 11 | 12 | 13 | 14 | 15 |
| Row$_2$ | 16 | 17 | 18 | 19 | 20 | 21 | 22 | 23 |

L2 = $A_{\alpha \times \beta}$

| | Column$_0$ | Column$_1$ | Column$_2$ | Cell$_3$ |
|---|---|---|---|---|
| Row$_0$ | 0 | 1 | 2 | 3 |
| Row$_1$ | 8 | 9 | 10 | 11 |
| Row$_2$ | 16 | 17 | 18 | 19 |

| | Column$_4$ | Column$_5$ | Column$_6$ | Column$_7$ |
|---|---|---|---|---|
| Row$_0$ | 4 | 5 | 6 | 7 |
| Row$_1$ | 12 | 13 | 14 | 15 |
| Row$_2$ | 20 | 21 | 22 | 23 |

Core$_0$

Core$_1$

FIG. 28

| | Column₀ | Column₁ | Column₂ | Cell₃ | Cell₄ | Cell₅ | Cell₆ | Cell₇ |
|---|---|---|---|---|---|---|---|---|
| L3 = ₐ×ᵦA | | | | | | | | |
| Row₀ | 0 | 1 | 2 | 3 | 4 | 5 | 6 | 7 |
| Row₁ | 8 | 9 | 10 | 11 | 12 | 13 | 14 | 15 |
| Row₂ | 16 | 17 | 18 | 19 | 20 | 21 | 22 | 23 |

⇒

| | Column₀ | Column₁ | Column₂ | Cell₃ |
|---|---|---|---|---|
| L2 = ₐ×ᵦA | | | | |
| Core₀ | | | | |
| Row₀ | 0 | 1 | 2 | 3 |
| Row₁ | 8 | 9 | 10 | 11 |
| Row₂ | 16 | 17 | 18 | 19 |
| Core₁ | | | | |
| | Column₄ | Column₅ | Column₆ | Column₇ |
| Row₀ | 4 | 5 | 6 | 7 |
| Row₁ | 12 | 13 | 14 | 15 |
| Row₂ | 20 | 21 | 22 | 23 |

METHOD AND SYSTEM FOR SOFTWARE MULTICORE OPTIMIZATION

CROSS-REFERENCE TO RELATED APPLICATIONS

The present application claims priority to and the benefit of U.S. Provisional Patent Application Ser. No. 63/328,115, filed Apr. 6, 2022, which is fully incorporated herein by reference.

TECHNICAL FIELD

This disclosure relates generally to software systems and methods and, more particularly, to software systems and methods applied to design graphs and work for scaled and standard speedup-based parallel processing.

BACKGROUND

Since the 1998 invention of multicore processors by Kunle Olukotun of Stanford, they have been used extensively by the industry. Multicore processors have since come to dominate the microprocessor industry and are typically used for the simultaneous processing of multiple applications.

Memory for a computer system is organized into levels. Level 1 or L1 memory usually refers to memory that shares space on the microprocessor chip itself and is usually called register memory. Level 2 or L2 memory usually indicates the fastest off-chip memory and is typically called cache memory. Level 3 or L3 memory usually refers to standard speed memory and is typically called random access memory (RAM). Level 4 or L4 memory usually refers to secondary memory such as hard drives, solid state drives, and flash memory. L2 memory acts as a performance balancer between L1 memory and the much slower L3 memory, using a technique called pre-fetching. Pre-fetching anticipates which L3 memory cells are going to be required and moves the data from those cells to L2 memory prior to the microprocessor needing the data. As long as the data resides in L2 memory, the performance of the microprocessor is defined by the L2 memory. If the data is not yet in L2 memory, then L3 memory must be accessed (called a cache miss), greatly slowing the overall microprocessor performance.

Since their creation, multicore processors have used cache and their associated cache pointers to separate the data processed by each core. This lends itself to the possibility of using multicore systems for parallel processing, optimizing applications for performance. Although there are special computer languages like Spatial that can be used to create new applications that could take advantage of multicore availability, most code created for existing applications cannot directly take advantage of the parallel opportunities afforded by multicore systems.

Traditionally, task-level parallelization and loop-unrolling techniques, because of their relative simplicity, have been used to convert source codes into parallel codes. Unfortunately, it is only easy to perform loop-unrolling if there is no connection between the processing of each of the loop iterations. With both techniques, it is difficult to determine performance gains across the full set of input variable entries. Part of the problem is understanding when cache misses may occur. Another challenge is the ability to match the performance of a core processing one task with the performance of another simultaneous task executing on another core.

SUMMARY OF THE INVENTION

The present invention shows that neither Amdahl's nor Gustafson-Barsis's laws predict the processing time for a particular input dataset, nor do such laws offer direct help in the parallelization process. Unlike the aforementioned laws, maximum parallel performance is shown herein not to be, at best, linear but, instead, to be a function of the scaled version of the time complexity function. This gives the theoretical framework for sublinear, linear, and super-linear maximum performance gains. This framework allows for the calculation of the true effect of changing either input variable attribute values or the number of processing cores. In addition, this invention shows that the maximum parallel performance, that is, parallel optimization for multiple cores, is not predicted by either Amdahl's or Gustafson-Barsis's laws, nor is it a function of the maximum Amdahl speedup. Instead, maximum parallel performance occurs when speedup equals one and the number of cores used is greater than one. Unlike other multicore optimization techniques, the present invention uses techniques that are applied to design graphs and work for scaled and standard speedup-based parallel processing.

Methods and systems are provided for existing software applications to automatically take advantage of multicore computer systems outside of the conventional simultaneous processing of multiple applications, and without performance problems from cache misses and mismatched task processing times. The present invention offers new financial opportunities to users, creators, and vendors of existing software applications. The present invention optimizes designs that are attached to code for maximum performance on multicore computer hardware by analyzing and modifying loop structures to produce a general parallel solution, not just simple loop unrolling. Further, time prediction polynomials are created for various or specific design graphs so a given dataset's processing time and performance can be known prior to the execution of any underlying code attached to the design.

BRIEF DESCRIPTION OF THE DRAWINGS

FIG. 11A is an example of a speedup continuum table, in accordance with embodiments of the present invention.

FIG. 11D is an example of a target values table, in accordance with embodiments of the present invention.

FIG. 11E is an example of the creation of a new source values table from found target values, in accordance with embodiments of the present invention.

FIG. 23 shows an example of a two-dimensional matrix with row or column major and contiguous or discontiguous memory usage, in accordance with embodiments of the present invention.

FIG. 24 is an example of grouped contiguous rows, in accordance with embodiments of the present invention.

FIG. 28 is a diagram showing an example of multicore- and cache pointer-assisted two-dimensional left data exchange, in accordance with embodiments of the present invention.

FIG. 32 is a diagram showing an example of multicore- and cache pointer-assisted two-dimensional right data exchange, in accordance with embodiments of the present invention.

DETAILED DESCRIPTION

Figure 1:
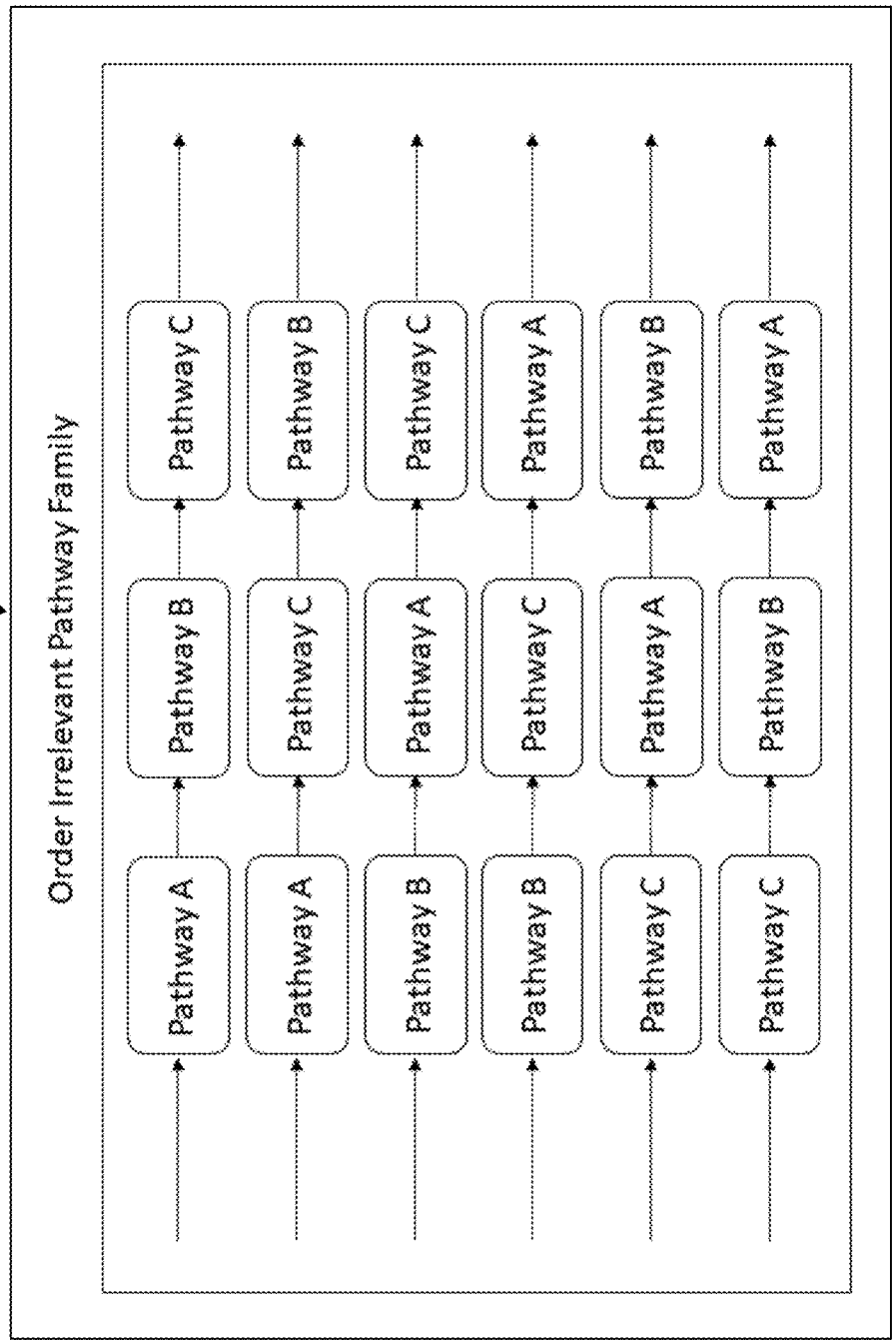
FIG. 1 is a diagram showing an order irrelevant pathway family, in accordance with embodiments of the present invention.

The present invention demonstrates that maximum parallel performance is not linear but is a function of an extended version of the time complexity function. This gives the theoretical framework for sublinear, linear, and superlinear maximum performance. This framework allows for the calculation of the true effect of either changing input variable attribute values or the number of cores. In addition, this invention shows that the maximum parallel performance, that is, parallel optimization for multiple cores, is not predicted by either Amdahl's or Gustafson-Barsis's laws but instead occurs when speedup equals one and the number of cores used is greater than one. Unlike other multicore optimization techniques, the present invention uses techniques that are applied to design graphs and work for scaled and standard speedup-based parallel processing.

Creating a method for existing software applications to automatically take advantage of multicore computer systems outside of the aforementioned simultaneous processing of multiple applications, and without performance problems from cache misses and mismatched task processing times, offers new financial opportunities to users, creators, and vendors of existing software applications. The present invention optimizes software designs that are attached to code for maximum performance on multicore computer hardware by analyzing and modifying loop structures to produce a general parallel solution, not just simple loop unrolling. Further, time prediction polynomials are created so a given dataset's processing time and performance can be known prior to its execution.

Various devices or computing systems can be included and adapted to process and carry out the aspects, computations, and algorithmic processing of the software systems and methods of the present invention. Computing systems and devices of the present invention may include a processor, which may include one or more microprocessors and/or one or more circuits, such as an application specific integrated circuit (ASIC), field-programmable gate arrays (FPGAs), etc. Further, the computing devices and systems can include a network interface. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the computing devices include a microprocessor, computer readable program code may be stored in a computer readable medium or memory, such as, but not limited to drive media (e.g., a hard disk or SSD), optical media (e.g., an OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, video, or play audio to a user through speaker output.

Server processing systems for use or connected with the systems and methods of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to drive media (e.g., a hard disk or SSD), optical media (e.g., a DVD), memory devices, etc.

Software Converted to MPT HFD Parallel Pathways and Code Blocks

As demonstrated in U.S. patent application Ser. No. 18/115,749, filed Feb. 28, 2023, and titled "SOFTWARE METHODS AND SYSTEMS FOR AUTOMATIC INNOVATION DETERMINATION AND USE," which is fully incorporated herein by reference, Massively Parallel Technologies Hierarchical Functional Decomposition (MPT HFD) graphs can be used to decompose existing software into extracted MPT HFD aggregate pathways, MPT HFD function aggregate pathways, or MPT HFD component pathways, shortened herein to aggregate pathways, function aggregate pathways, component pathways, or simply pathways. Aggregate and function aggregate pathways are comprised of component pathways.

FIG. 1 is a diagram 100 showing an order irrelevant pathway family. There are some component pathways, called order irrelevant component pathways, where the order in which they are linked does not matter. A family of aggregate or function aggregate pathways can be automatically formed that are functionally equal by reordering the linked order irrelevant component pathways. The set of permutations for aggregate or function aggregate pathways composed of order irrelevant component pathways is called an order irrelevant pathway family. These order irrelevant pathways are serially linked in time by one following another.

Figure 2:
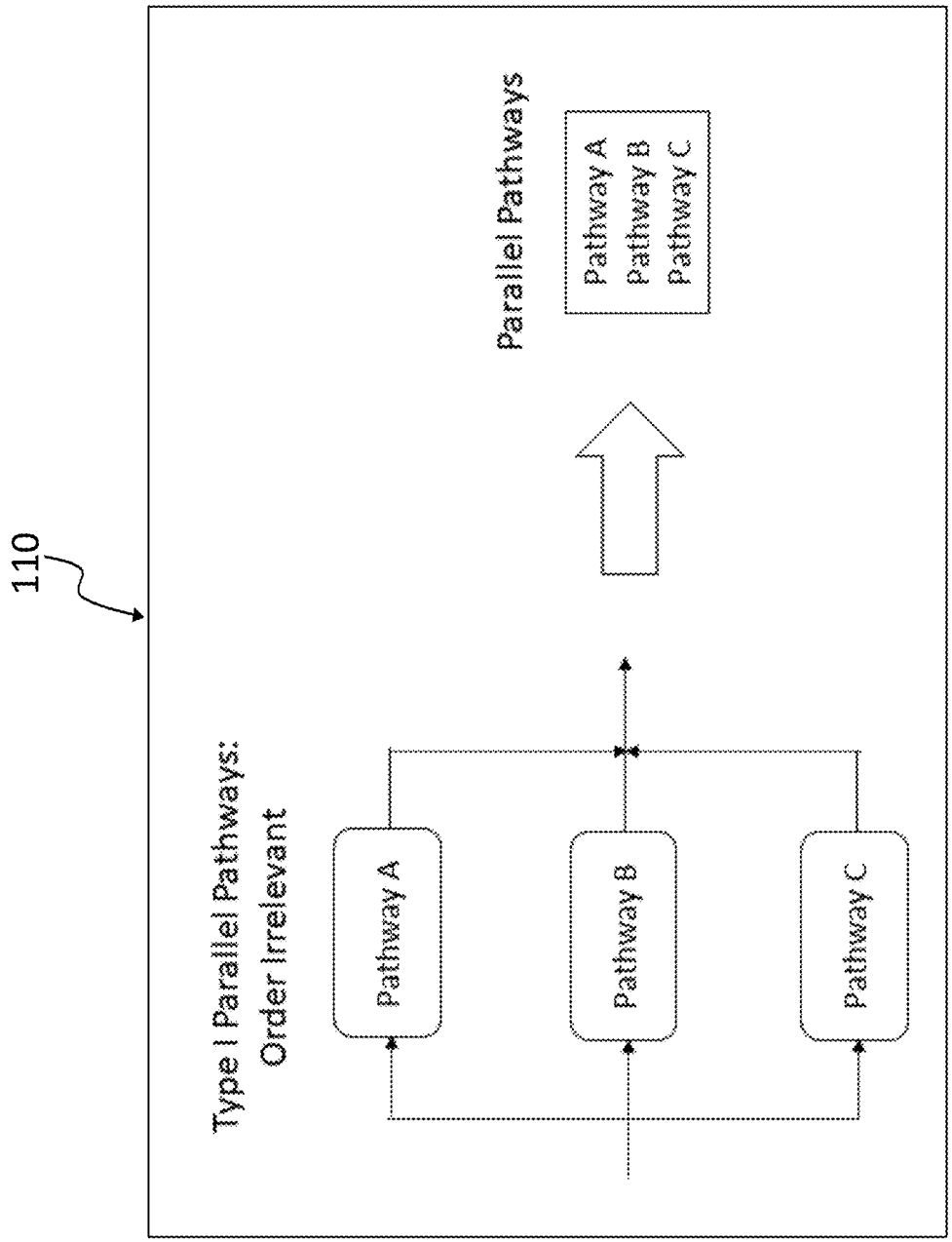
FIG. 2 is a diagram showing parallelism from serially linked order irrelevant pathways, in accordance with embodiments of the present invention.

FIG. 2 is a diagram 110 showing parallelism from serially linked order irrelevant pathways. Order irrelevance requires that the component pathways are independent of one another and, therefore, do not share input or output variables. Not sharing input or output variables means that those component pathways can be processed simultaneously, analogous to task-level parallelism.

Figure 3:
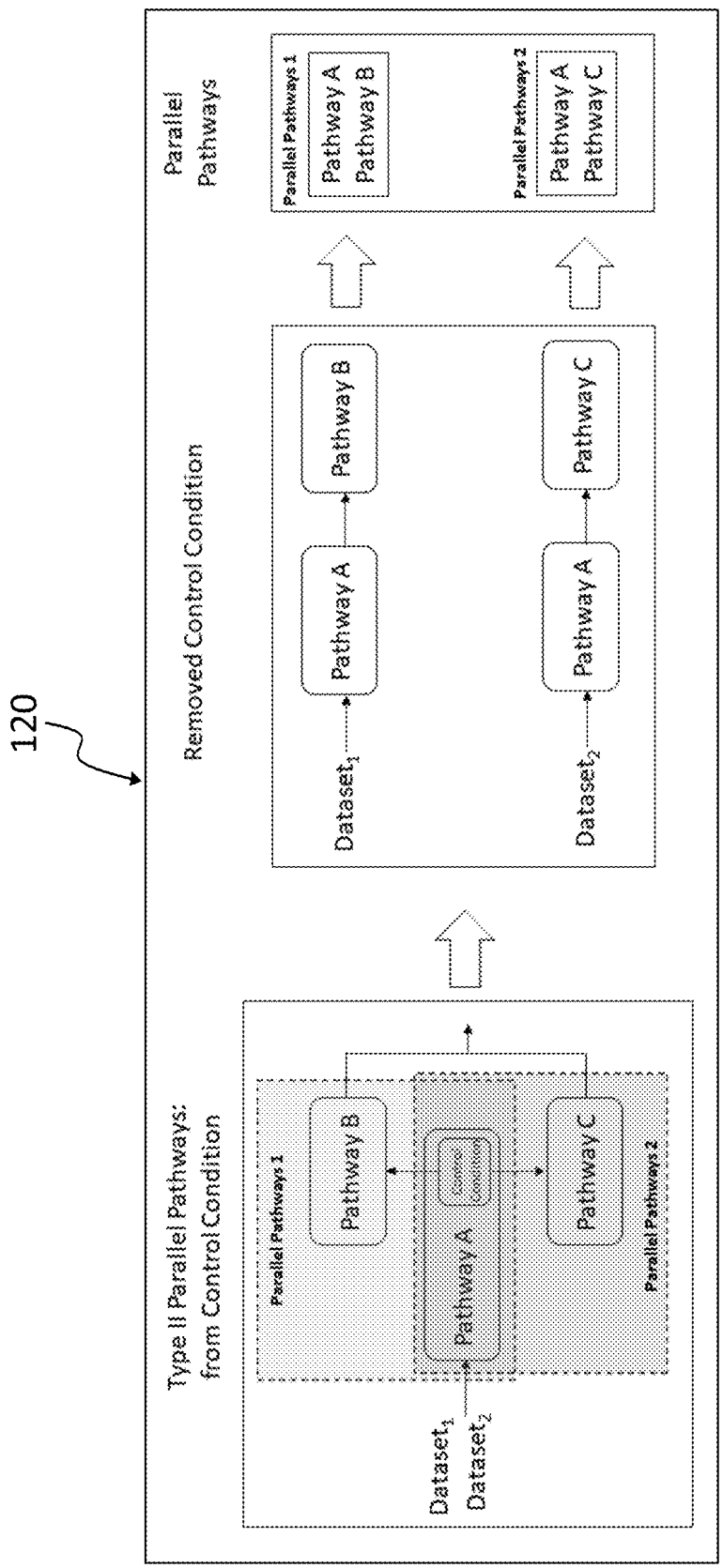
FIG. 3 is a diagram showing parallelism from control condition linkage of variable independent pathways, in accordance with embodiments of the present invention.

FIG. 3 is a diagram 120 showing parallelism from control condition linkage of variable independent pathways. Order irrelevant pathways can also be linked via a control condition connection. The control condition(s) must be removed to produce the same behavior as those connected without any control conditions, that is, to be parallelized. To determine if a control condition-linked aggregate or function aggregate pathway is order irrelevant, all control conditions are removed by using boundary value analysis to determine the range of input variable values required for that pathway. Once the values are defined, the need for control conditions is eliminated as the pathway is fully defined by the input variables. The component pathways within that aggregate pathway are then checked for independence. All directly linked independent pathways can be executed in parallel.

Figure 4:
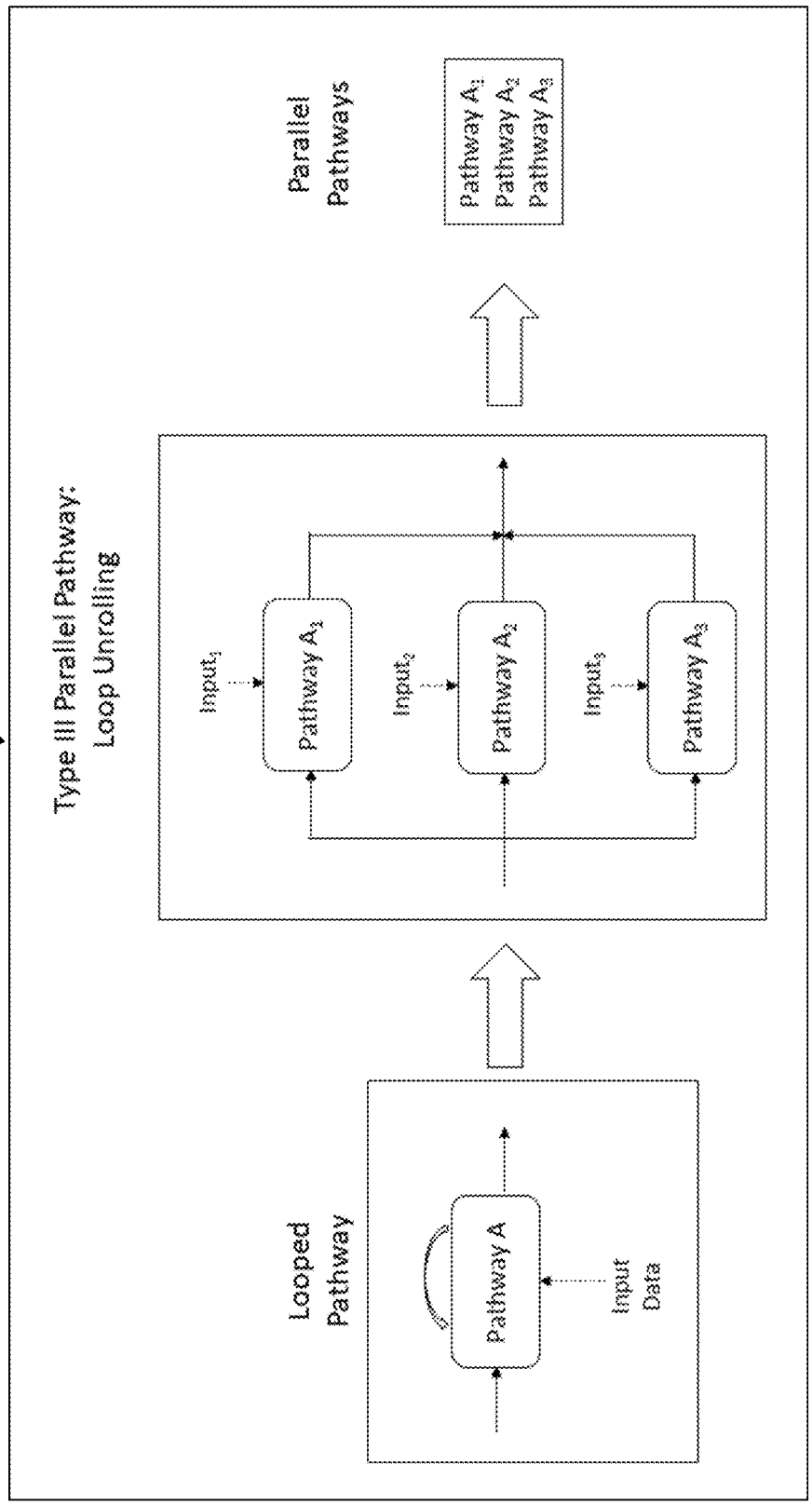
FIG. 4 is a diagram showing parallelism from pathway loop unrolling, in accordance with embodiments of the present invention.

FIG. 4 is a diagram 130 showing parallelism from pathway loop unrolling. Since a loop is a type of control condition with a repeating pathway, if the variables associated with each instance of the repeating pathways are independent, then each pathway instance can be executed simultaneously.

Figure 5:
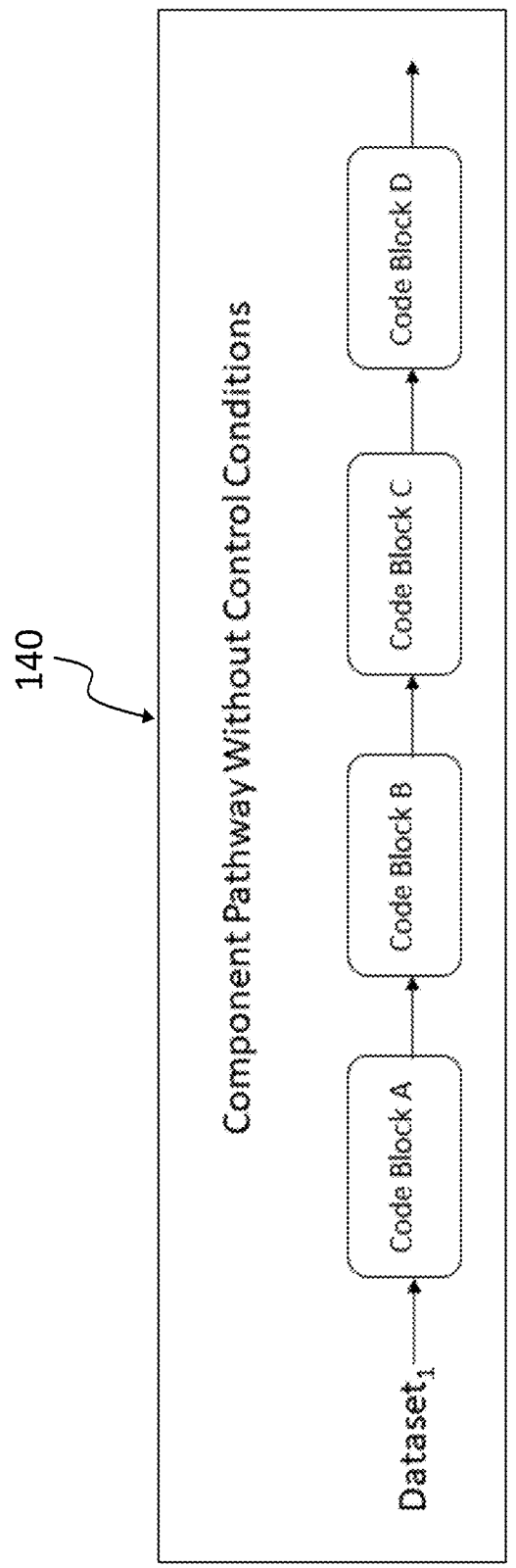
FIG. 5 is a diagram showing an example of a component pathway without control conditions, in accordance with embodiments of the present invention.

FIG. 5 is a diagram 140 showing an example of a component pathway without conditions. The lowest level pathway, called a component pathway, is comprised of code blocks.

Figure 6:
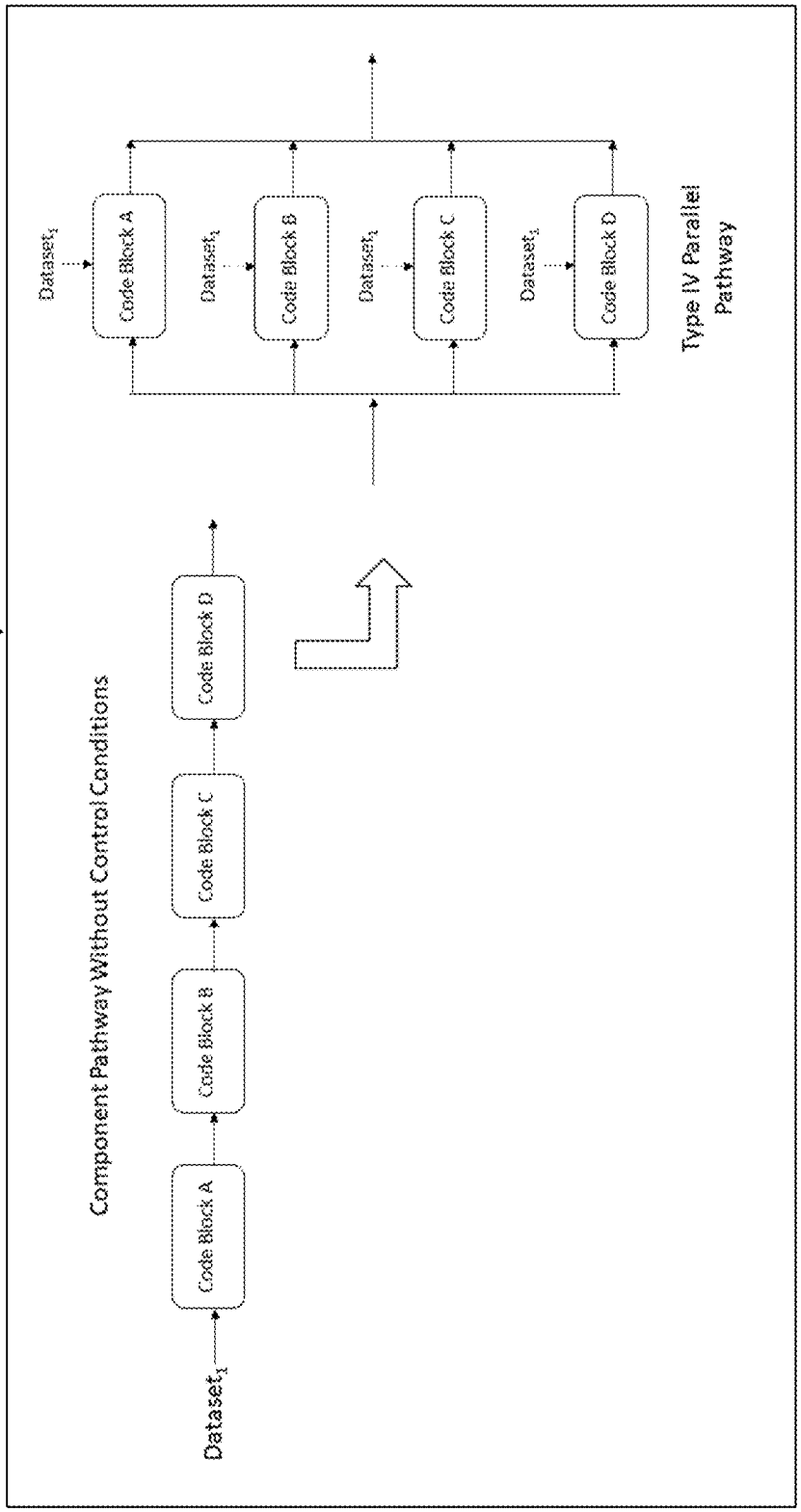
FIG. 6 is a diagram showing an example of linked independent code blocks without control conditions converted to parallel code blocks, in accordance with embodiments of the present invention.

FIG. 6 is a diagram 150 showing an example of serially linked independent code blocks without control conditions converted to parallel code blocks. If there is a set of linked independent components or code blocks in a component pathway, they can be considered parallel code blocks and executed on different cores in parallel, offering the unique capability of multiple levels of parallelization, both task-like and loop unrolling-like parallelization, simultaneously.

Figure 7:
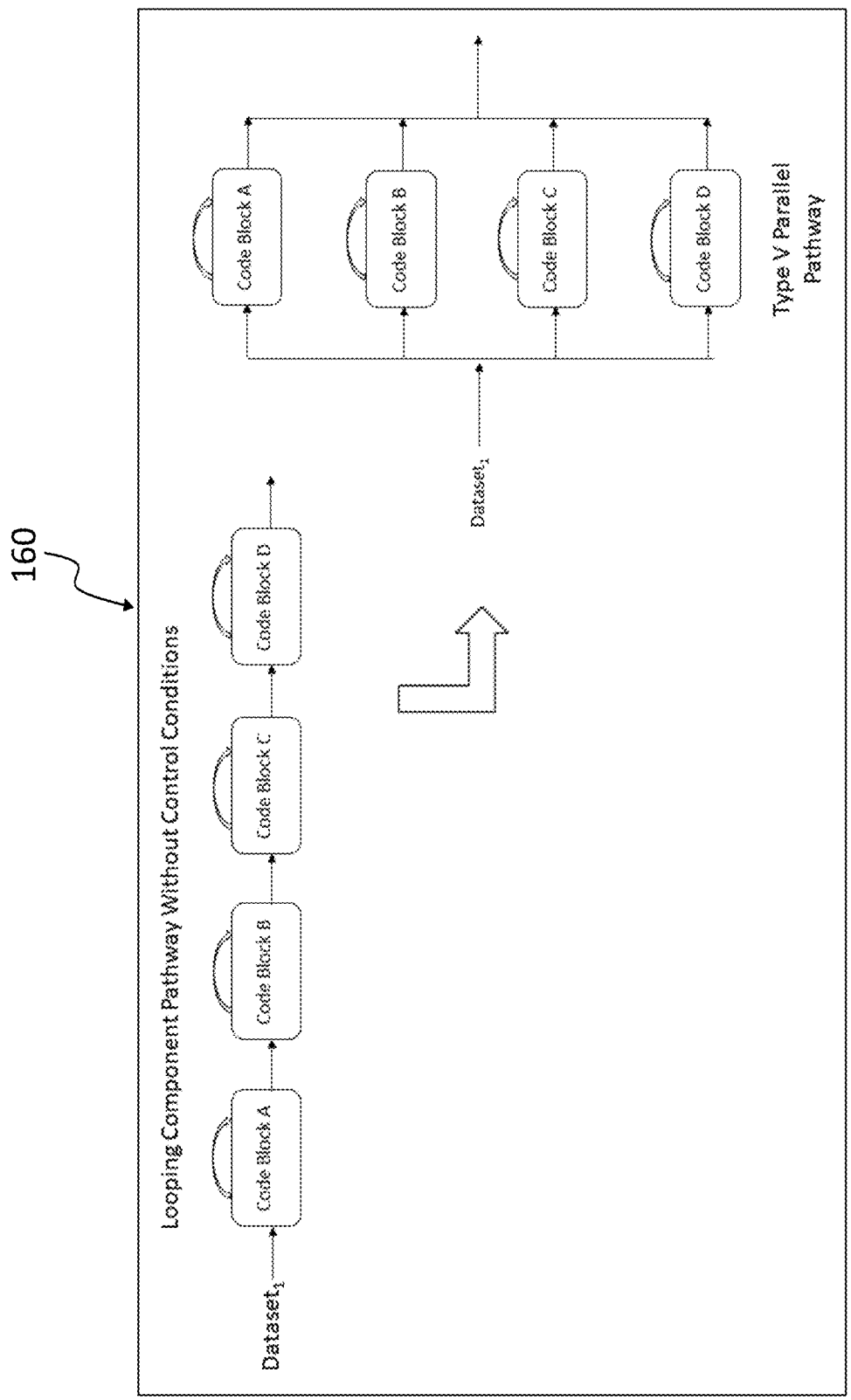
FIG. 7 is a diagram showing the parallelization of multiple looping independent code blocks, in accordance with embodiments of the present invention.

FIG. 7 is a diagram 160 showing the parallelization of multiple looping independent code blocks. In order for a single non-looping code block to be useful in the parallel regime, it would need to process quite a bit of data and have very low parallel overhead. It can be difficult to find multiple connected independent code blocks where each processes enough data such that the parallel effect is noticeable. It is far easier to find multiple independent looping code blocks that can be parallelized.

Figure 8:
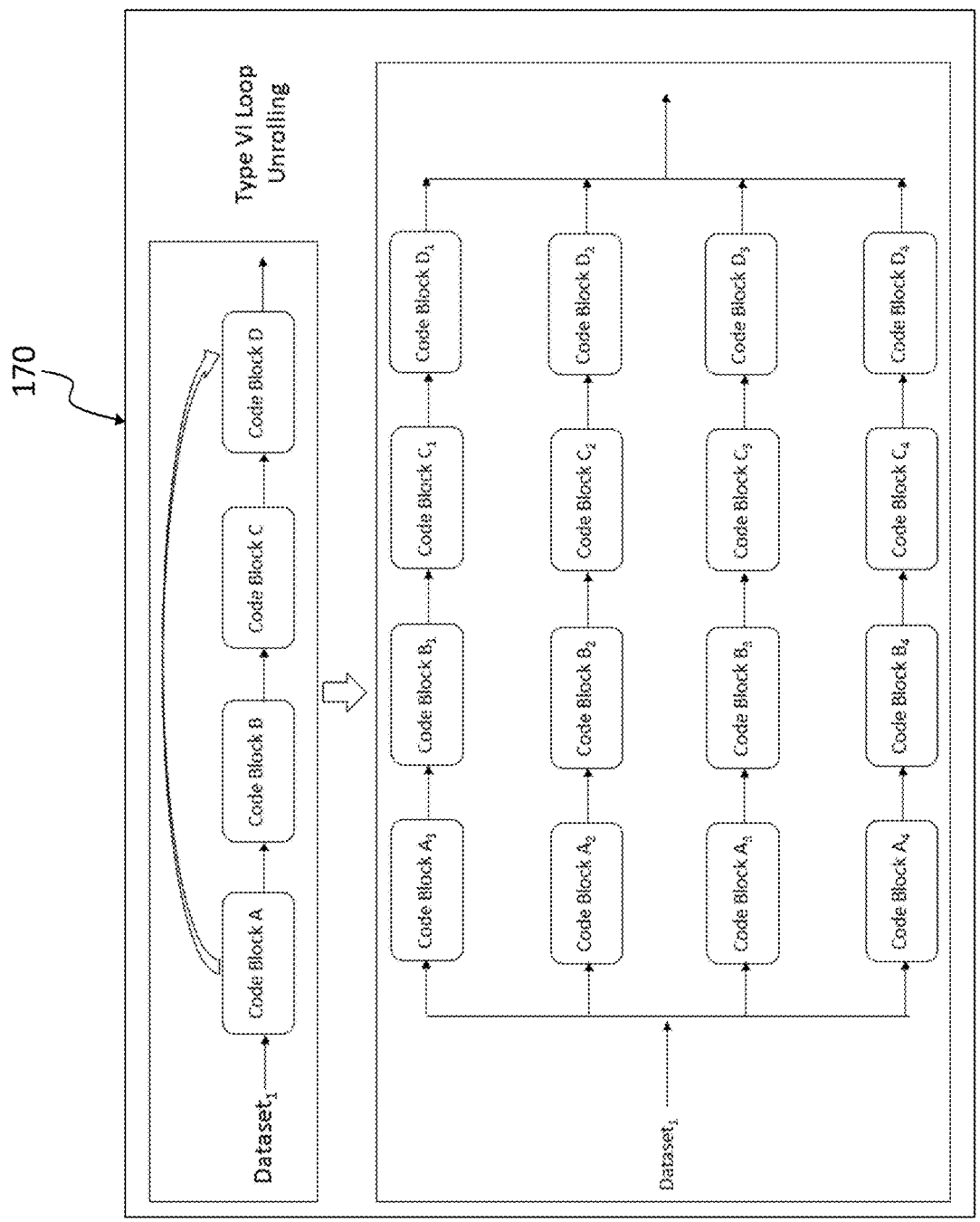
FIG. 8 is a diagram showing the parallelization of a looping list of dependent code blocks, in accordance with embodiments of the present invention.

FIG. 8 is a diagram 170 showing the parallelization of a looping list of dependent code blocks. It is easy to determine if a looped code block, whether independent or dependent, comprises a sufficient amount of work to parallelize by measuring the time it takes for the loop to process its data in one iteration and multiplying by the number of iterations required to process a given dataset. A looped list of linked dependent code blocks can be parallelized by unrolling the associated loop. If the initial dataset size of some looping list of dependent code blocks is too small for parallelism, it may still be useful since a looping list can be viewed as a single large independent code block and used as such.

Maximum Pathway Speedup

Most practitioners use parallel techniques like large-kernel, small-kernel or loop parallelization techniques because they are simple in both concept and relatively easy to implement. The large and small kernel differentiation is because of the false notion that the size of the kernel, that is, its number of source lines of code, changes how well parallel processing works. This is a direct response to Amdahl's law which states that the amount of parallel speedup is a linear function of the number of parallel processing elements used. This response can be stated as "since the maximum response of parallelization is linear, the only variable is the size of the kernel running on each processing element." This kernel-size concept even pervades loop-level parallel processing with the size of the looped kernel defining which loops should be parallelized and which should not.

Amdahl's Law    Equation 1

$$S(n) = \frac{t_1 \text{seconds}}{t_n \text{seconds}} = \frac{1}{(1-p) + \frac{p}{n}}$$

Where: $n$ = Number of processing elements $t_x$ = Time given $x$ processing elements $p$ = Parallel fraction $(1 - p)$ = Serial fraction The maximum Amdahl speedup is defined to occur when the serial fraction is zero, which occurs when the parallel fraction equals one.

Maximum Amdahl Speedup    Equation 2

$$S_{max}(n) = \lim_{p \to 1}\left(\frac{1}{(1-p) + \frac{p}{n}}\right) = \frac{1}{\frac{1}{n}} = n$$

As shown in U.S. Pat. No. 10,496,514, which is fully incorporated herein by reference, maximum speedup does not generally have a linear relationship to the number of processing elements "n" nor is it a direct function of the number of lines of code in the parallel kernels. Instead, it is a function of the dataset size being processed on each processing element or core. That is, if a dataset is evenly distributed across "n" equally performing cores then the processing time becomes a function of the dataset size per core per algorithm, which is the definition of time complexity. If T( ) is the time complexity function and $d_x$ is the dataset size split into "x" equal pieces, then $T(d_x) = t_{d_x}$ is the processing time of a dataset of size $d_x$. Here, $d_1$ is the input dataset size on a single processing element or core, and $d_n$ is the dataset size per core if the dataset is spread evenly across "n" cores. It should be noted that since $d_1/n = d_n$, $n = d_1/d_n$ which is the scaled dataset size per core as well as the maximum number of cores.

Speedup Using Time Complexity     Equation 3

$$S(n) = \frac{t_{d_1}\text{seconds}}{t_{d_n}\text{seconds}} = \frac{t_{d_1} \times \frac{1}{t_{d_n}}}{t_{d_n} \times \frac{1}{t_{d_n}}} = \frac{T\left(\frac{d_1}{d_n}\right)}{T(1)} = T(n) \Leftrightarrow T(1) = 1$$

Rather than being linear at best, this reformulation has been shown to be unbounded and a function of scaled time complexity from the scaled input dataset size. The foundation of parallel processing is therefore not the number of processing elements or the kernel size but instead how processing time changes with the change in dataset size as the dataset is spread across multiple processing elements. Since the key component to parallelization is dataset size per processing element, it can be used to help define the cache and random-access memory sizes and parallel performance.

Dividing an input dataset size by the minimum dataset size used to create the time complexity function for some algorithm gives the maximum number of groups "g" that the dataset can be evenly split into for allocation across multiple cores.

Equation 4

Calculating Number of Dataset Groups $$g = \frac{d_1}{d_{min}}$$

Where: $d_1$ = Current input dataset size on one core, not split $d_{min}$ = Minimum dataset size used in creating time complexity function Dividing "g" by the number of cores desired for processing the dataset gives the dataset size per core. Using the dataset size per core in the time complexity function gives scaled processing time or work per core. Multiplying this scaled time per core by the minimum time computed while generating the time complexity function, train, gives the actual predicted processing time per core.

Dataset Size Time Prediction per Core     Equation 5

$$t_n\text{seconds} = T\left(\frac{g}{n}\right) \times t_{min}\text{seconds}$$

Since $t_{min}$ only represents the minimum processing time detected while generating the time complexity function, it is not necessarily the absolute minimum processing time of the algorithm or pathway. The absolute minimum processing time $t_{amin}$ occurs when the dataset size that affects loop iterations cannot be decreased and still produce a loop iteration. That is, $t_{amin}$ only occurs when the number of loop iterations generated by the input dataset size equals one. Dividing the predicted processing time per core by the minimum processing time $t_{amin}$ gives the number of loop iterations for a single loop.

Calculating Number of Loop Iterations(Single Loop)

$$\text{loop iterations} = L = \frac{t_n\text{seconds}}{t_{amin}\text{seconds}} = \frac{t_n}{t_{amin}} \quad\quad \text{Equation 6}$$

As shown in U.S. Patent Application Publication No. 2020/0210162, which is fully incorporated herein by reference, if parallelism comes from looping structures, then time complexity is not just the change in dataset size giving a change in processing time but also the change in any input variable attribute value that affects the number of loop iterations giving a change in processing time. This expanded the definition of time complexity for loop parallelism from a dataset-size-to-time function to a loop-iteration-attribute-values-to-time function. Since an input variable attribute value that affects the number of loop iterations can replace dataset size in creating the time complexity function, time complexity for loop iterations extended the definition of time complexity and is referred to herein as advanced time complexity T(a).

If all loops in the pathway are set to a single loop iteration and the pathway is executed, the resulting processing time is considered static time.

Equation 7: Single Input Variable Attribute Static Processing Time $$t_s\text{ seconds} = T_s(a)\text{seconds}$$

Where: $T_s(a)$ = Processing time when all loop iterations equal one

Per core predicted variable processing time, given a single input variable attribute "a" that affects the number of loop iterations, the minimum input variable attribute value used to create T(a), and the minimum processing time detected when creating T(a), can be found using the number of attribute groups.

Calculating Number of Attribute Groups $$g = \frac{a_1}{a_{min}} \quad\quad \text{Equation 8}$$

And thus:

Single Input Variable Attribute Processing Time $$t_v\text{seconds} = T_v\left(\frac{g}{n}\right) \times t_{min}\text{seconds} \quad\quad \text{Equation 9}$$

Where: $T_v(g/n)$ =

Time complexity when number of variable time loop iterations is > 1

The total processing time is the static time plus the variable processing time.

Equation 10: Single Input Variable Attribute Processing Time Prediction Per Core, Static and Variable Time $$T(a) = (t_s + t_v)\text{seconds}$$

Automatic $a_{min}$ Input Variable Attribute Determination

In general, as the number of loop iterations increases so does the processing time. That is, time increases monotonically as the input variable attributes that affect loop iterations increase monotonically. The opposite is also true: as the number of loop iterations decreases monotonically, the processing time decreases monotonically. As long as time is decreasing with loop iteration decreases, then attribute value "a" associated with those decreases is valid. This leads to the following rules:

Rule 1—$a_{min}$ Determination: for a list of values for the attribute "a" ordered from largest value to smallest value, with associated time values, the minimum value of "a," $a_{min}$, is the data point adjacent to and to the left of the point where time does not change monotonicity.

Rule 2—$a_{min}$ Determination: for a list of values for the attribute "a" ordered from largest value to smallest value, with associated time values, where all time values change monotonically, the minimum value of "a," $a_{min}$, is the point of the smallest value of "a."

Figure 9:
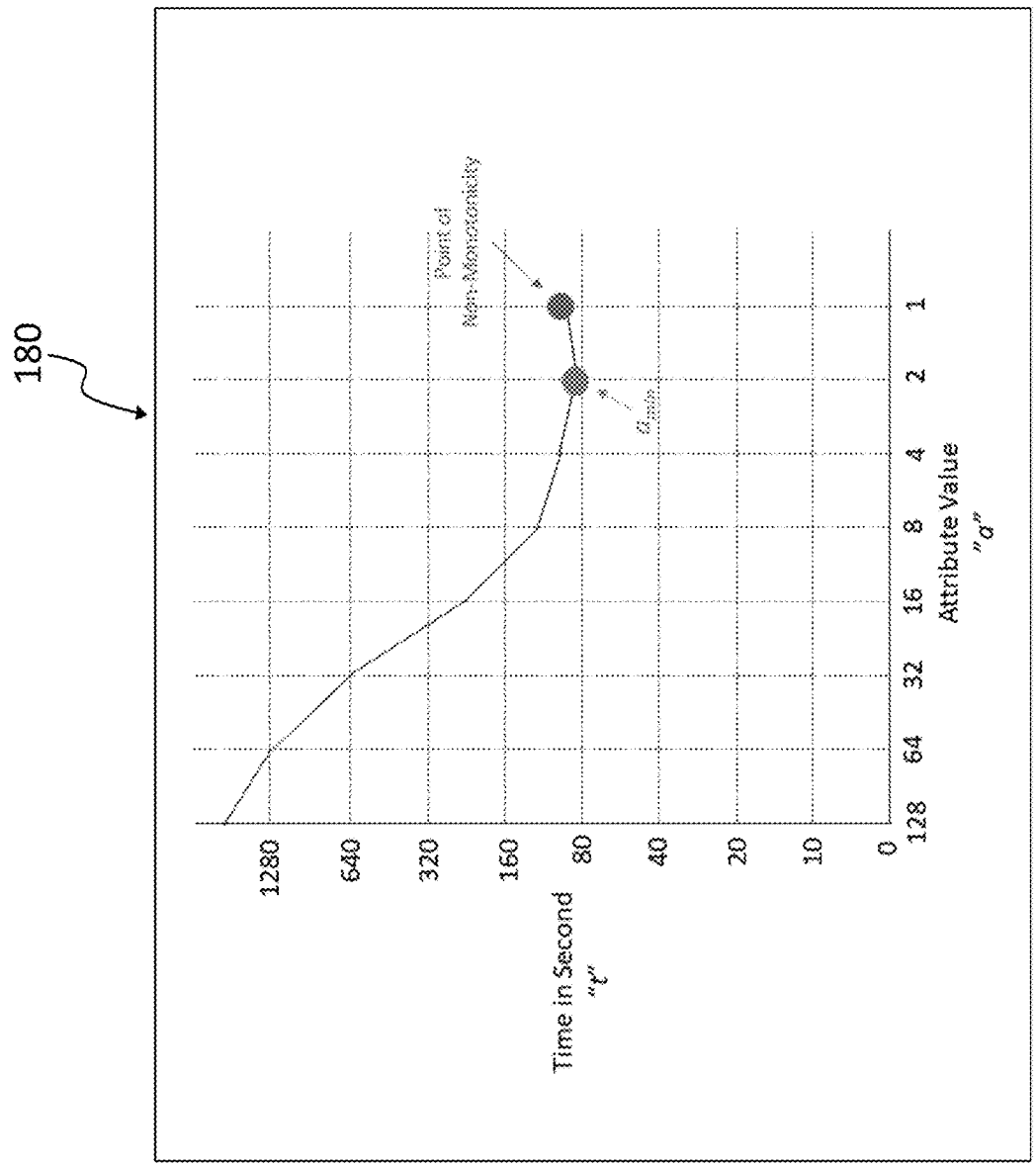
FIG. 9 is a diagram showing an example of Rule 1 $a_{min}$ detection, in accordance with embodiments of the present invention.
Figure 10:
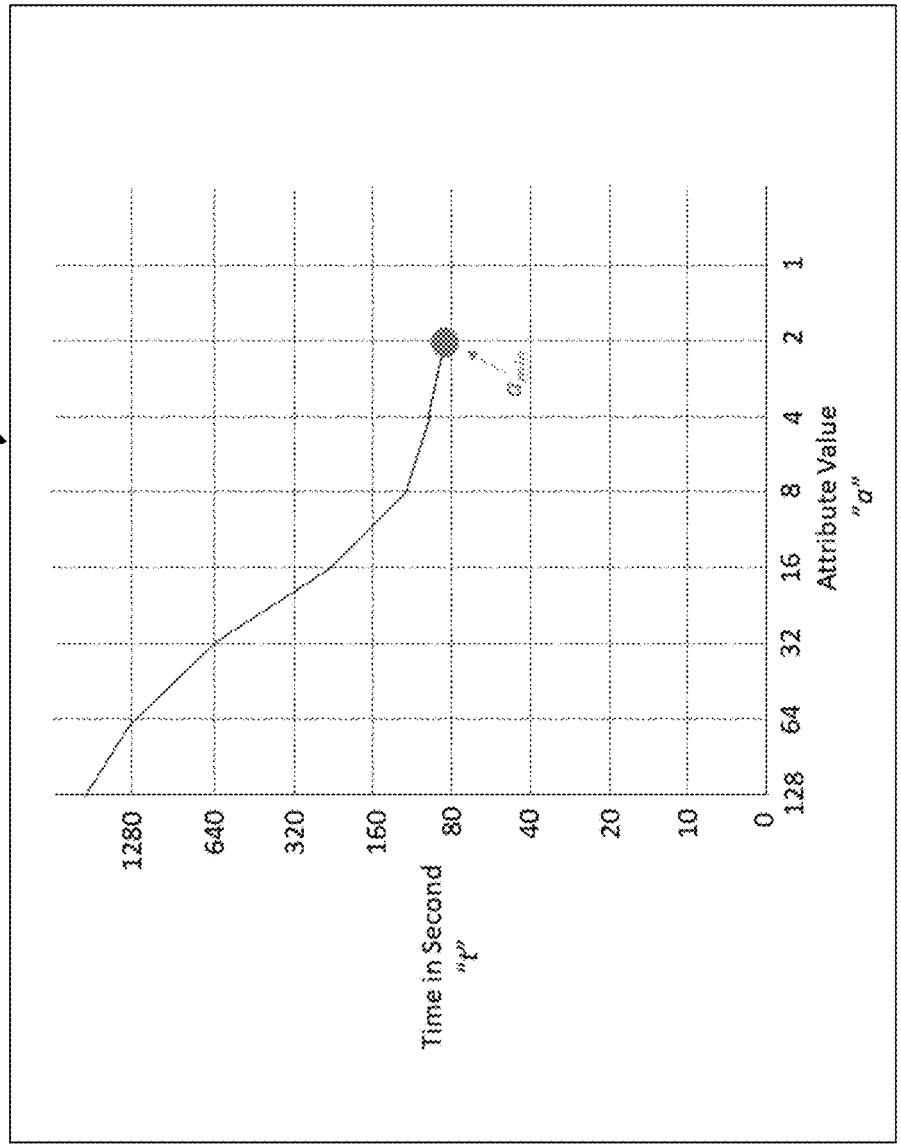
FIG. 10 is a diagram showing an example of Rule 2 $a_{min}$ detection, in accordance with embodiments of the present invention.

FIG. 9 is a diagram 180 showing an example of Rule 1 $a_{min}$ detection. FIG. 10 is a diagram 190 showing an example of Rule 2 $a_{min}$ detection.

Pathway Proportional Scaling

The Gustafson-Barsis law is the observation that the serial portion of a parallel problem does not increase with problem size, meaning that the speedup remains the same regardless of the problem size. By increasing the processor count in tandem with a proportionate problem size, it is possible to scale problems.

Equation 11: Gustafson-Barsis Law $$S(n)=n-\propto(n-1)$$

Where: n=Number of processors
∝=proportionality value

Increased speedup for a particular problem remains unaddressed with this law. If $S(a_1)=T(a_1)$, $T(a_1/a_{min})$ is the maximum scaled speedup, and $T((a_1/a_{min})/n)$ is the scaled speedup with "n" cores, then as long as the group, $g=a_1/a_{min}$, remains proportional to the number of cores "n" then the speedup will remain proportional. This observation corresponds to the Gustafson-Barsis law but in the time complexity regime. If the group size "g" equals the number of cores "n" then the processing time per core is minimized.

Minimum Variable Time Fixed Speedup Calculation $$T_v\left(\frac{g}{n}\right) = 1 \quad \text{Equation 12}$$

Figure 11A:
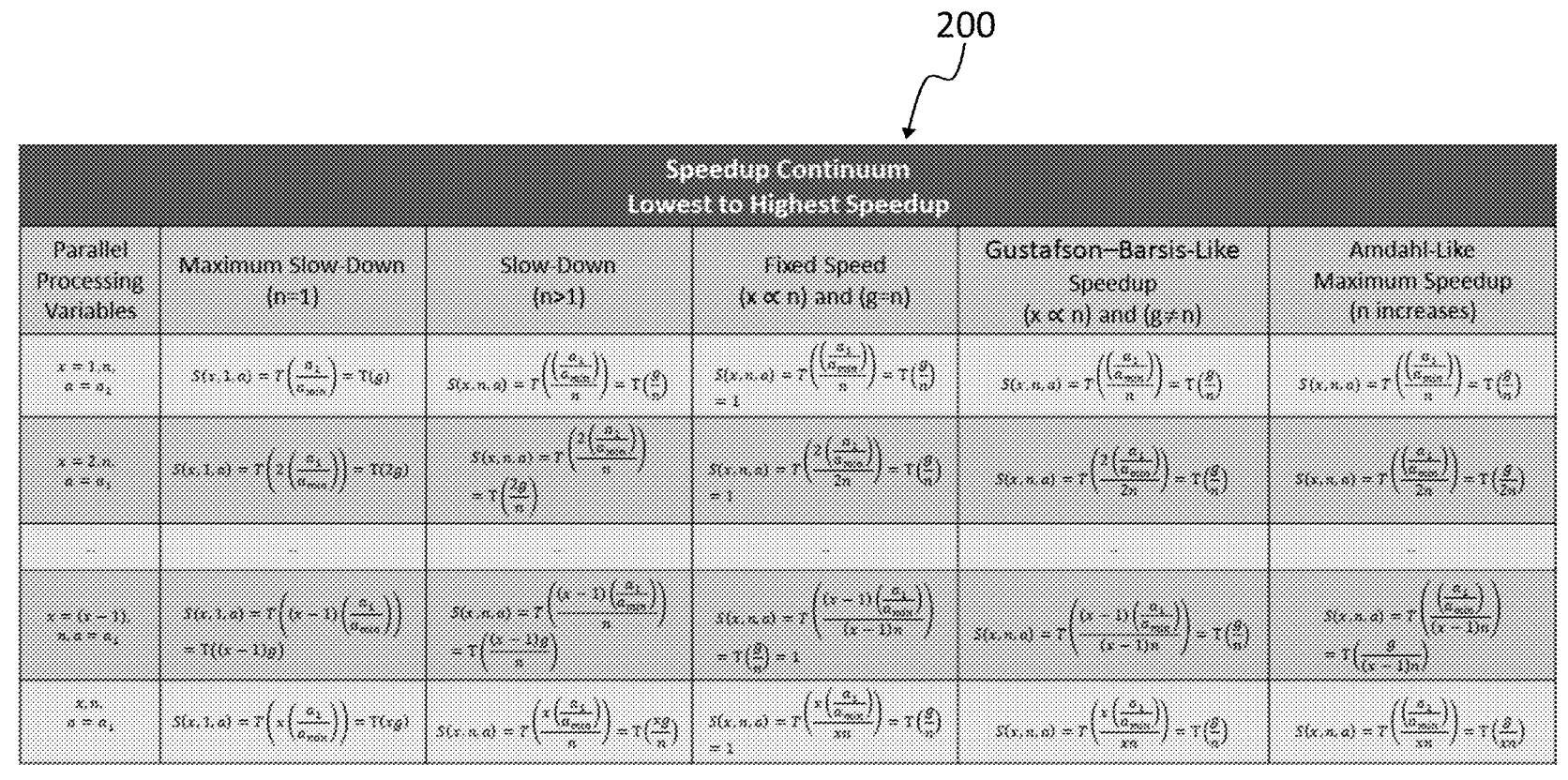

FIG. 11A is an example 200 of the speedup continuum table. It seems counterintuitive, but the highest performance of a parallel system does not occur for either Amdahl-like or Gustafson-Barsis-like speedup; instead, it occurs where speedup equals one and the number of cores is greater than one. Note that processing time (performance) is the speedup multiplied by the minimum processing time detected while creating the time complexity function. Further note that performance is maximized when processing time is minimized. This occurs when the scaled processing time (speedup) equals one, which only occurs at the Fixed Speed column of the Speedup Continuum table. Substituting "$w_1$" for "$a_1$" allows the Speedup Continuum table to be applicable to multiple input variable attributes that affect loop iterations.

Pathway Single Input Variable Attribute T(a) Determination

If there is a single input variable attribute that changes the number of loop iterations in a pathway then varying that input variable attribute will have the effect of changing the processing time of that pathway.

Figure 11B:
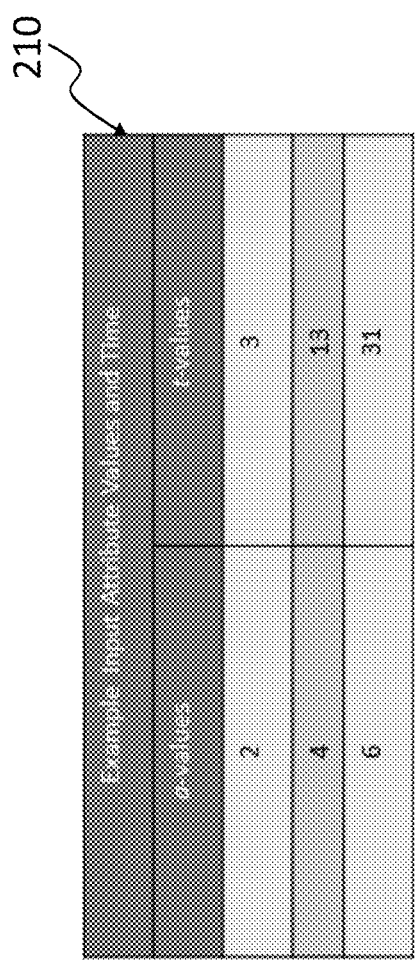
FIG. 11B is an example of a sorted input variable attribute values and time table, in accordance with embodiments of the present invention.

FIG. 11B is an example 210 of a sorted input variable attribute values and time table. It has been shown that it is possible to create this table of monotonic input variable attribute values "a" and their associated resultant monotonic processing time values "t" using a binary search technique coupled with a simple subtraction to generate a time prediction polynomial approximating the time complexity function. It should be noted that the technique shown below assumes that found terms will be positive.

Figure 11C:
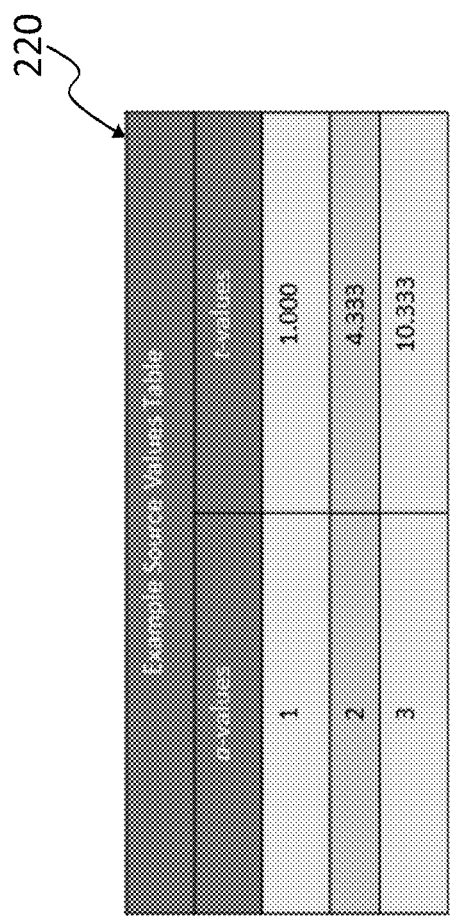
FIG. 11C is an example of a source values table, in accordance with embodiments of the present invention.

FIG. 11C is an example 220 of a source values table comprised of ordered, scaled input variable attribute values and associated scaled processing time values.

FIG. 11D is an example 230 of a target values table. A source values table 220 is compared to a target values table comprised of a set of ordered, scaled input variable attribute values and associated time values generated from some pre-existing functions depicted as the column headers. This comparison generates a new source values table.

FIG. 11E is an example 240 of a new source values table.

The tables in FIG. 11B through 11E are used to generate a time prediction polynomial that approximates the time complexity function for a pathway.

1. A value for an input variable attribute "a" is divided evenly and successively then the pathway's associated executable code is executed by the system to find the associated time values "t," sorted, and stored in the input variable attribute values and time table 210.

2. The input variable attribute values "a" and associated time values "t" are scaled by their respective smallest received values, $a_{min}$ and $t_{min}$, and saved in a source values table 220.

3. The time values t of the source values table 220 are compared to those found in a previously created target values table 230.

4. The functions (polynomial terms) in the headers of the columns of the target values table 230 are in ascending order. Any zero value in the target values table 230 is not compared to its corresponding source values table 220 time value, but not comparing a row does not eliminate the corresponding target values table column function header from consideration for inclusion in the final polynomial. When comparing the source values table time values to corresponding target values table time values, all source values table t values in a column must be one of the following:

a. Greater than or equal to all associated target values table values in a column, b. Less than or equal to all associated target values table values in a column, or c. All source values table t values are the same value.

The function header of any target values table column whose rows do not meet condition a or condition b above is eliminated from consideration for inclusion in the final polynomial, and a comparison is made using a different target column. If condition c is met, the value is considered a constant and added to a Saved Term List $f_{term}$. Condition c means the polynomial is complete, and the process jumps to step 8.

5. When source table time values are compared to the corresponding target table time values, the closest column header that meets condition a or b is saved in the $f_{term}$ list and the process continues with step 6. If no tested columns meet condition a or b then an error condition exists. This comparison is a binary search process.

6. The selected target values table column's values are subtracted from the corresponding source value table time values, and those new values are saved in a temporary source values table. The absolute values of the temporary source table time values are saved as the new source values table 240.

7. If there are any computed zero values in the new source values table, the values of the current column below the zero are shifted to the row above, replacing the zero value. Step 4 is then repeated using the new source values table.

Figure 11F:
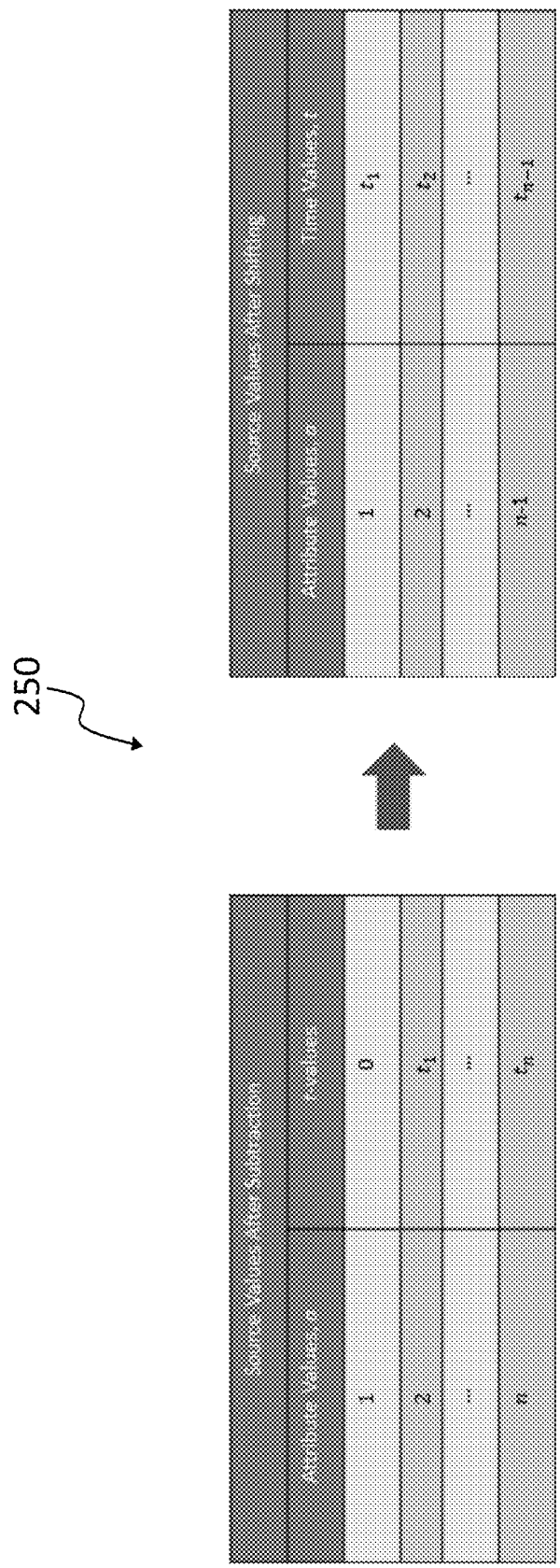
FIG. 11F is an example of shifting a source values table entries, in accordance with embodiments of the present invention.

FIG. 11F is an example 250 of shifting the rows of an example new source values table, eliminating the zero values.

8. All saved terms in the $f_{term_i}$ list are summed, creating the predictive, monotonic polynomial T(a) for input variable attribute a. T(a) generates scaled time t. To unscale this generated time, it is multiplied by the smallest original t value, called $t_{min}$.

Equation 13: Time Complexity as Monotonic Polynomial $$t = T(a) \times t_{min} = t_{min} \times \Sigma_{i=1}^{n} f_{term_i}$$

Coefficients are automatically calculated from this step. Two or more like terms are summed to produce the coefficient of the term.

9. To test the predictive, monotonic polynomial's accuracy, it is executed using the same values used to generate the original source values table. The polynomial-computed values are compared to the actual values, giving the maximum percentage difference as the maximum error, $E_{max}$.

Maximum Time Complexity Polynomial Error Calculation  Equation 14

$$E_{max} = \max\left(\left\{\frac{|t_1 - T(a_1)|}{t_1} \times 100, \frac{|t_2 - T(a_2)|}{t_2} \times 100, \ldots, \frac{|t_i - T(a_n)|}{t_i} \times 100,\right\}\right)$$

If $E_{max}$ is greater than some epsilon then the polynomial should be rejected as unstable. This can occur if multiple pathways are executing using the same system resources or if cache misses are occurring.

The advantage of generating a variable-time prediction polynomial using input variable attribute values over using a profile using a timed fixed input dataset is that it can be used dynamically to automatically ensure that the pathway processing times are balanced in real time.

Figure 12:
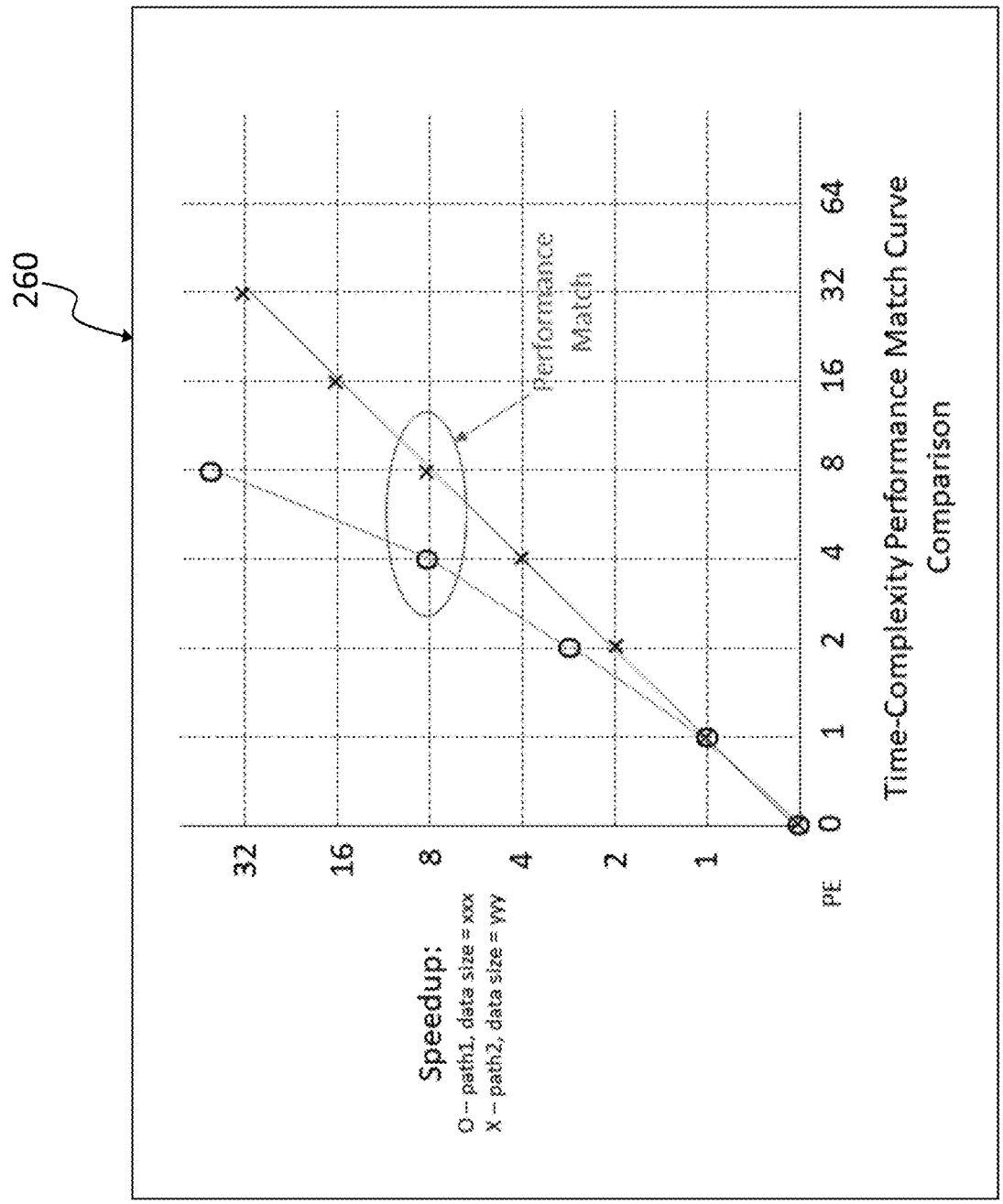
FIG. 12 is an example of a performance and processing elements comparison graph, in accordance with embodiments of the present invention.

FIG. 12 is an example of a performance and processing elements comparison graph 260. Comparing the generated predicted values of two or more pathways allows for direct performance comparisons. Unlike traditional comparison charts, this comparison can be used to determine the initial required dataset sizes, a single input variable attribute value or multiple variable attribute values, and the number of processing elements or cores needed to have performance overlap between different pathways with different initial dataset sizes, a single input variable attribute value or multiple variable attribute values.

Multiple Input Variable Attribute Advanced Time Complexity

Advanced time complexity is further extended to include the effects of multiple input variable attribute values that change loop iterations. This extension directly ties multiple input variable attribute values to processing time, that is, computational work, leading to the ability to dynamically change the number of processing elements on-the-fly given some set of input variable attribute values. If "w" represents the set of input variable attributes that affect the number of loop iterations (which affect time) and "$w_1$" the set of input variable attributes that affect the number of loop iterations on a single core "1," then spreading "$w_1$" across "n" cores gives $w_1/n = w_n$. Note that $t_{amin}$ for multiple input variable attributes that affect loop iterations occurs when any of the input variable attribute values cannot be further decreased and still generate a loop iteration.

Set of Multiple Input Parameter

Values that Affect Loop Iterations $$w = \begin{Bmatrix} P_{1,1}, P_{1,2}, \ldots, P_{1,a}, \\ P_{2,1}, P_{2,2}, \ldots, P_{2,a}, \\ \ldots, \\ P_{v,1}, P_{v,2}, \ldots, P_{v,a}, \end{Bmatrix} \quad \text{Equation 15}$$

Where: $P$ = Input parameter values of component pathway $v$ = Input variable indicator $a$ = Input variable attribute indicator Input Variable Attribute Values Spread Evenly across $n$ Cores $$w_n = \frac{w_1}{n} = \begin{Bmatrix} \frac{P_{1,1}}{n}, \frac{P_{1,2}}{n}, \ldots, \frac{P_{1,a}}{n}, \\ \frac{P_{2,1}}{n}, \frac{P_{2,2}}{n}, \ldots, \frac{P_{2,a}}{n}, \\ \ldots, \\ \frac{P_{v,1}}{n}, \frac{P_{v,2}}{n}, \ldots, \frac{P_{v,a}}{n}, \end{Bmatrix} \quad \text{Equation 16}$$

It is possible to predict the processing time per core with loop parallelism given "n" cores and multiple input variable attribute values. Note that for multiple input variable attribute values, $w_1/w_{min} = g$ Multiple Input Variable Attribute Processing  Equation 17

Time Prediction per Core, Static and Variable Time $$T(w_1, n) = \left(T_s(w_1) + T_v\left[\frac{\left(\frac{(w_1)}{(w_{min})}\right)}{(n)}\right] \times t_{min}\right) \text{ seconds} = $$

$$\left(T_s(w_1) + T_v\left(\frac{g}{n}\right) \times t_{min}\right) \text{ seconds}$$

It has been shown that pathways can have attached source and executable code. This means that it is possible to use the advanced time complexity formulation to profile a pathway. Looped Pathway Profiling to Determine $T_v(\ )$ The processing time of a pathway only increases with an increase in dataset size or input variable attribute values and only decreases with a decrease in dataset size or input variable attribute values. Since both the processing time and the dataset size or input variable attribute value change monotonically, it is possible to use the established (e.g., the teachings from incorporated U.S. Patent Application Publication 2020/0210162) and disclosed techniques herein to generate a variable-time prediction polynomial (advanced time complexity) for any component pathway with a variable time loop. A component pathway can have code blocks with loops that stand alone or are within other loops.

Figure 13:
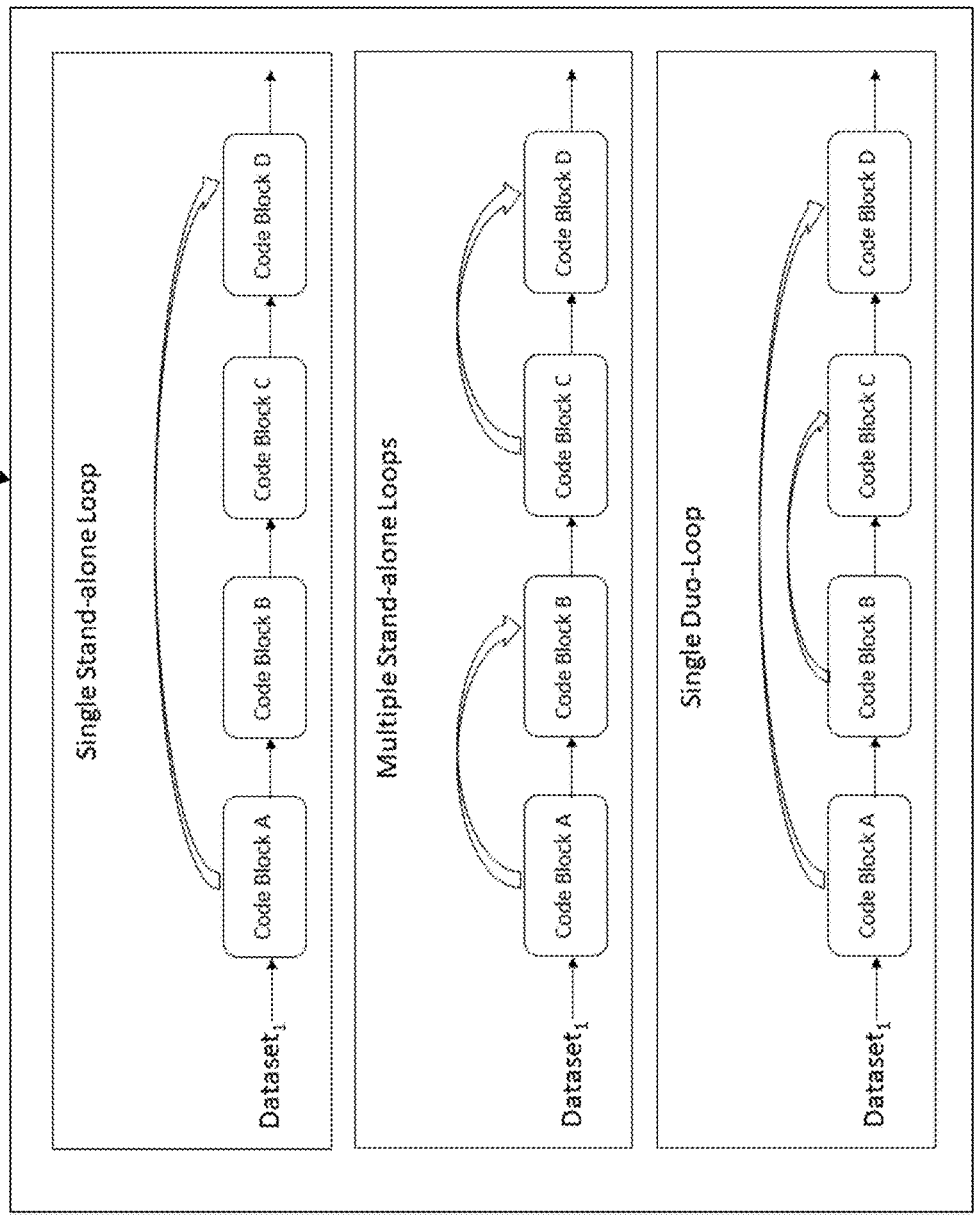
FIG. 13 is a diagram showing an example of loop structures, in accordance with embodiments of the present invention.

FIG. 13 is a diagram 270 showing an example of loop structures with a single input variable attribute. If there is a single input variable attribute that affects the number of loop iterations for all looping structures in a component pathway, the advanced time complexity function can be calculated as a whole.

Figure 14:
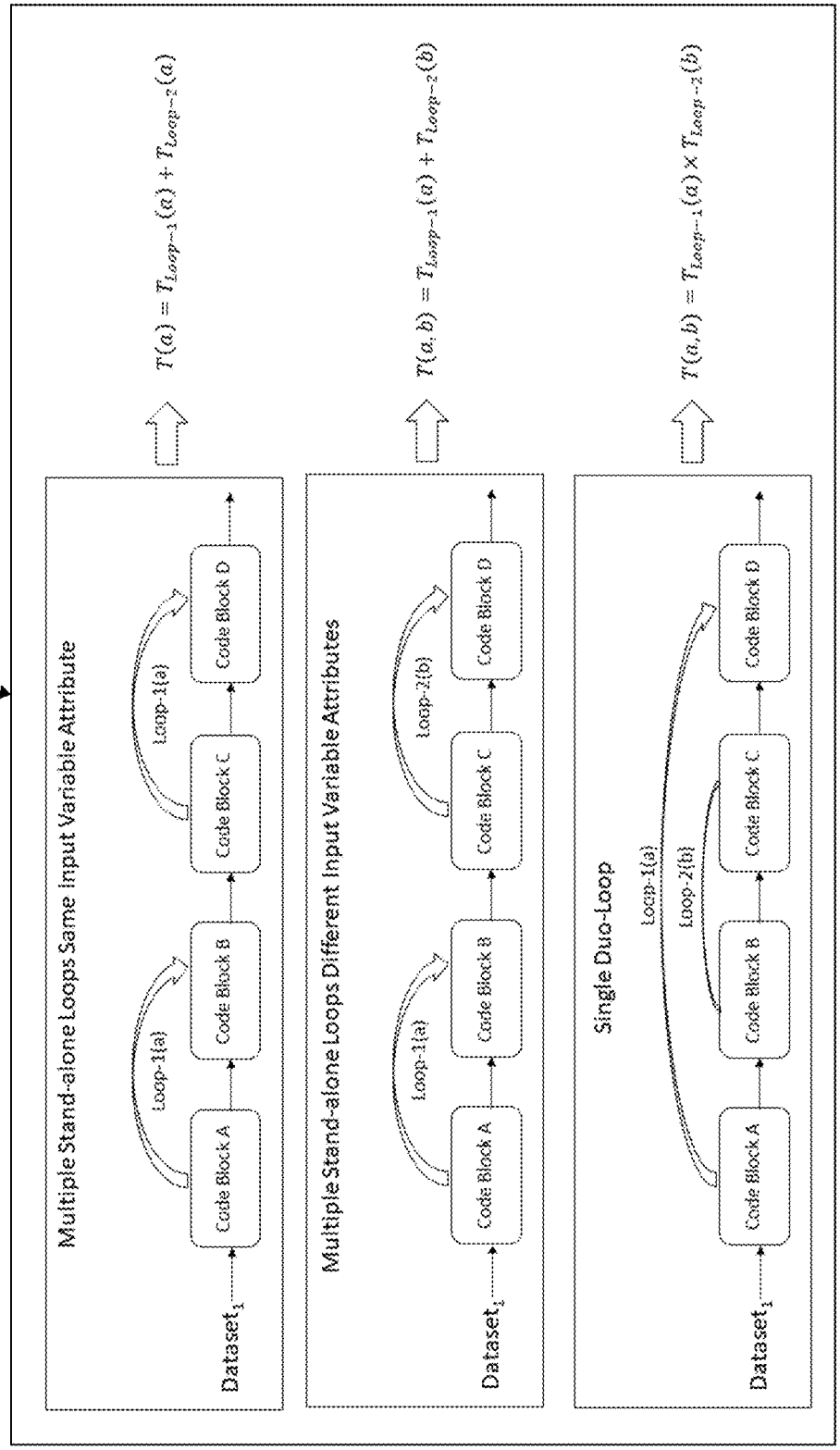
FIG. 14 is a diagram showing an example of loop structures with input variable attributes showing variable time of advanced time complexity, in accordance with embodiments of the present invention.

FIG. 14 is a diagram 280 showing an example of multiple loop structures, each with a single input variable attribute, showing variable time advanced time complexity. If instead, the looping structures use a different input variable attribute to vary the number of loop iterations, time complexity values for each loop structure can be calculated separately by varying each input variable attribute separately and generating an advanced time complexity polynomial for each. The polynomials of all loop structures are combined based on whether they are linearly associated or nested. In general, the processing times generated by the polynomials of multiple linked stand-alone loops are added and the processing times generated by the polynomials of nested loops are multiplied.

Figure 15:
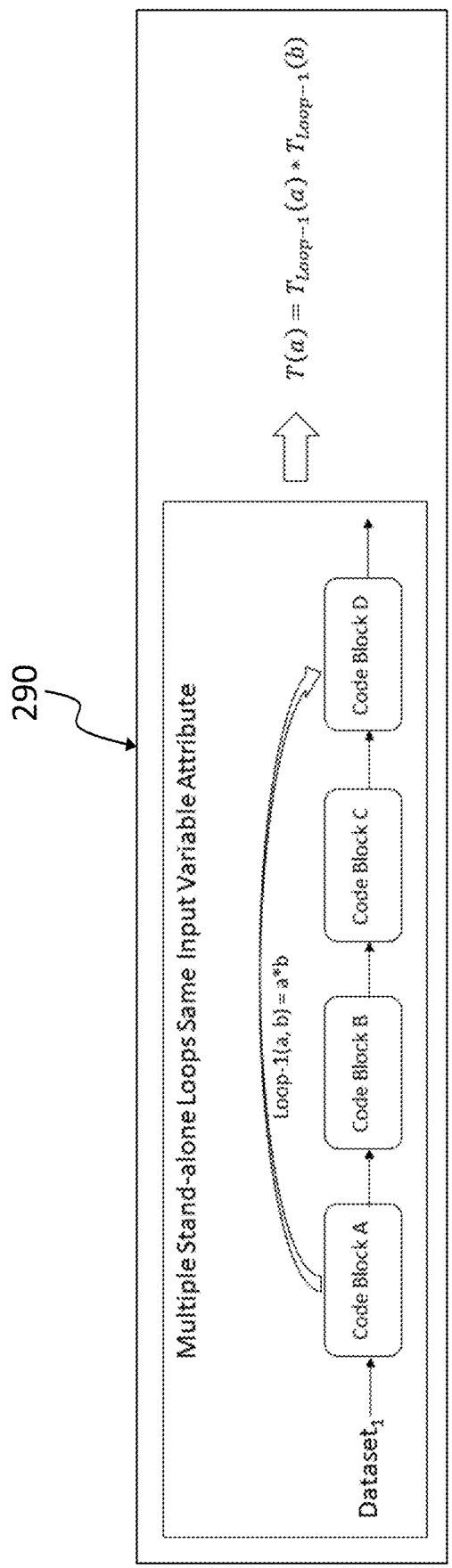
FIG. 15 is a diagram showing an example of a single loop with multiple input variable attributes, in accordance with embodiments of the present invention.

FIG. 15 is a diagram 290 showing an example of a single loop with multiple input variable attributes. A single loop can have multiple input variable attributes that can affect the number of loop iterations. In this case, the input variable attributes are varied separately, generating separate time complexity polynomials, and their given relationship within the loop control condition is used to combine the polynomials.

Automatically Separating a Component Pathway into Static and Variable Time

Discussions of both Amdahl and Gustafson-Barsis parallel processing speedup always include serial versus parallel time. As discussed herein, the parallel time is actually the processing time of activity that occurs in looping structures whose number of iterations vary as a function of some set of input variable attributes "w" (variable time loops). Serial time represents the time it takes to process activity that occurs outside of variable time loops. Parallel time herein is represented by variable time and serial time by static time. Note that looping structures whose number of iterations do not vary as a function of dataset size or input variable attribute values are called static time loops. Standard loop unrolling techniques can be used to decrease the processing time of static time loops but not variable time loops.

Once non-loop structure control conditions are removed from component pathways, there are only two types of activity: code blocks and loops. If the static time activity of code blocks and static time loops generates variables that are independent of a variable time loop, then that activity can be moved to a position that occurs prior to that loop. If the static time activity is dependent on the activity of a variable time loop, then it must occur after that loop.

Figure 16:
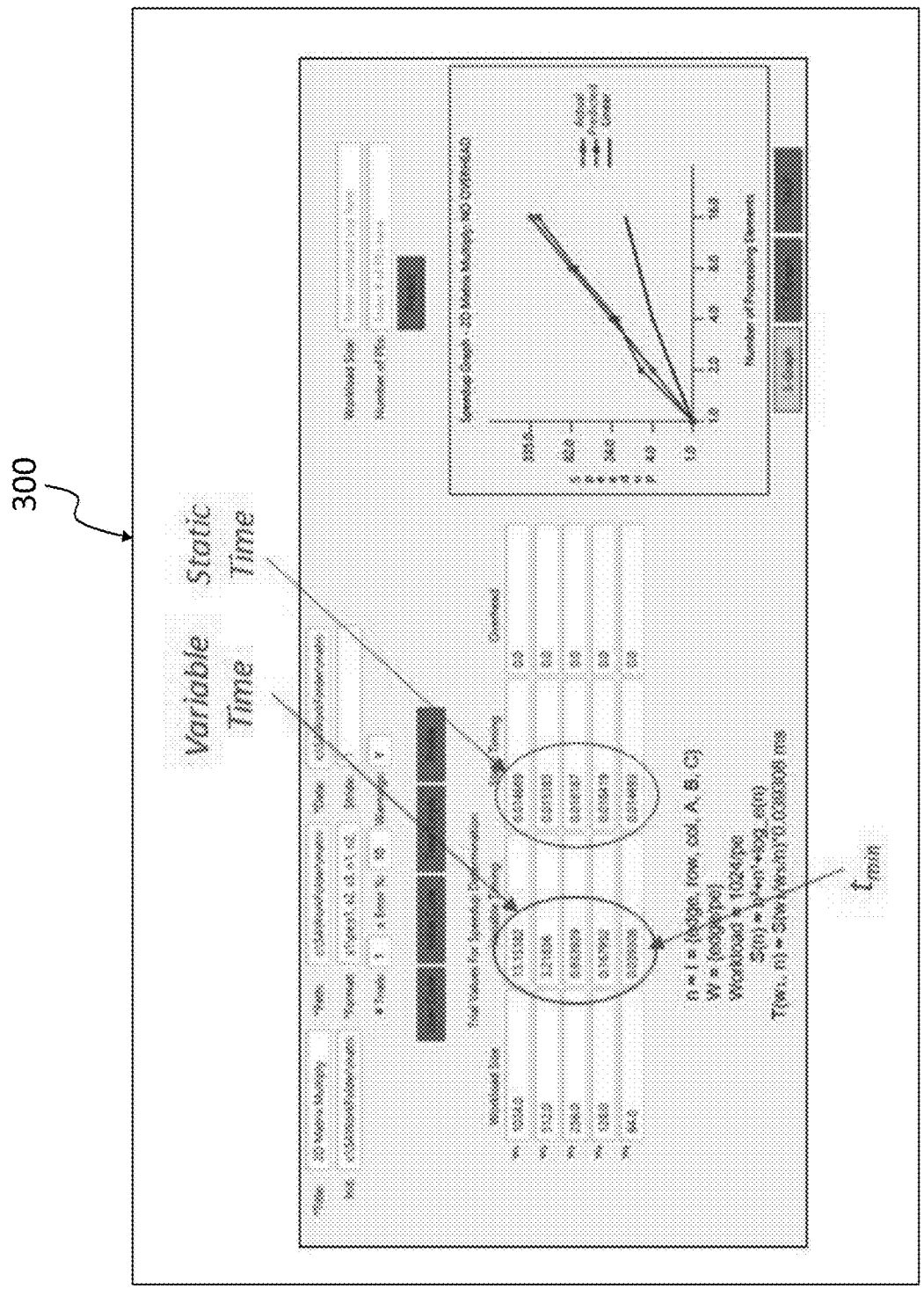
FIG. 16 shows an example of a simple two-dimensional matrix multiply with separated static and variable time, in accordance with embodiments of the present invention.

FIG. 16 shows an example 300 of a simple two-dimensional matrix multiply with separated static and variable time. All independent activities that can occur before variable time loops can be grouped together as initial conditions, which can be completely separated as long as they occur before they are needed by the first variable time loop, showing the true nature of the variable time. The speedup of the variable time is shown as both a system-calculated polynomial and a system-predicted speedup graph. If the static time is separated as initialization time, then the processing does not have to occur serially with the variable time. It can be processed at any time prior to variable time portion of a component pathway.

Pathway Maximum Error for Cache Size Check Trigger

In order to effectively execute multiple pathways simultaneously in a multicore system, the number of cache misses must be low because multicore performance is directly tied to the cache hit ratio. If the input variable attribute that affects the number of loop iterations represents a dataset size then it can be used to affect cache sizes.

When the maximum time prediction error $E_{max}$ is less than some epsilon, then the number of cores used for the dataset can be increased until $E_{max}$ is greater than epsilon, causing a cache hit ratio check to be triggered. This allows the system of the current invention to determine the maximum non-optimized number of cores that can be used by the pathway. To increase the number of cores that can be used, L1 and L2 cache sizes are manipulated such that the cache hit ratio stays less than epsilon as the number of cores increases above the non-optimized maximum number of cores. When L1 and L2 manipulation can no longer ensure that the cache hit ratio stays below epsilon, this new maximum number of cores is called the optimized number of cores.

Equation 18: Cache Hit Ratio $$H_r = C_h/(C_h + C_m)$$

Where: $C_h$=Number of cache hits
$C_m$=Number of cache misses

Calculating Minimum Cache and L3 Sizes

Although cache hits $C_h$ and cache misses $C_m$ are a hardware/firmware function, some operating systems give access to this information. For example, the deprecated Linux tool Cachestat in its Perf toolset provides such access, making $C_h$ and $C_m$ available at the operating system/device driver level.

Figure 17:
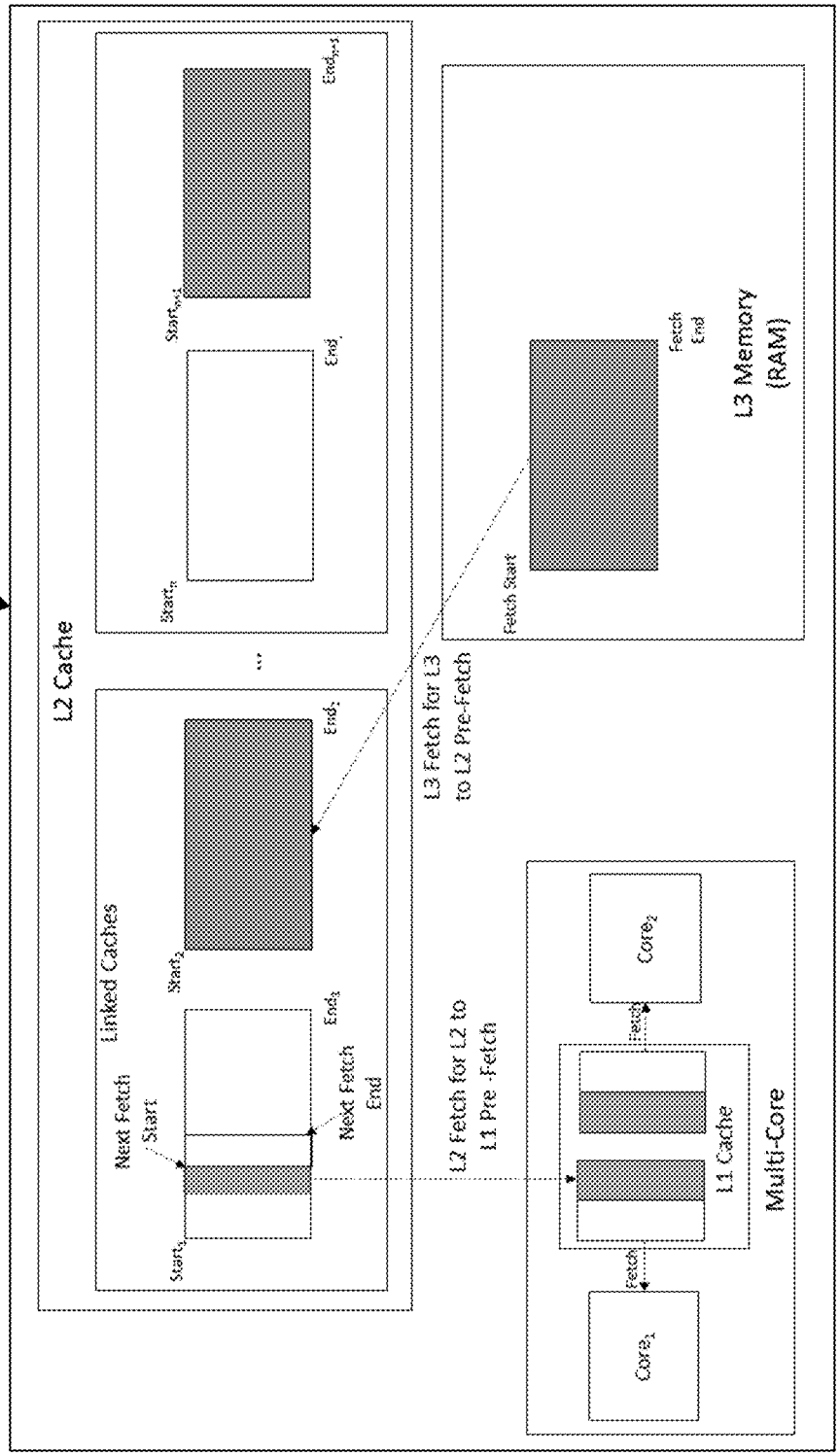
FIG. 17 is a diagram showing an example of data fetching and pre-fetching relationships, in accordance with embodiments of the present invention.

FIG. 17 is a diagram 310 showing an example of data fetching and pre-fetching relationships. Multicore systems allow for pre-fetching data from L3 memory (RAM) to L2 memory (cache). Pre-fetching allows the core to manipulate L2 pointers to facilitate the movement of data from L3 to some portion of L2 and from L2 to the L1 pre-fetch buffer. There are multiple sets of L2 pointers, allowing multiple cores to pre-fetch different data sets.

Figure 18:
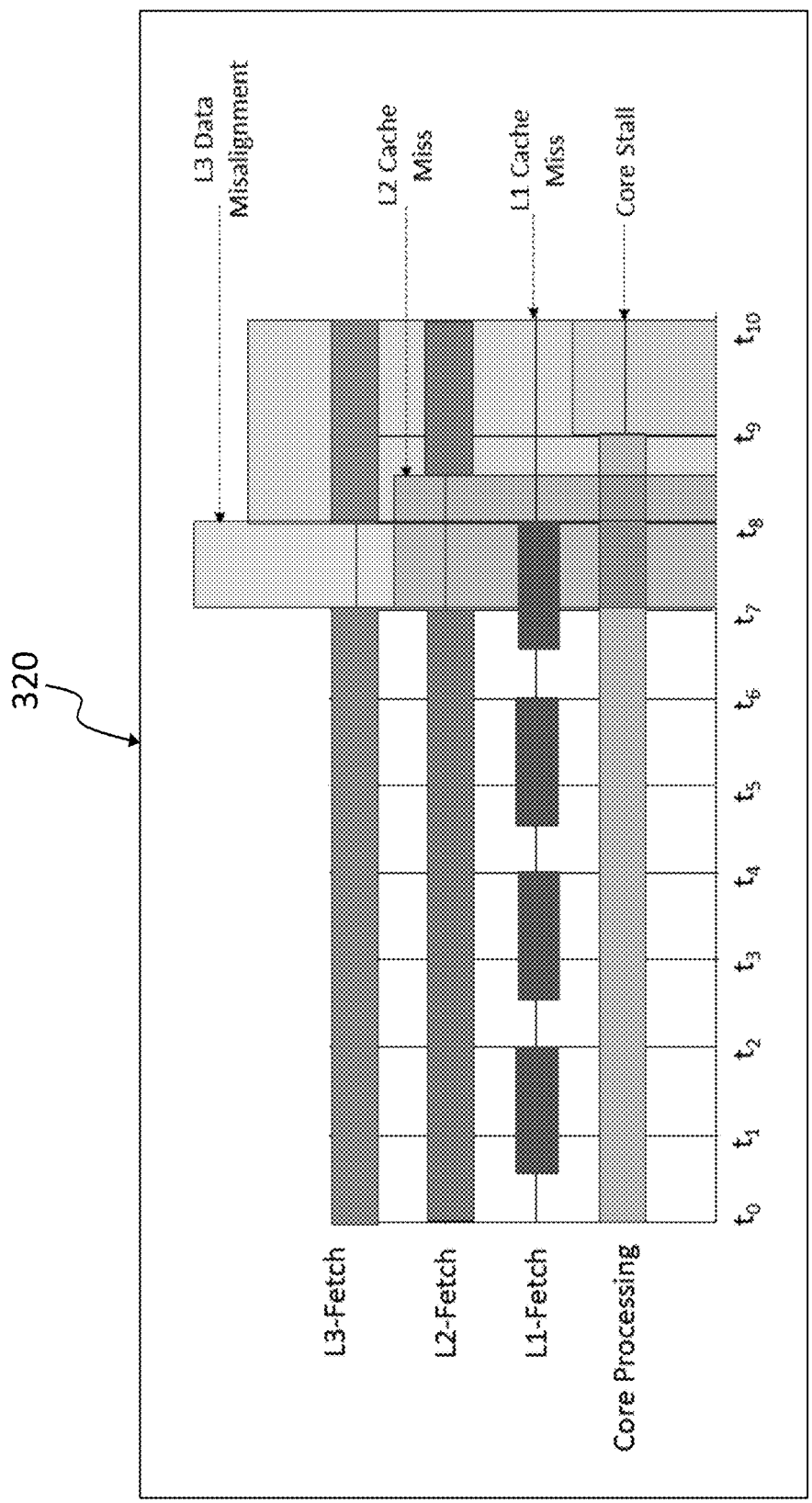
FIG. 18 shows an example of a graph depicting the stalling of a core from the interaction of L1, L2, and L3 memory, in accordance with embodiments of the present invention.

FIG. 18 shows a core processor stalling graph 320. A core's processing can be stalled in response to an L1 cache miss, which can occur because of an L2 cache miss or when the L2 cache size is insufficient. The L1 and/or L2 cache size for each core can be manipulated programmatically by setting the L1 and L2 cache starting and ending pointer values as well as ensuring there is a sufficient block of L3 memory allocated to perform L3 to L2 and L2 to L1 pre-fetching.

The minimum cache size required to ensure continuous processor activity across multiple cores for a set of parallel pathways must be determined for each pathway involved; that is, a profile for each pathway is created and associated with the set of pathways for future use. This is accomplished by setting the cache pointers to their anticipated maximum values, allocating a maximum input dataset size for pathway inputs, executing the pathway's associated code, and capturing $C_h$ and $C_m$ for the pathway execution of all input data. The cache pointers are then manipulated to decrease the cache memory size to half, then repeating the pathway execution and $C_h$ and $C_m$ data capture. This is repeated until $C_h$ falls below some threshold epsilon.

Minimum $L1$ Cache Size      Equation 19

$$L1Start = getL1Start(Pathway);$$
$$L1End = getL1End(Pathway);$$
$$setL1Size(ProcessorNum, CoreNum, L1Start, L1End);$$
$$count = 0;$$
$$initializeH_r();$$
$$execute(Pathway);$$
$$H_r = getH_r();$$

$$\text{While}(H_r > \epsilon) \left\{ \begin{array}{l} L1End = \dfrac{L1End}{2}; \\ C_h = 0; \\ C_m = 0; \\ Count = Count + 1; \\ setL1Size(ProcessorNum, CoreNum, \\ \quad initializeH_r(); \\ \quad execute(Pathway); \\ \quad H_r = getH_r(); \end{array} \right\}$$

Where:

$L_x PreFetchStart$ = Starting pre-fetch pointer value for the $x^{th}$ memory level $L_x PreFetchEnd$ = Ending pre-fetch pointer value for the $x^{th}$ memory level $ProcessorNum$ = Processor indicator $CoreNum$ = Core indicator for current processor $Count$ = Number of times data storage area size divided by two $L_x Start$ = Start fetch pointer value for the $x^{th}$ memory level $L_x End$ = End fetch pointer value for the $x^{th}$ memory level $Pathway$ = Executable code for the current pathway $H_r$ = Hit ratio $setL_x Size()$ = Function used to set the indicated processor and core's $x^{th}$ memory level size $initilizeH_r()$ = Function to initialize the hit ratio and associated hardware values $execute()$ = Function to begin execution of the pathway's executable code $getH_r()$ = Function to get the stored hit ratio Equation 20

$L1$ Pre-Fetch Cache Size $$L1PreFetchStart = getL1PreFetchStart(Pathway);$$
$$L1PreFetchEnd = getL1PreFetchEnd(Pathway);$$
$$setL1PreFetchSize(processsorNum, CoreNum, L1PreFetchStart, L1PreFetchEnd);$$
$$count = 0;$$
$$initializeH_r();$$
$$execute(Pathway);$$
$$H_r = getH_r();$$

$$\text{While}(H_r > \epsilon) \left\{ \begin{array}{l} L1PreFetchEnd = \dfrac{L1PreFetchEnd}{2} \\ C_h = 0 \\ C_m = 0 \\ count = count + 1; \\ setL1PreFetchSize(ProcessorNum, CoreNum, L1PreFetchStart, L1PreFetchEnd); \\ initializeH_r(); \\ execute(Pathway); \\ H_r = getH_r(); \end{array} \right\}$$

Minimum L2 Cache Size

Equation 21

$$L2Start = getL2Start(Pathway);$$
$$L2End = getL2End(Pathway);$$
$$setL2Size(ProocessorNum, CoreNum, L2Start, L2End);$$
$$count = 0;$$
$$initializeH_r();$$
$$execute(Pathway);$$
$$H_r = getH_r();$$

$$\text{While}(H_r > \epsilon) \begin{cases} L2End = \dfrac{L2End}{2}; \\ C_h = 0; \\ C_m = 0; \\ count = count + 1; \\ setL2Size(ProcessorNum, CoreNum, L2Start, L2End); \\ initializeH_r(); \\ execute(Pathway); \\ H_r = getH_r(); \end{cases}$$

L2 Pre-Fetch Cache Size

Equation 22

$$L2PreFetchStart = getL2PreFetchStart(Pathway);$$
$$L2PreFetchEnd = getL2PreFetchEnd(Pathway);$$
$$setL2PreFetchSize(ProcessorNum, CoreNum, L2PreFetchStart, L2PreFetchEnd);$$
$$count = 0;$$
$$initializeH_r();$$
$$execute(Pathway);$$
$$H_r = getH_r();$$

The minimum sizes of the L1 and L2 caches are calculated for a pathway that is to be executed in parallel on multiple cores of the same processor with either other pathways or other instances of the same pathway.

The minimum cache sizes can then be used to determine the minimum dataset size stored in L3 (RAM) such that the L2 cache misses do not occur.

Minimum Required L3 Size

Equation 23

$$L3FetchStart = getL3FetchStart(Pathway);$$
$$L3FetchEnd = getL3FetchEnd(Pathway);$$
$$setL3FetchSize(ProcessorNum, CoreNum, L3FetchStart, L3FetchEnd);$$
$$count = 0$$
$$initializeH_r();$$
$$execute(Pathway);$$
$$H_r = getH_r();$$

$$\text{While}(H_r > \epsilon) \begin{cases} L3FetchEnd = \dfrac{L3FetchEnd}{2} \\ C_h = 0 \\ C_m = 0 \\ count = count + 1; \\ setL3FetchSize(ProcessorNum, CoreNum, L3FetchStart, L3FetchEnd) \\ initializeH_r() \\ execute(Pathway) \\ H_r = getH_r() \end{cases}$$

Where:
L3FetchStart = Starting fetch pointer value for the L3 memory level
L3FetchEnd = Ending fetch pointer value for the L3 memory level The minimum L1, L2 and L3 cache sizes ensure that a core stall does not occur while the system is engaged in parallel pathway processing.

Multicore Pathway Communication

As taught in U.S. Pat. Nos. 8,959,494 and 9,324,126, which are both fully incorporated herein by reference, it is possible to indicate parallel processing communication effects from the elements of an MPT HFD graph as long as the input variable attribute "a" represents a dataset size.

Figure 19:
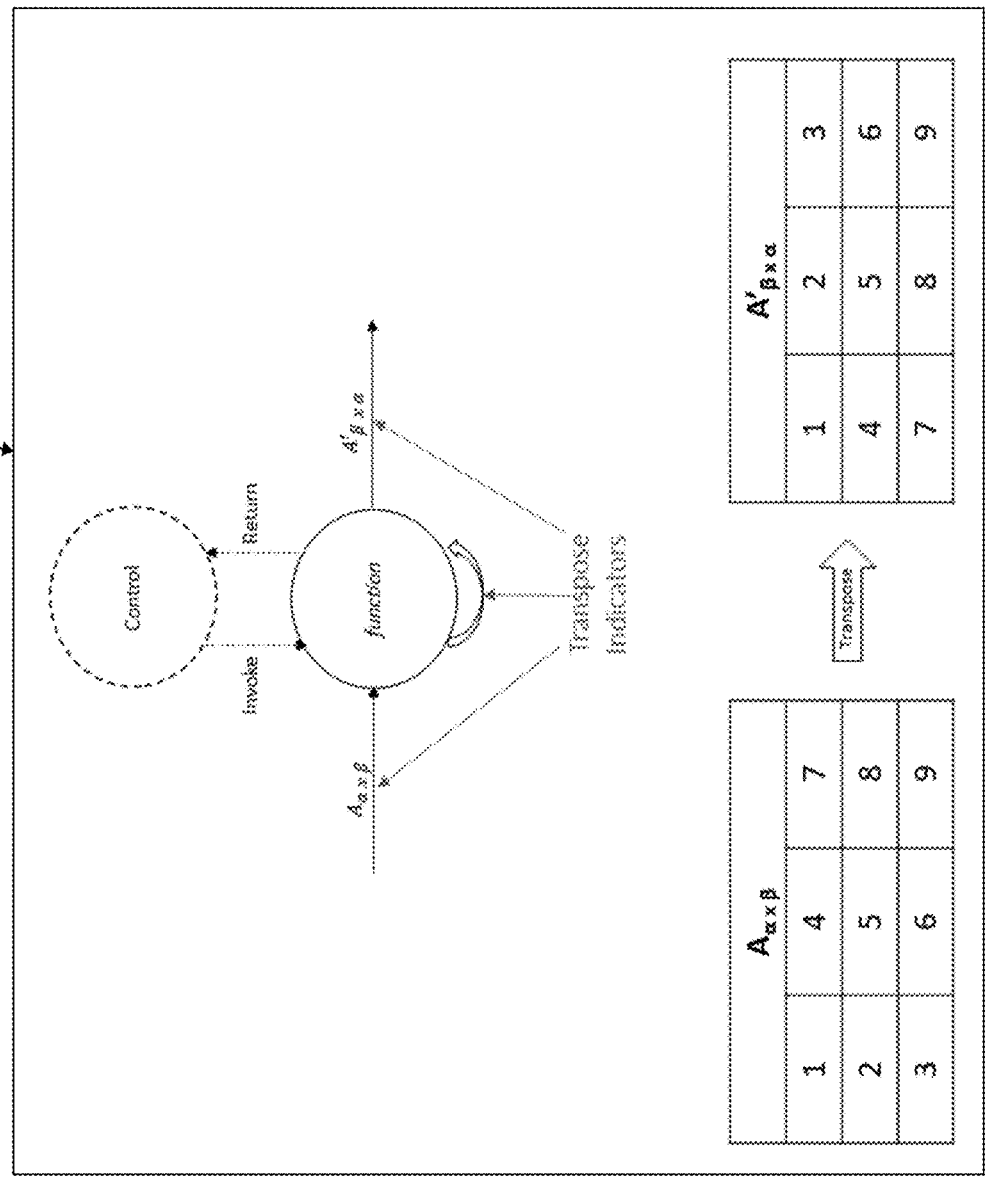
FIG. 19 is a diagram showing an example of MPT HFD graph transpose communication indication, in accordance with embodiments of the present invention.

FIG. 19 is a diagram 330 showing an example of an MPT HFD graph two-dimensional transpose communication indication. Though how to indicate communication patterns using MPT HFD graph notation has been demonstrated, the present invention shows how a system can automatically determine which communication is to be used so that the system can place the required indicators without human intervention.

Figure 20:
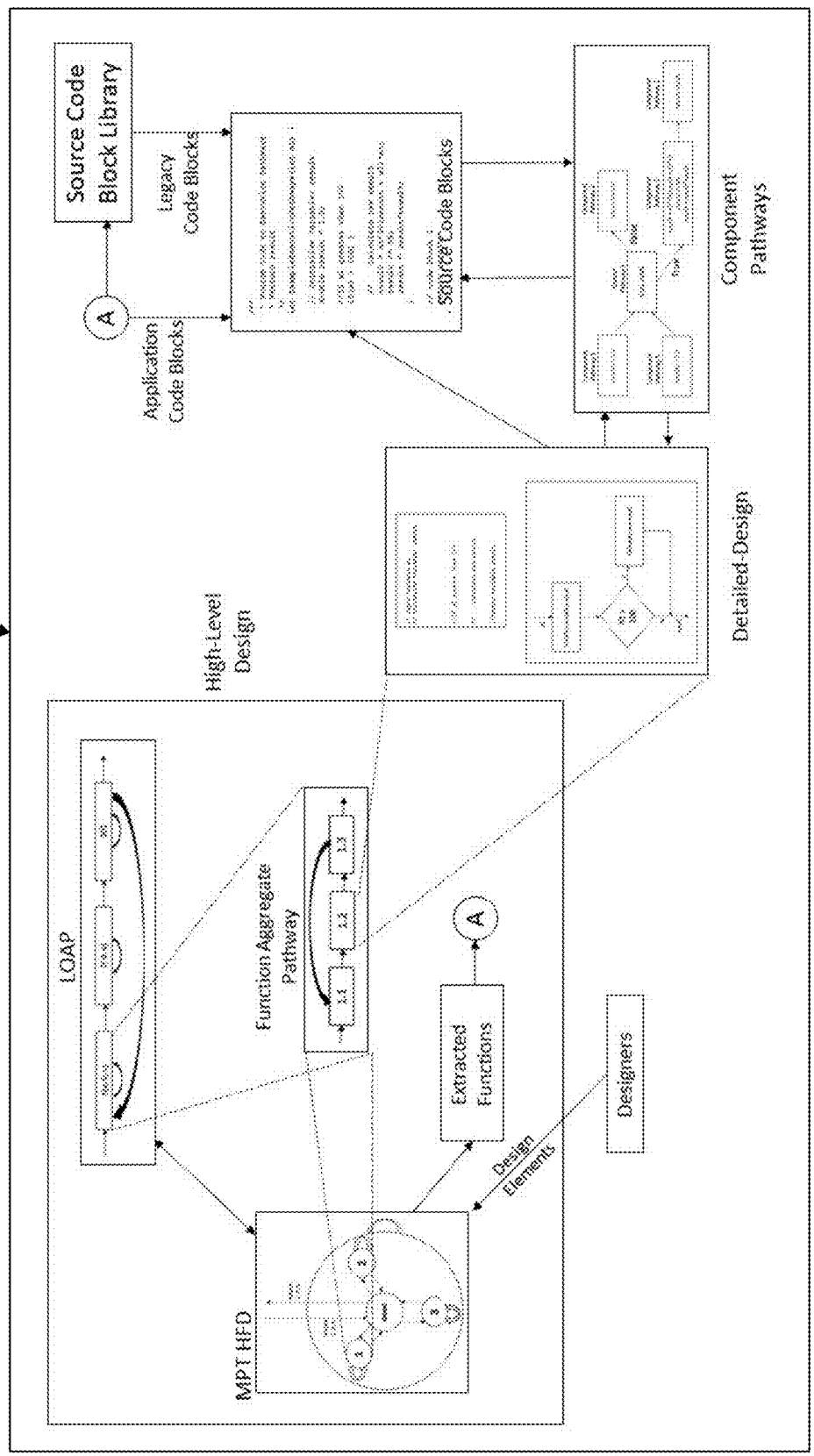
FIG. 20 is diagram showing an example of MPT HFD graph elements converted to detailed design, source code, and component pathways, in accordance with embodiments of the present invention.

FIG. 20 is diagram 340 showing an example of MPT HFD graph elements converted to detailed design, source code, and component pathways. As shown in incorporated U.S. patent application Ser. No. 18/115,749, high-level design elements of the MPT HFD can have associated detailed design (flowcharts or pseudo-code) and detailed design can have both associated source code and component pathways.

It is known that properly formatted source code can be compiled into executable code. Incorporated U.S. patent application Ser. No. 18/115,749 also demonstrated that boundary value analysis can be performed on executable code that is associated with source code that is associated with component pathways, using input variable attribute values that represent the boundary conditions of the input variables. Boundary value analysis input values can also be used to automatically determine communication patterns.

Single Core-Assisted Data Exchanges and Multicore Optimization

Array and matrix manipulation performance can be enhanced with the assistance of pre-fetching, cache, and cores used for data manipulation improvement.

Automatic Transpose Detection

There are multiple ways to detect if a transpose function has been utilized on an input matrix of values.

Figure 21:
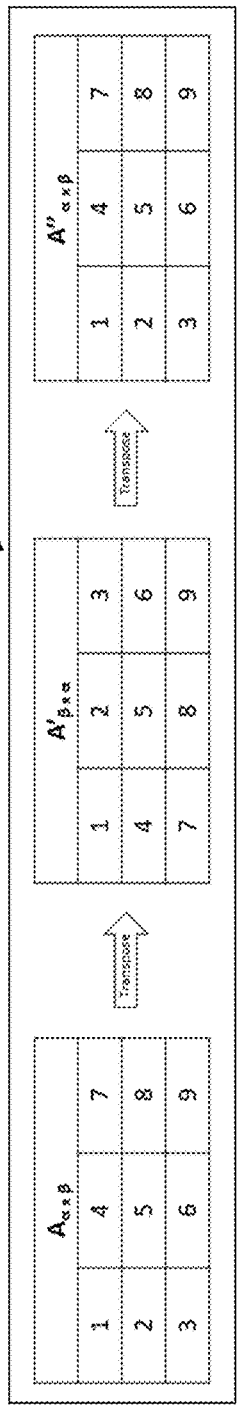
FIG. 21 is a diagram showing an example of a transpose of a transpose with results equaling the original matrix, in accordance with embodiments of the present invention.

FIG. 21 is a diagram 350 showing an example of a transpose of a transpose, resulting in the original matrix. If a two-dimensional matrix is input to some executable code that is associated with source code that is associated with either a detailed design element of an MPT HFD or with a pathway, then it is possible to use the fact that the transpose of a transpose is the original value. If a transpose function is applied to the output matrix of some function or pathway T and the output matrix of the transpose function equals the original input matrix of T (involution rule), then the function or pathway T is a transpose. If a transpose is detected for some design element of the MPT HFD high-level design, indicators can be added to the design element.

There are many different transpose rules, some of which can be used to detect various types of transpositions.
1) Given (A+B)'=C, if two matrices A and B are input into a pathway-associated executable code giving an output matrix C and if C' equals A+B then the transpose of the addition of matrices has occurred.
2) Given (A×B)'=B'×A'=C, if two matrices A and B are input into a pathway-associated executable code giving an output matrix C and if C' equals A×B then the transpose of the multiplication of matrices has occurred.
3) Given (c×A)'=B, if a scalar c and a matrix A are input into a pathway-associated executable code giving an output matrix B and if B' equals c×A then the transpose of matrix multiplied by a scalar has occurred.

Figure 22:
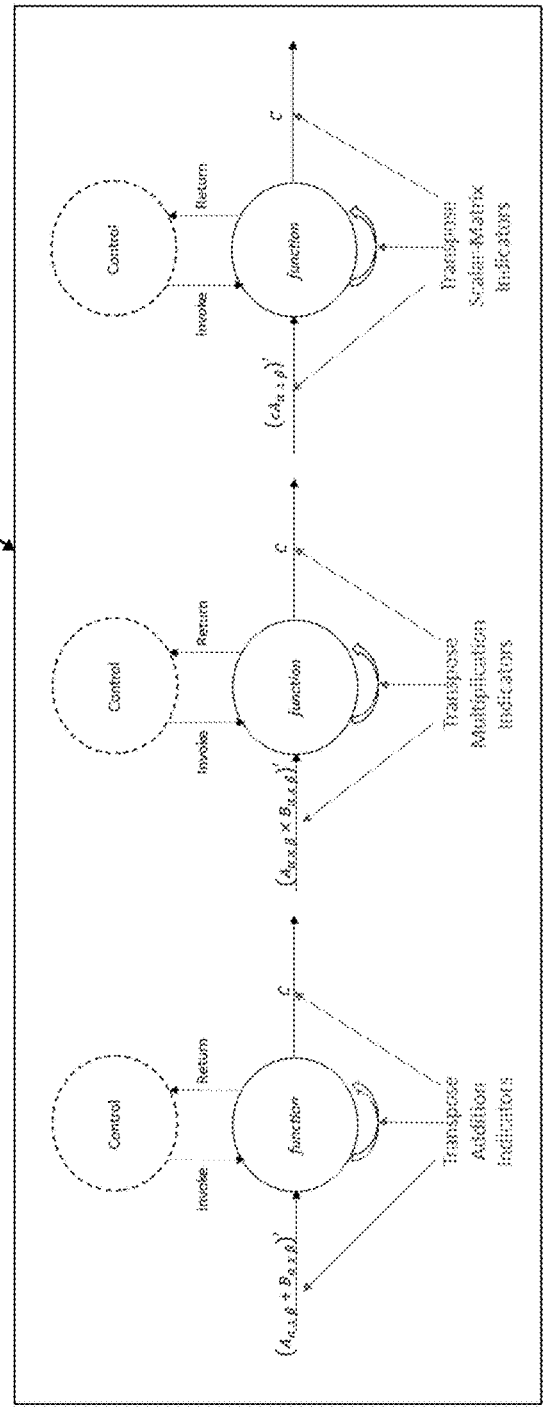
FIG. 22 is a diagram showing examples of additional MPT HFD graph symbols for transpose, in accordance with embodiments of the present invention.

FIG. 22 is a diagram 360 showing examples of these transpose rules indicated on an MPT HFD graph.

Figure 23:
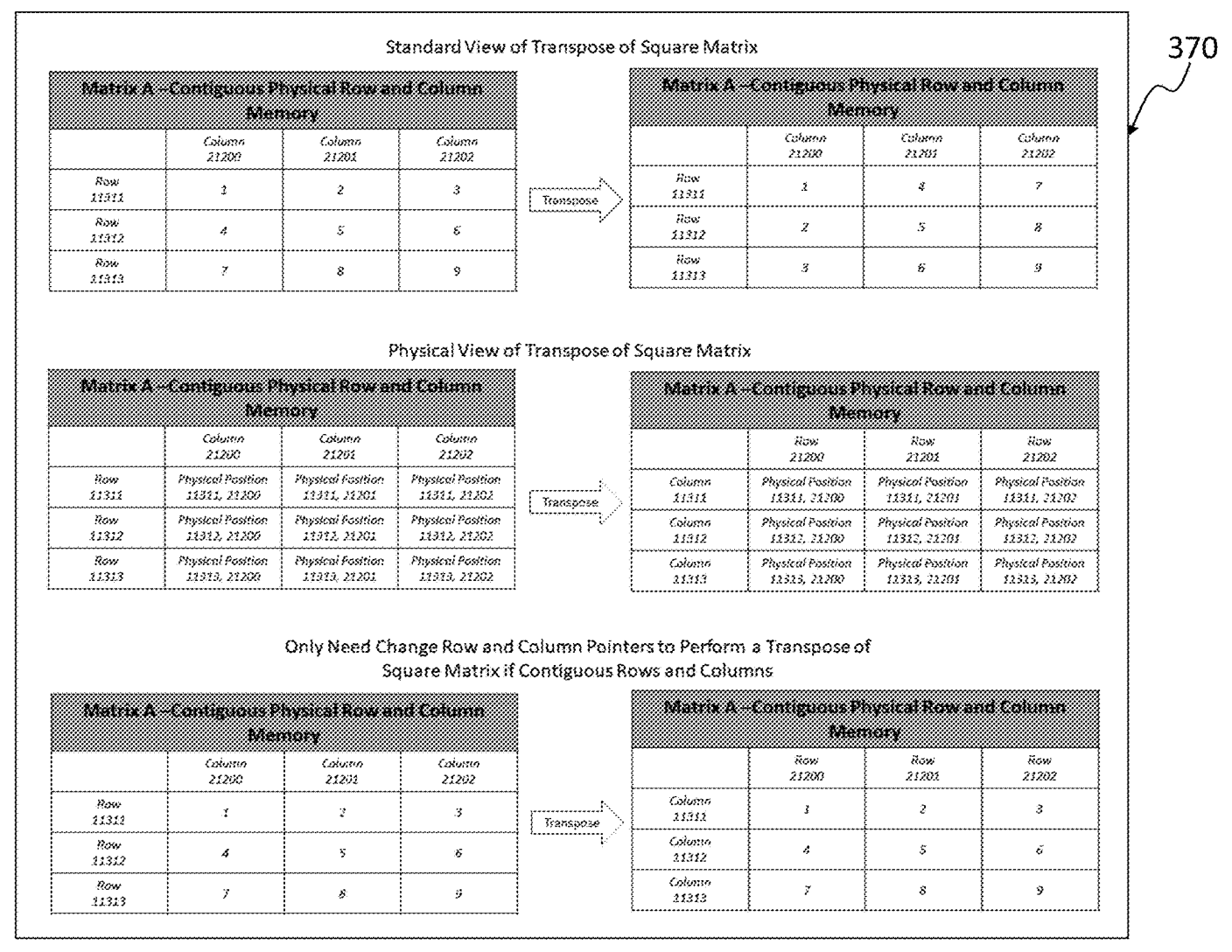

FIG. 23 shows an example of a two-dimensional matrix 370 with row or column major, and contiguous or discontiguous memory usage. If there is a matrix A such that the L3 memory locations of all of its rows and columns are contiguous then it is known that transposition can take place without physically moving data elements. However, if the rows or the columns or both are discontiguous then physical data movement is required. To determine discontiguous memory allocation for a two-dimensional square matrix, the physical locations of the first column of each row and of the first row of each column are examined. If they are not contiguous then physical data movement is indicated.

Figure 24:
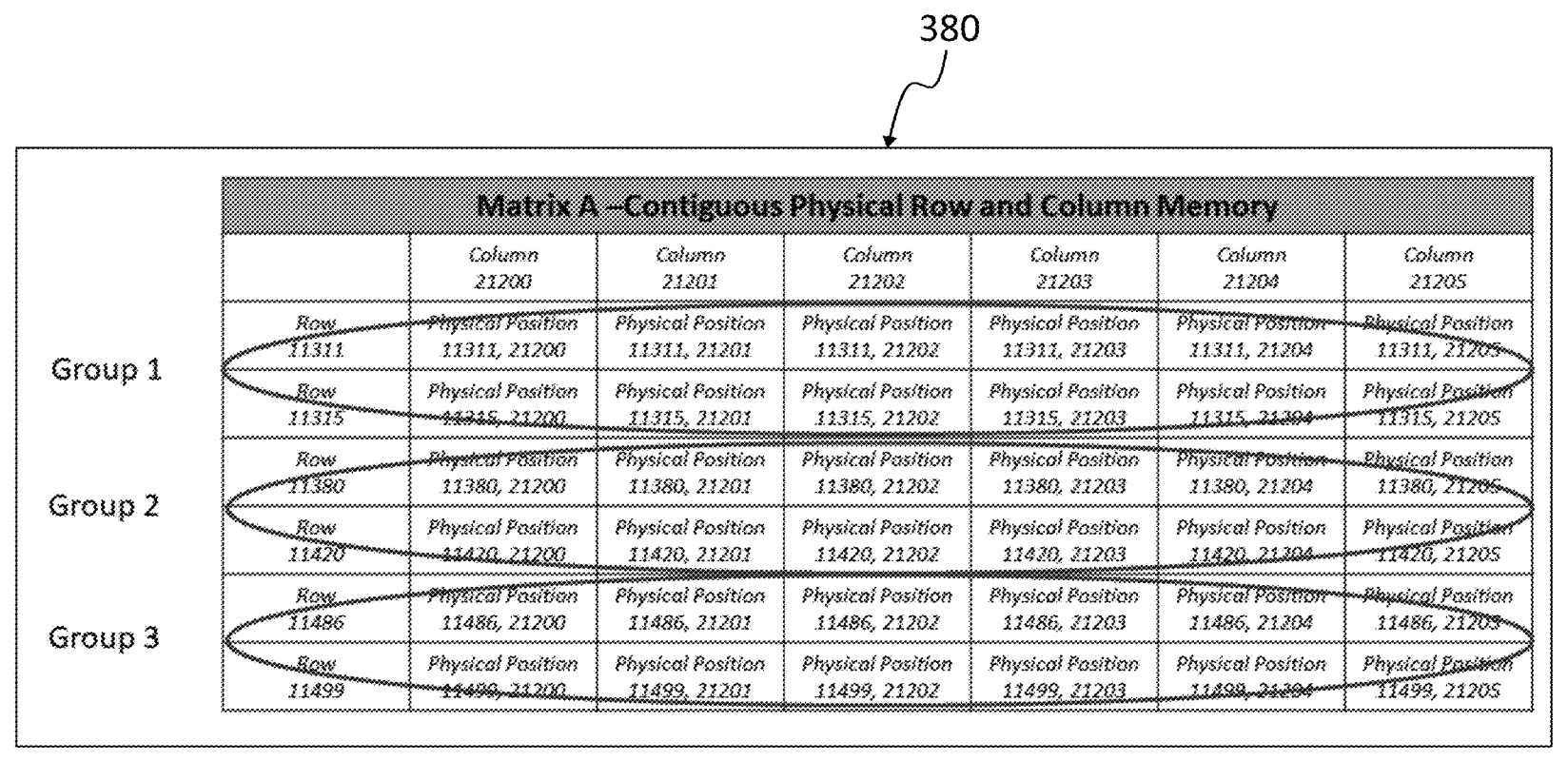

FIG. 24 is an example 380 of grouped discontiguous rows. All cores in the processor are connected to the same L2 and L3 physical memory and each core has its own access to both L2 and L3 memory. If the physical locations of the rows and, separately, the columns of a two-dimensional matrix are not contiguous, they can still be spatially close enough to be grouped. The rows are spatially grouped and the groupings can be automatically assigned to different cores.

Each core can now transfer its group to an associated L2 location which corresponds to the required data movement for the transpose. This effectively parallelizes the data movement while also decreasing L3 access time.

Automatic Left Data Exchange Communication Pattern Detection

Figure 25:
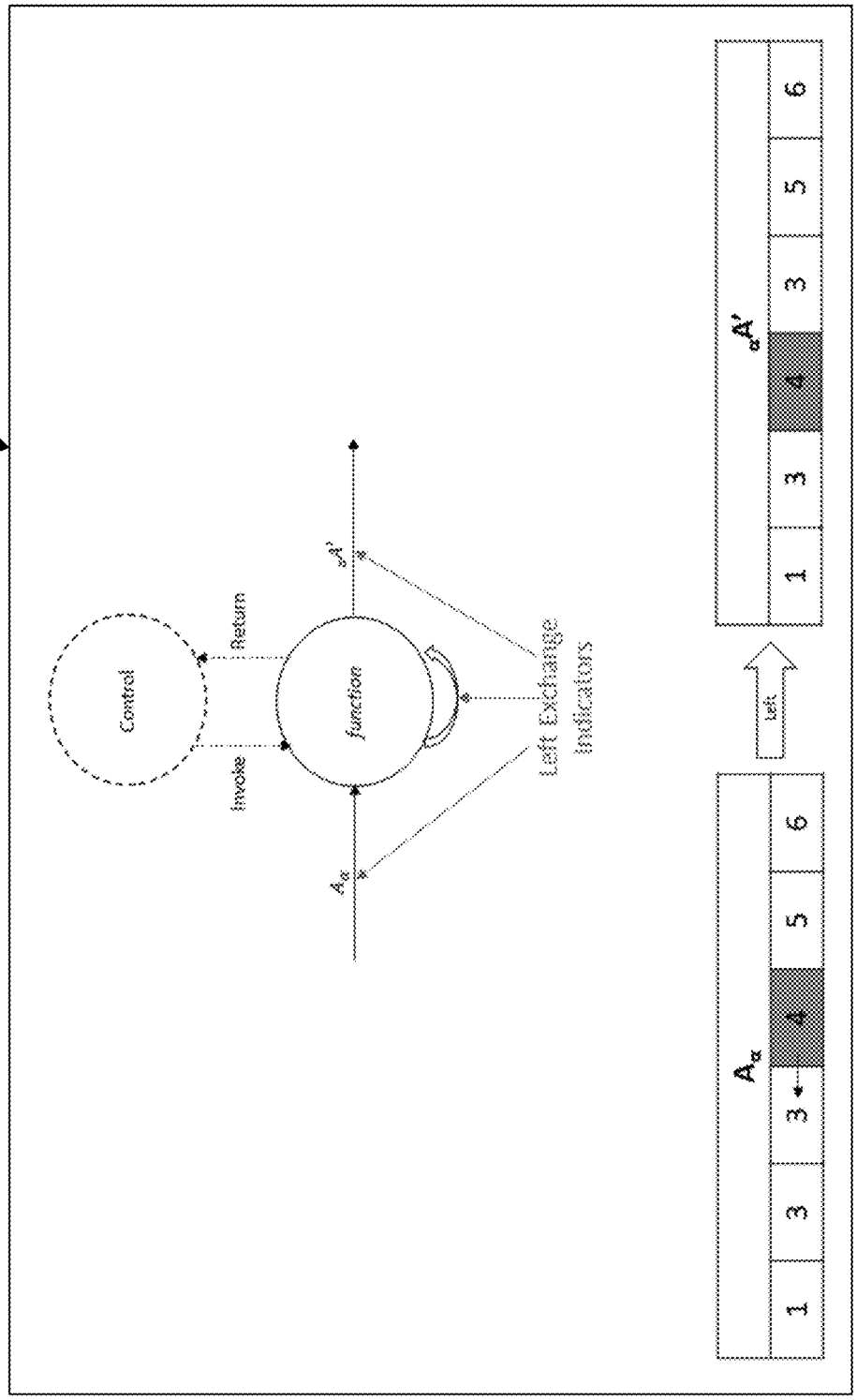
FIG. 25 is a diagram showing an example of left data exchange detection and display on an MPT HFD graph, in accordance with embodiments of the present invention.

FIG. 25 is a diagram 390 showing an example of left data exchange detection and display on a MPT HFD graph. If there is a single dimensional array or a multi-dimension matrix whereby only left exchanges are detected then it is indicated on the MPT HFD graph.

Figure 26:
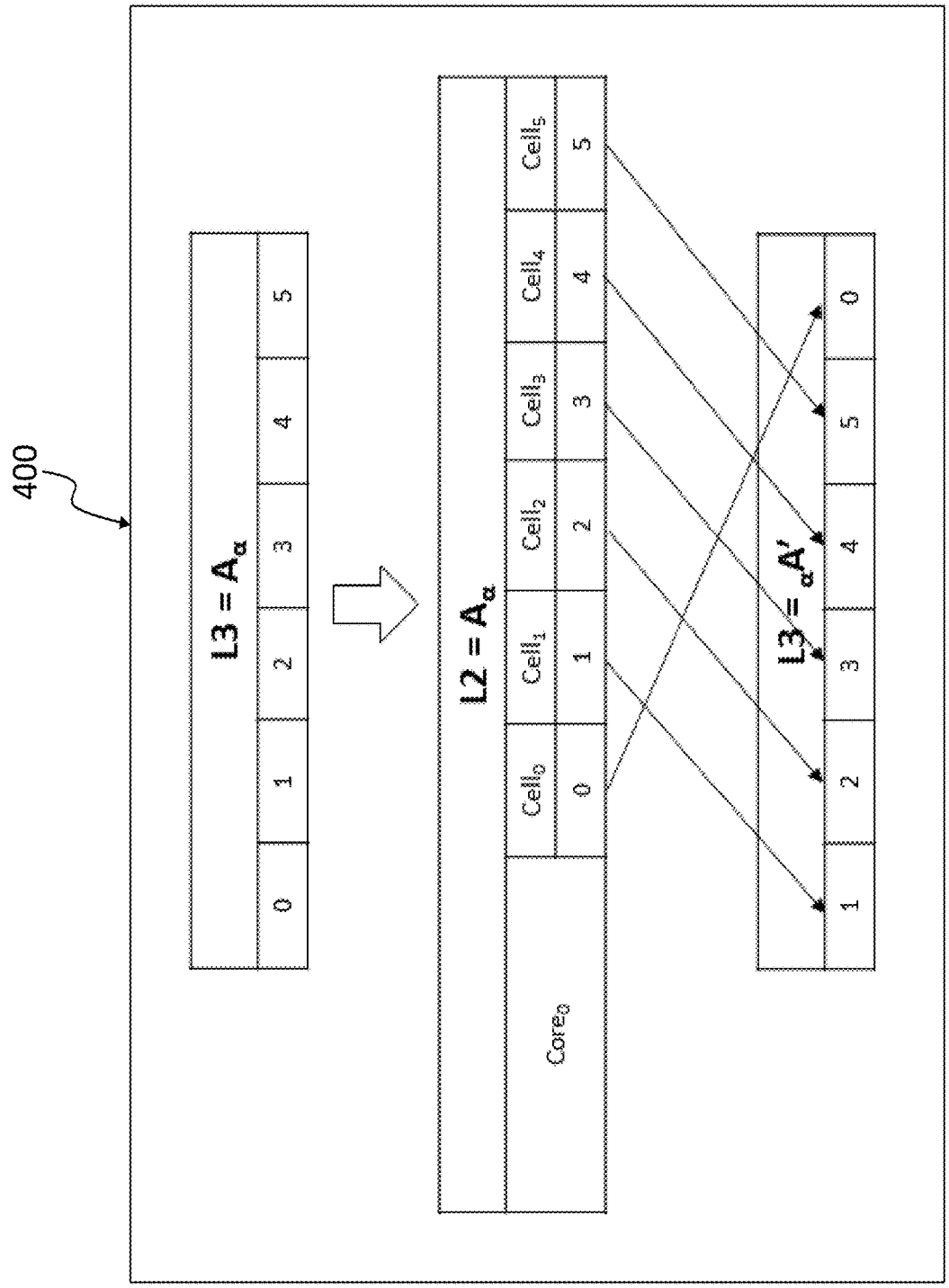
FIG. 26 is a diagram showing an example of core- and cache pointer-assisted one-dimensional left data exchange, in accordance with embodiments of the present invention.

FIG. 26 is a diagram 400 showing an example of a single core- and cache pointer-assisted one-dimensional left data exchange. This exchange can be facilitated by using a core L2 pointer to move the data from L3 to L2 and then L3 back to L2 such that the L3 data is in the correct order.

Figure 27:
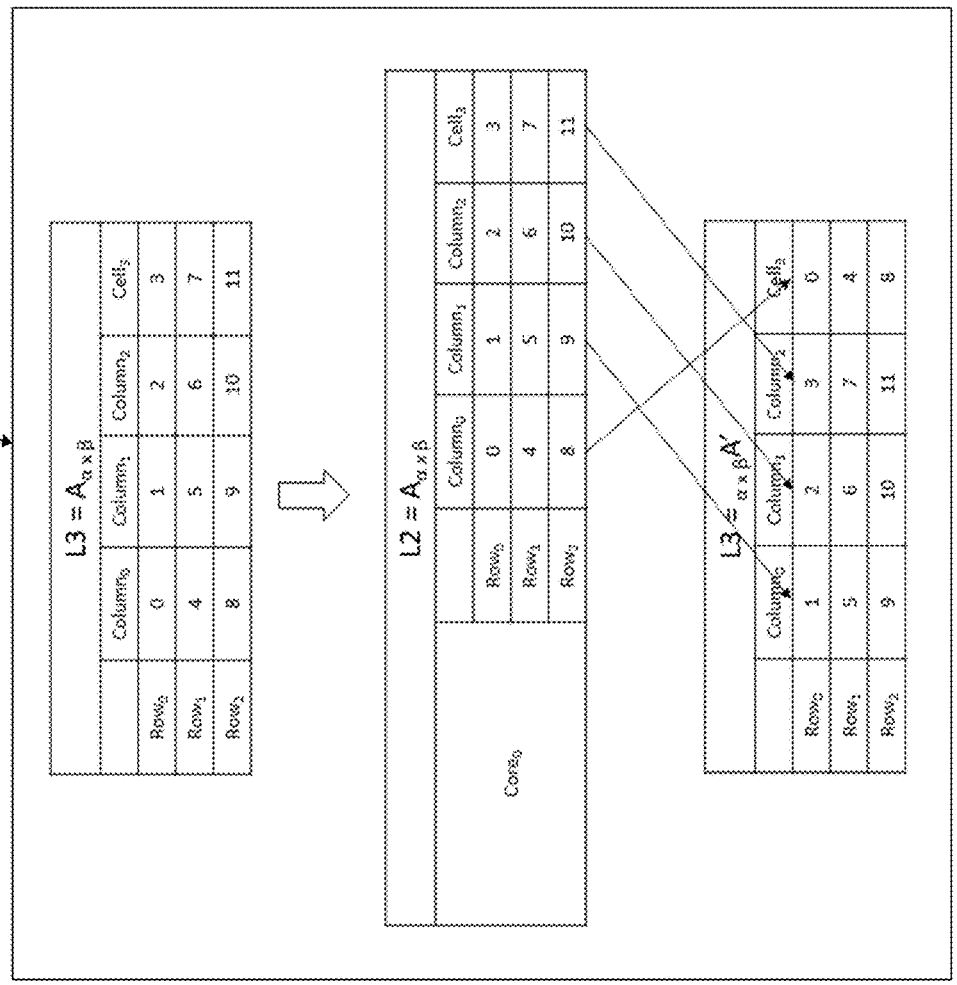
FIG. 27 is a diagram showing an example of core- and cache pointer-assisted two-dimensional left data exchange, in accordance with embodiments of the present invention.

FIG. 27 is a diagram 410 showing an example of a single core- and cache pointer-assisted two-dimensional left data exchange.

FIG. 28 is a diagram 420 showing an example of a multicore- and cache pointer-assisted two-dimensional left data exchange.

Automatic Right Data Exchange Communication Pattern Detection

Figure 29:
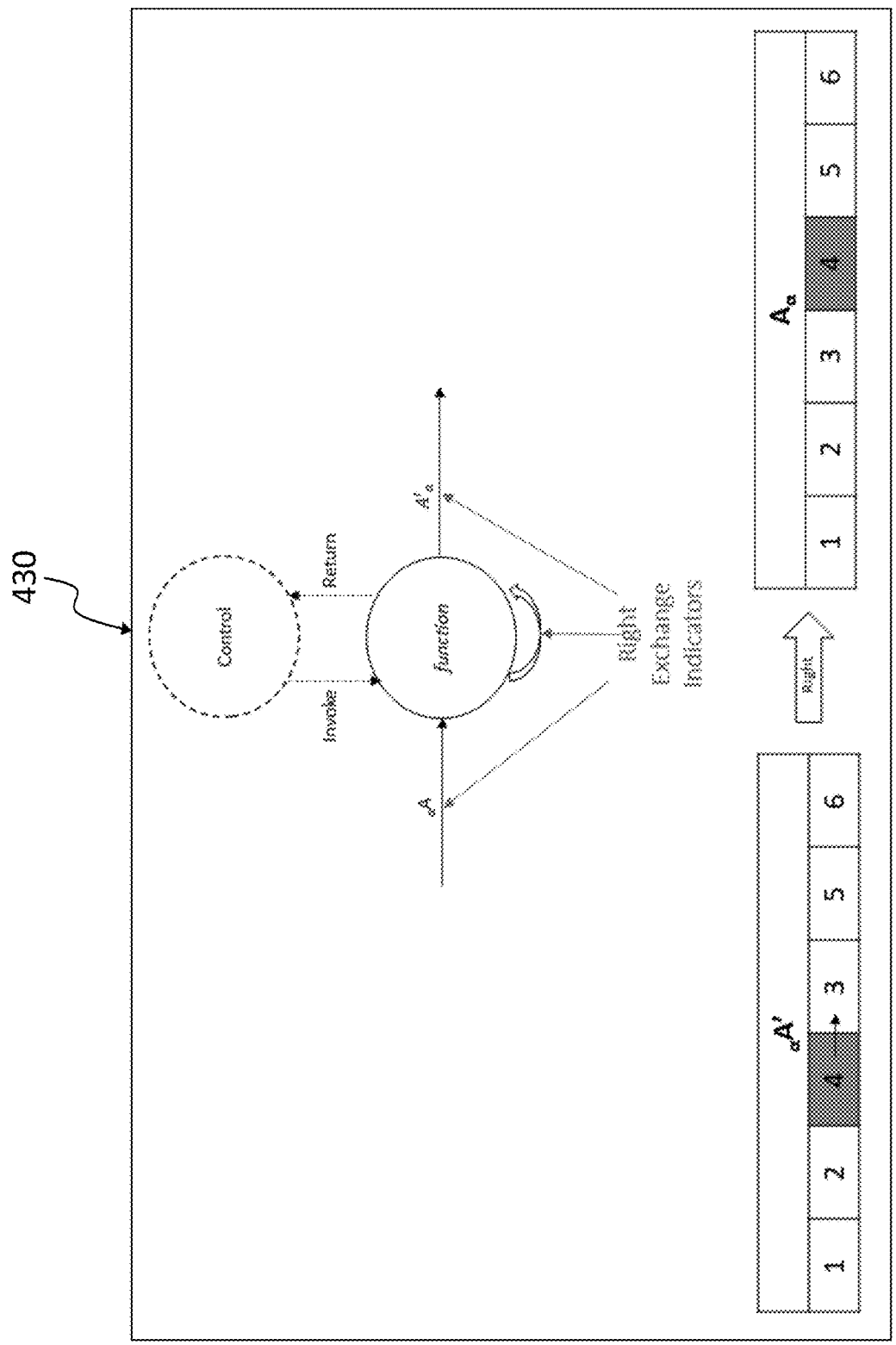
FIG. 29 is a diagram showing an example of right data exchange detection and display on an MPT HFD graph, in accordance with embodiments of the present invention.

FIG. 29 is a diagram 430 showing an example of right data exchange detection and display on an MPT MFD graph. The right data exchange is just the opposite direction of the left data exchange, and the MPT HFD graph notation is similar.

Figure 30:
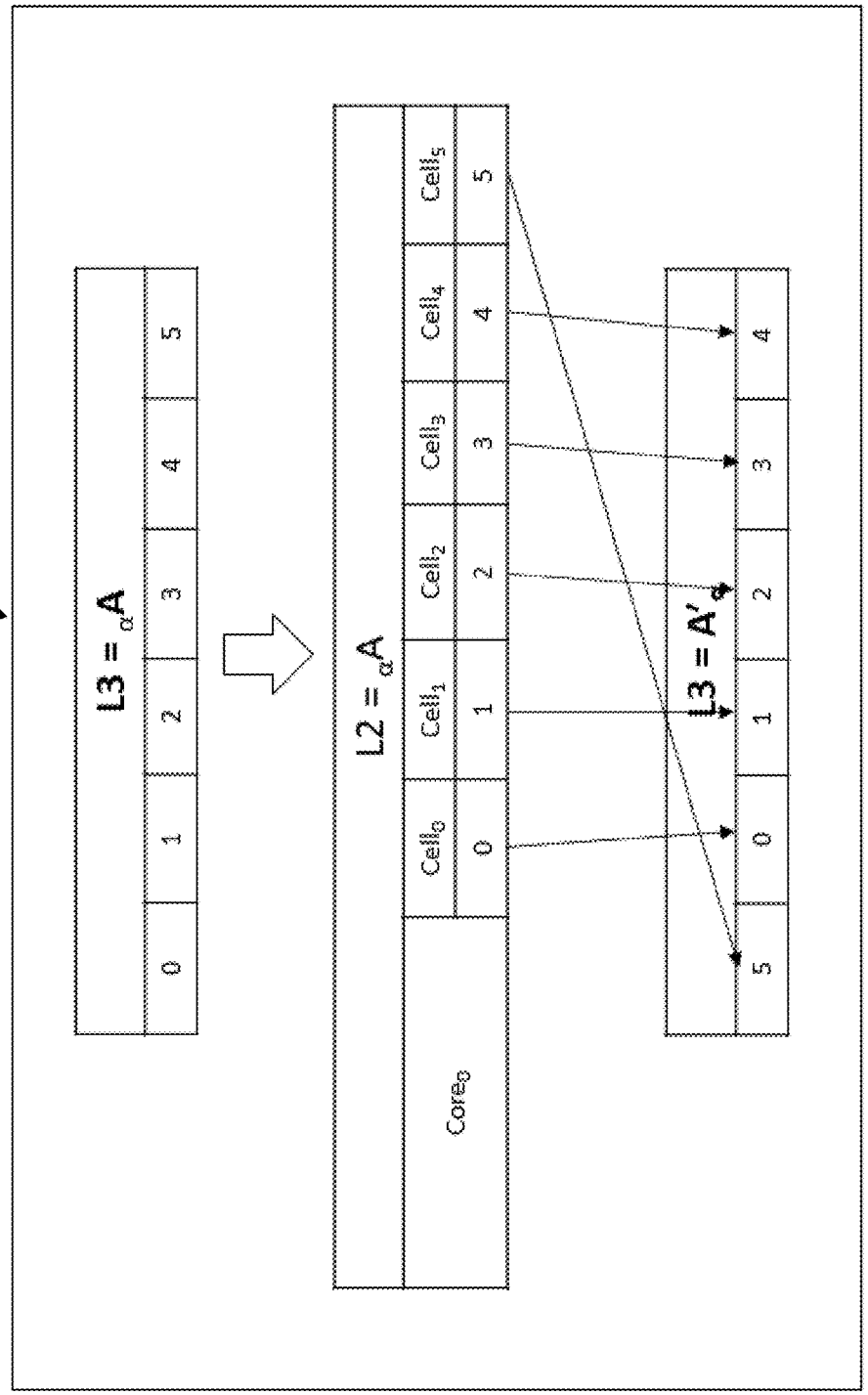
FIG. 30 is a diagram showing an example of core- and cache pointer-assisted one-dimensional right data exchange, in accordance with embodiments of the present invention.

FIG. 30 is a diagram 440 showing an example of a single core- and cache pointer-assisted one-dimensional right data exchange. This exchange can be facilitated by using a core L2 pointer to move the data from L3 to L2 and then L3 back to L2 such that the L3 data is in the correct order.

Figure 31:
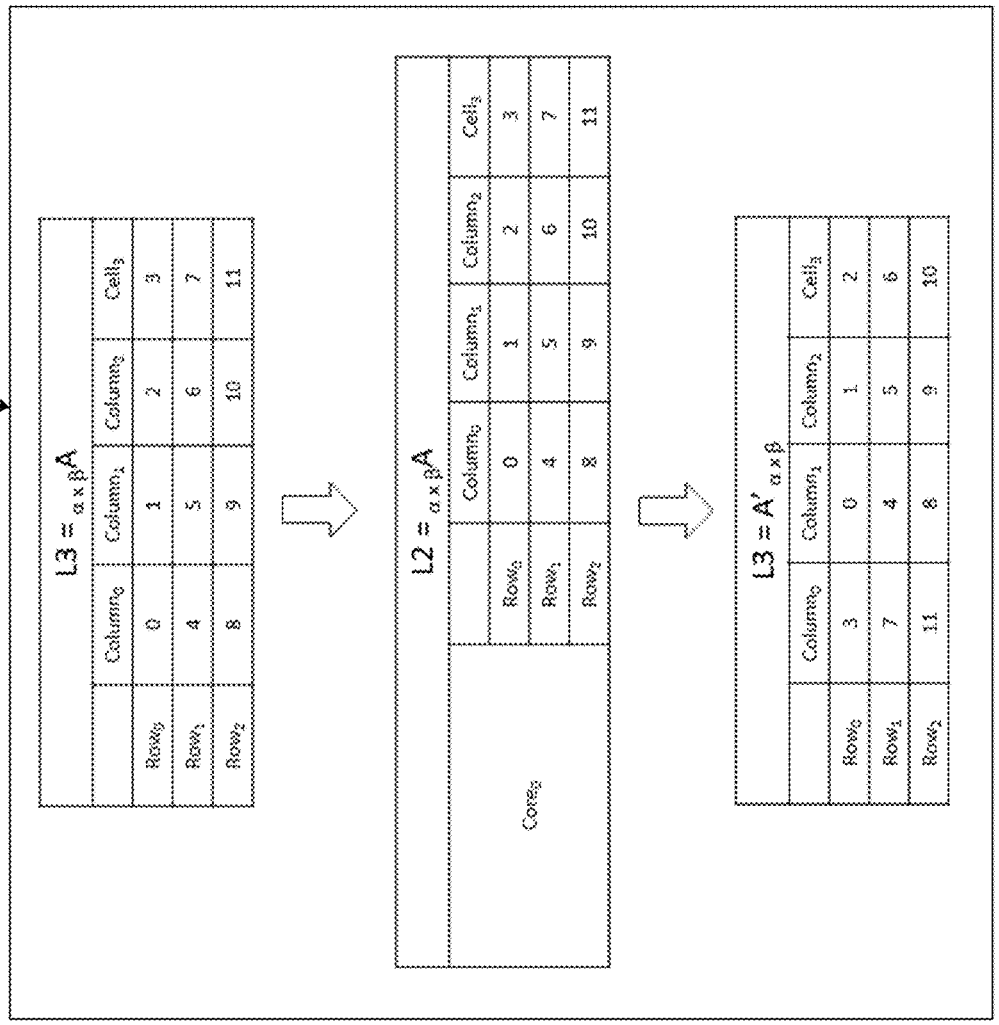
FIG. 31 is a diagram showing an example of core- and cache pointer-assisted two-dimensional right data exchange, in accordance with embodiments of the present invention.

FIG. 31 is a diagram 450 showing an example of a single core- and cache pointer-assisted two-dimensional right data exchange.

FIG. 32 is a diagram 460 showing an example of a multicore- and cache pointer-assisted two-dimensional right data exchange.

Multiple Core Data Sharing Models

There are times when the data that is being processed using a single core must be shared with other cores. Multiple cores in the same processor allow such data sharing to occur efficiently. Various figures show standard communication exchange patterns between cores using cache. Note that data is transmitted from the dark-colored cores to the light-colored cores. If the cores are in a single processor connected using a common L2 cache and if the data to be exchanged resides in L2 cache then the data transfer can take place at L2 cache speeds. Likewise, if the cores share L3 cache and the data to be exchanged resides in L3 cache then the data transfer can take place at L3 cache speeds. Note that both L2 and L3 cache data transfer speeds are much faster than transmitting the data through a switch fabric. Like core-assisted data exchanges, core-to-core data exchanges can take advantage of pre-fetching the data from L3 to L2.

Figure 33:
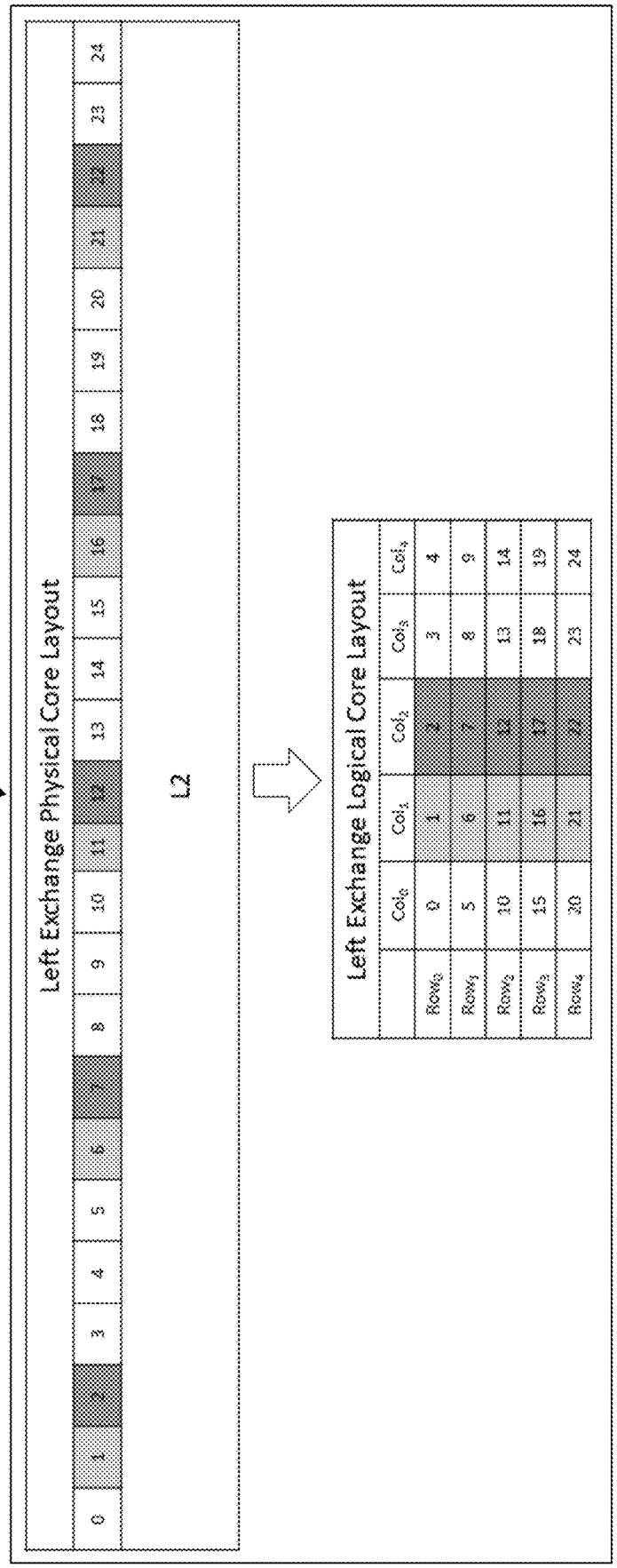
FIG. 33 is a diagram showing an example of two-dimensional multicore left exchange pattern centered on $Column_2$ cores, in accordance with embodiments of the present invention.
Figure 34:
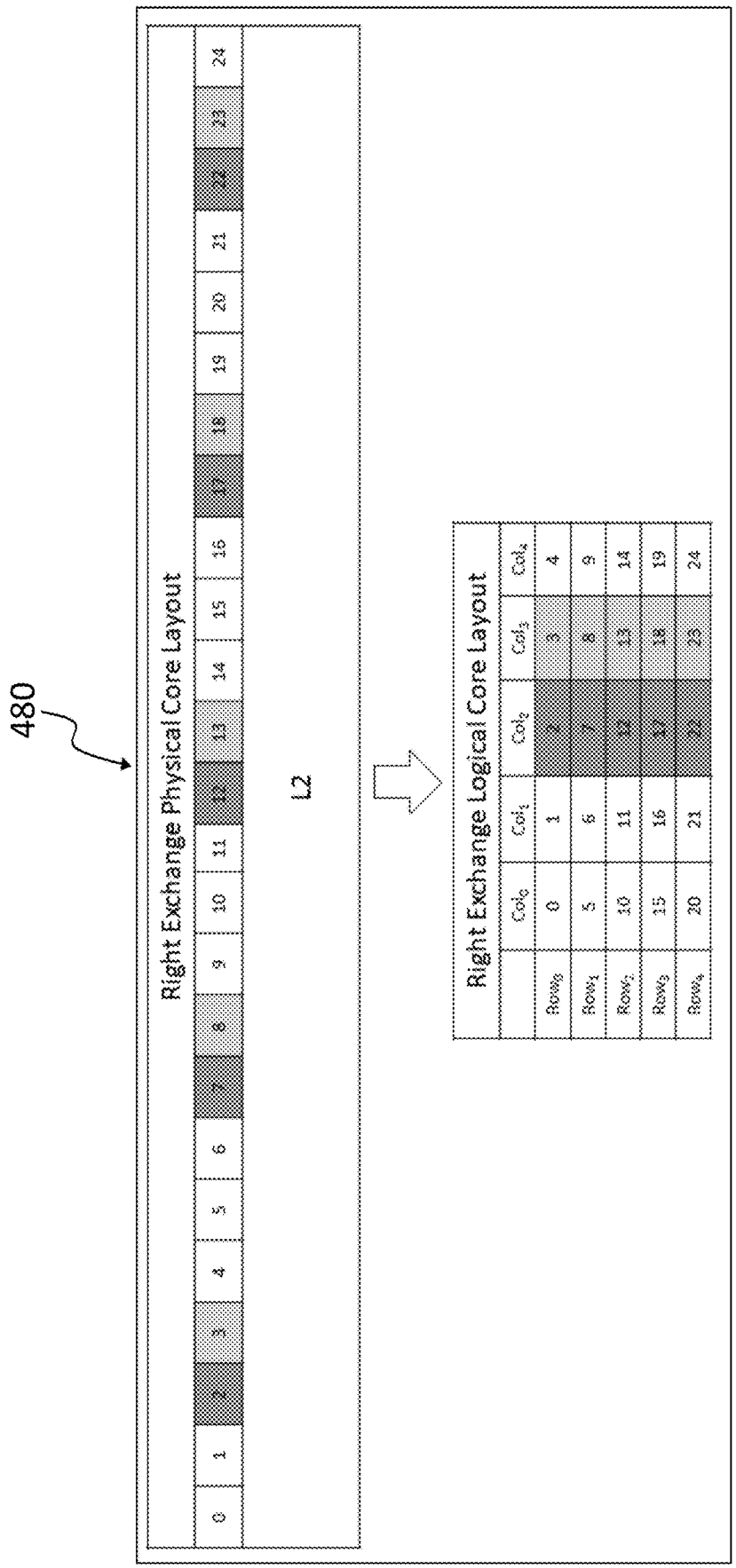
FIG. 34 is a diagram showing an example of two-dimensional multicore right exchange pattern centered on $Column_2$ cores, in accordance with embodiments of the present invention.
Figure 35:
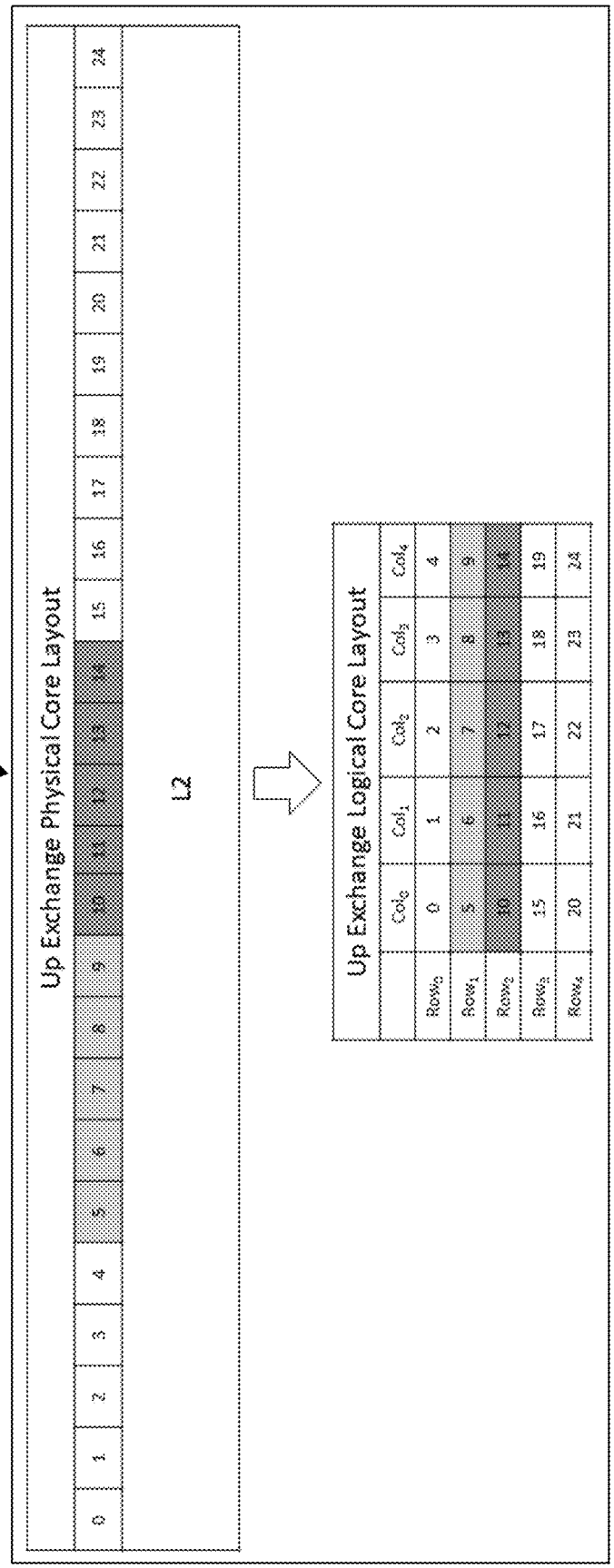
FIG. 35 is a diagram showing an example of two-dimensional multicore up exchange pattern centered on $Row_2$ cores, in accordance with embodiments of the present invention.
Figure 36:
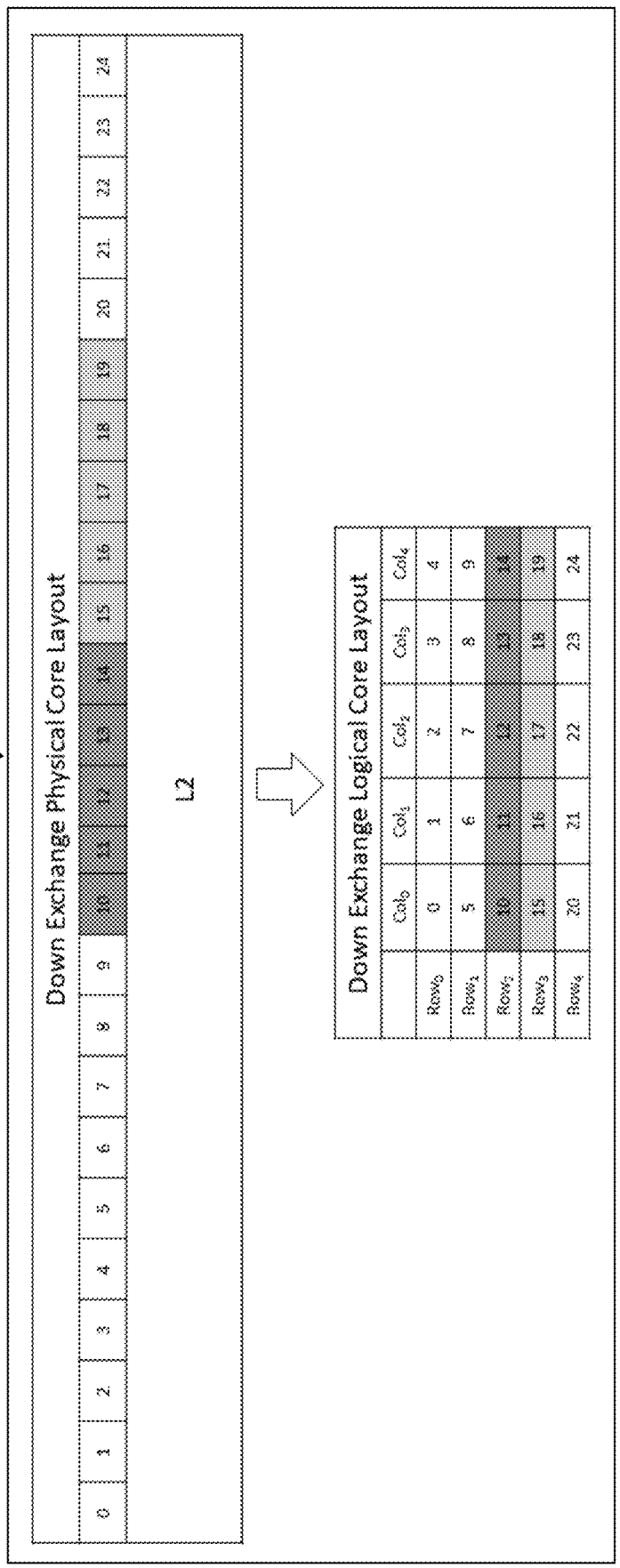
FIG. 36 is a diagram showing an example of two-dimensional down exchange pattern centered on $Row_2$ cores, in accordance with embodiments of the present invention.

FIG. 33 is a diagram 470 showing an example of a two-dimensional multicore left exchange pattern centered on Column2 cores. FIG. 34 is a diagram 480 showing an example of a two-dimensional multicore right exchange pattern centered on Column2 cores. FIG. 35 is a diagram 490 showing an example of a two-dimensional multicore up exchange pattern centered on Row2 cores. FIG. 36 is a diagram 500 showing an example of a two-dimensional down exchange pattern centered on Row2 cores.

The multicore next neighbor and its relative the next-n-neighbor exchange can be thought of as broadcast exchanges. As such, both can be used as the scatter exchange. If the direction of data movement is reversed then it can be used as a gather exchange. In an all-to-all exchange, every participating core scatters its data to all other participating cores and gathers the data from all other cores.

Figure 37:
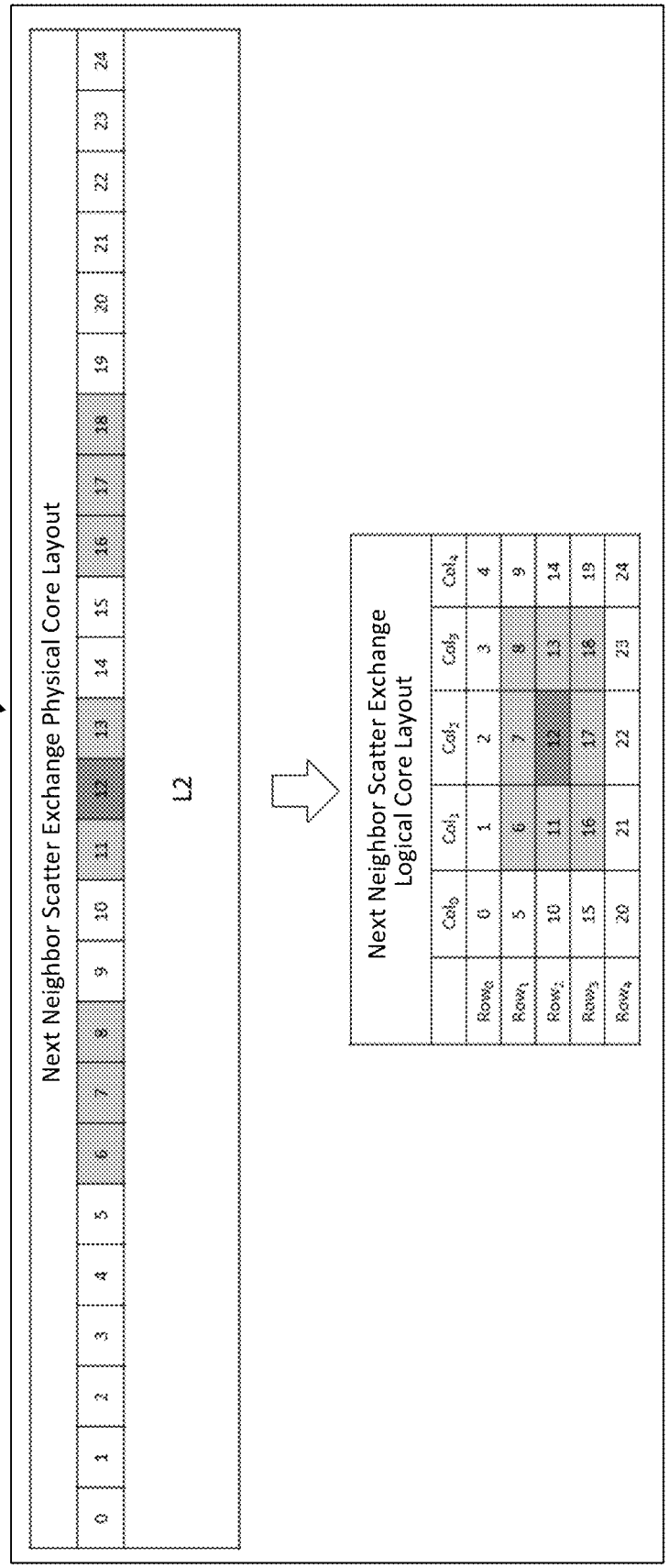
FIG. 37 is a diagram showing an example of two-dimensional multicore next neighbor scatter exchange pattern centered on core 12, in accordance with embodiments of the present invention.
Figure 38:
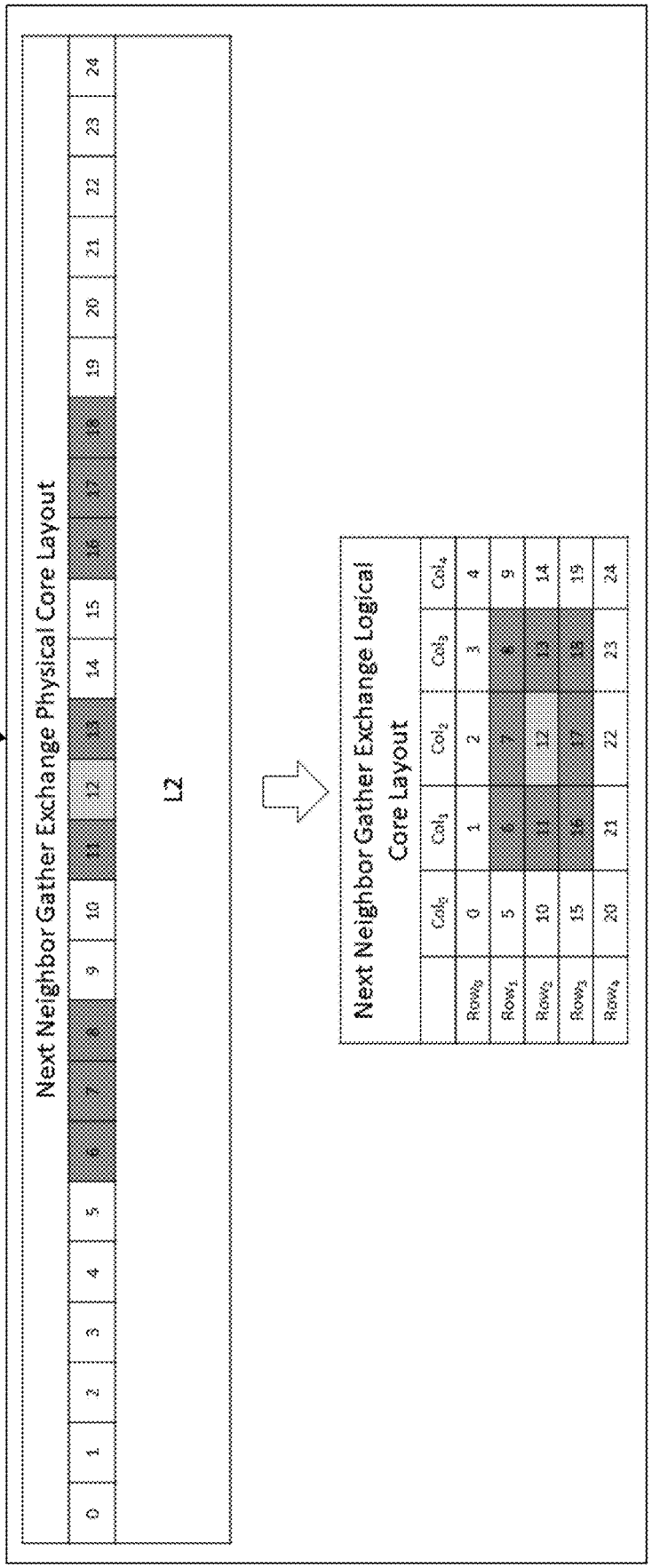
FIG. 38 is a diagram showing an example of two-dimensional multicore next neighbor gather exchange pattern, with n=2 centered on core 12, in accordance with embodiments of the present invention.
Figure 39:
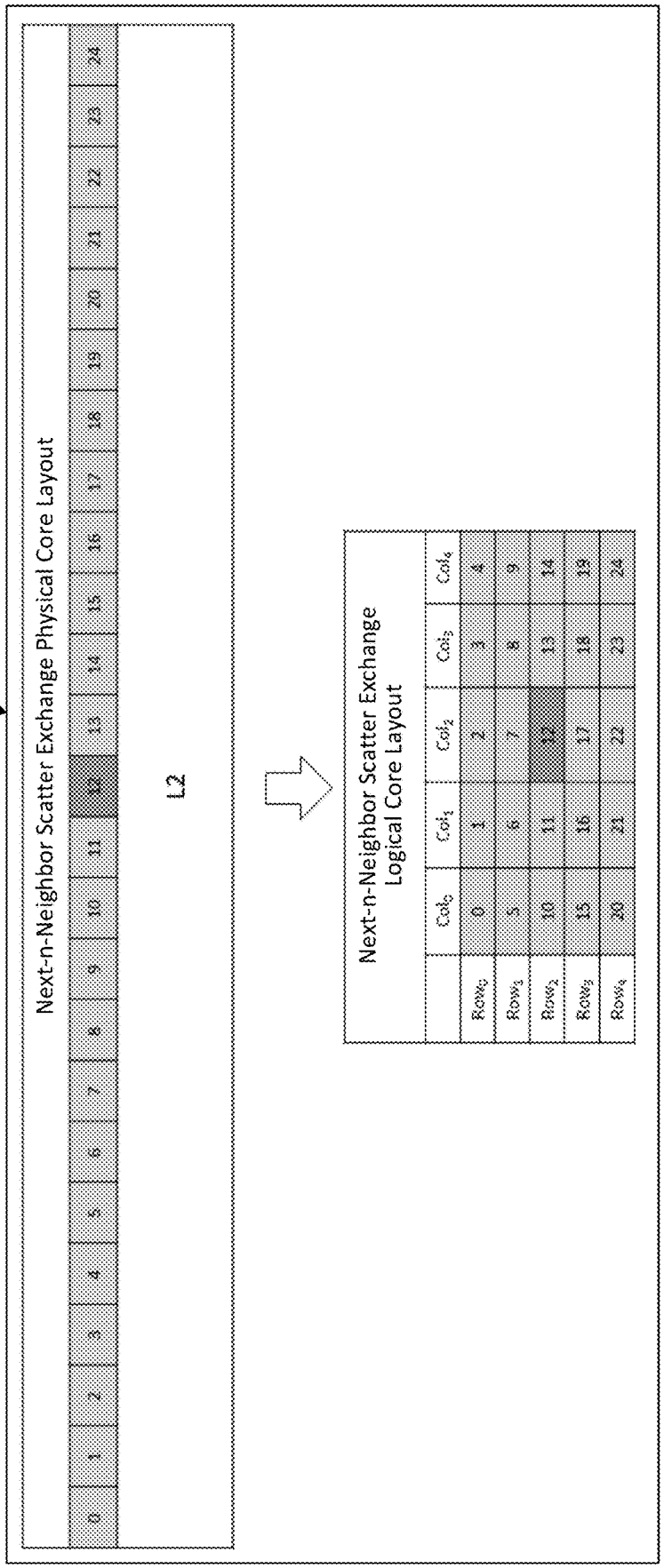
FIG. 39 is a diagram showing an example of two-dimensional multicore next-n-neighbor scatter exchange pattern, with n=2 centered on core 12, in accordance with embodiments of the present invention.
Figure 40:
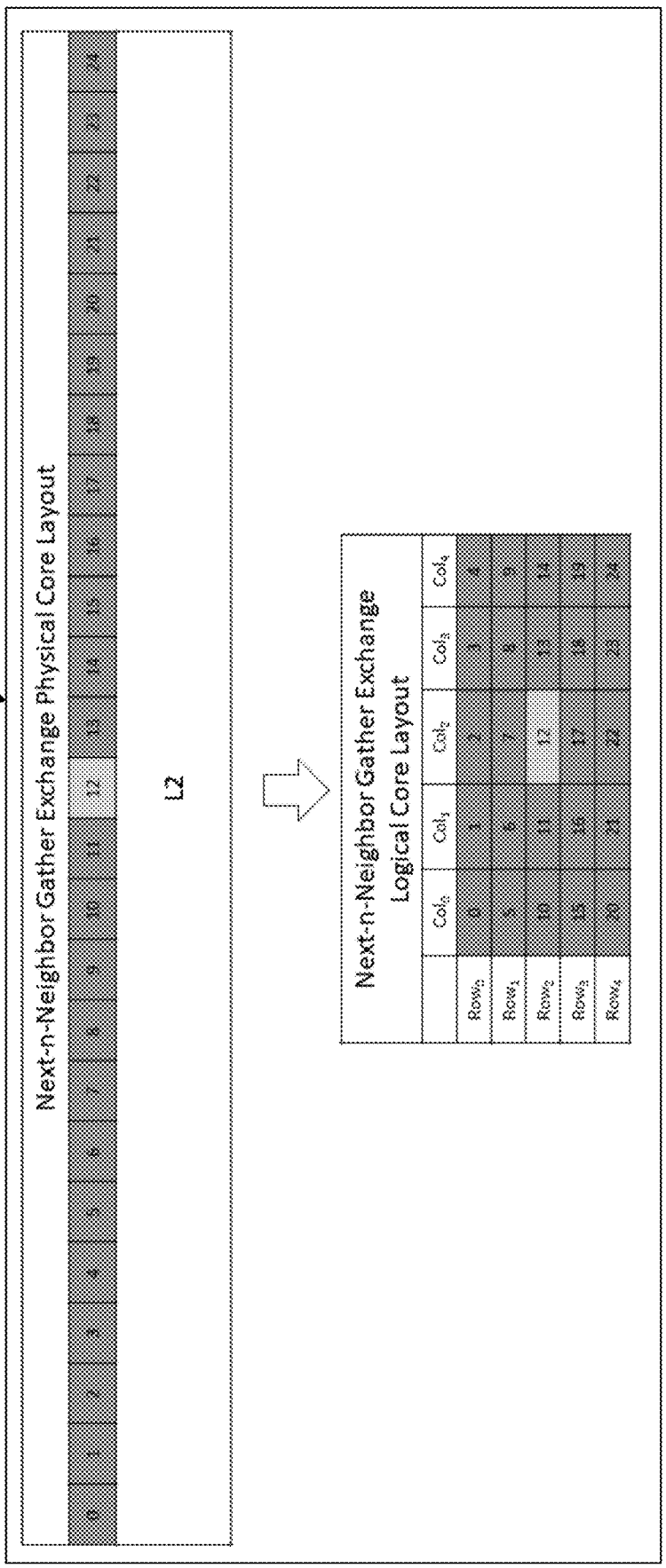
FIG. 40 is a diagram showing an example of two-dimensional multicore next-n-neighbor gather exchange pattern, with n=2 centered on core 12, in accordance with embodiments of the present invention.
Figure 41:
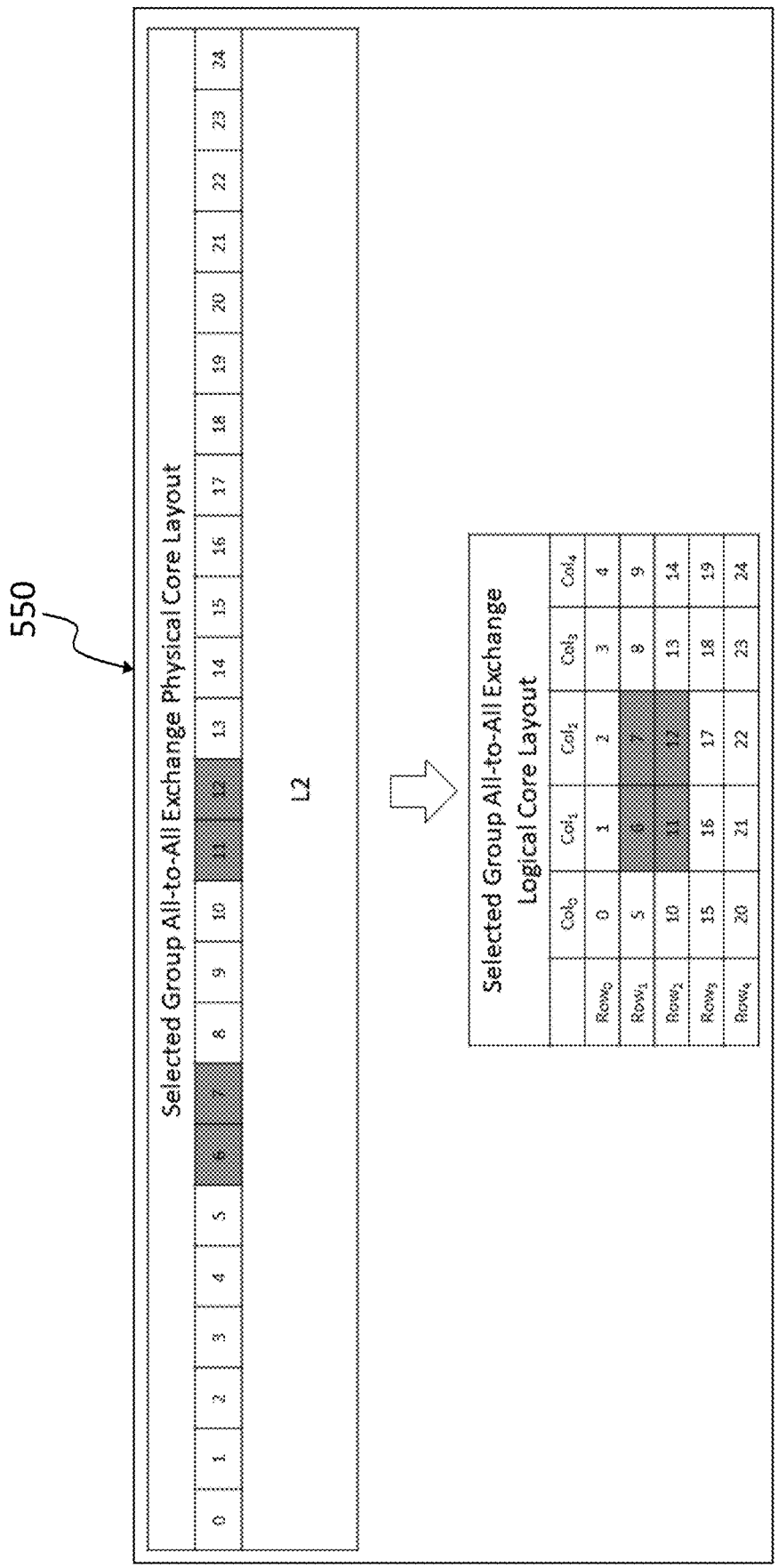
FIG. 41 is a diagram showing an example of two-dimensional multicore grouped all-to-all exchange pattern, centered on core 6, core 7, core 11, and core 12, in accordance with embodiments of the present invention.

FIG. 37 is a diagram 510 showing an example of a two-dimensional multicore next neighbor scatter exchange pattern centered on core 12. FIG. 38 is a diagram 520 showing an example of a two-dimensional multicore next neighbor gather exchange pattern, with n=2 centered on core 12. FIG. 39 is a diagram 530 showing an example of a two-dimensional multicore next-n-neighbor scatter exchange pattern, with n=2 centered on core 12. FIG. 40 is a diagram 540 showing an example of a two-dimensional multicore next-n-neighbor gather exchange pattern, with n=2 centered on core 12. FIG. 41 is a diagram 550 showing an example of a two-dimensional multicore grouped all-to-all exchange pattern, centered on core 6, core 7, core 11, and core 12.

Quantifying Input/Output Data Movement Time Cost

It is well understood that the system inputting large datasets takes time that is proportional to the input dataset size and the number of input channels available. The time it takes for large-scale data movements into and out of the system needs to be quantified. As has been shown for looping structures, it is possible to generate a time prediction polynomial as long as time changes monotonically with a monotonic change in dataset size. This requirement is generally met with input and output data movements. Instead of measuring either the processing time from the start of a looping structure's processing until its completion or the processing performance of a pathway once the data is available, we can instead measure the data movement from when input begins until processing starts or from when processing ends until data movement completes. Given that only the cost of data movement is overhead, overlapped input and output with processing can be ignored. Note the number of communication channels available decreases the input and/or output data movement cost. There are three input/output timing periods:

1) Start of input data movement until data processing begins
2) End of data processing until the end of output data movement
3) Start of input data movement until data processing begins plus the end of data processing until the end of output data movement Calculation of Input Overhead Time   Equation 24

$$I_T \text{seconds} = T\left(\frac{d_{new}}{\frac{d_{min}}{c_I}}\right) \times t_{min} \text{seconds}$$

Where $c_I$ = Number of input data channels

Calculate Output Overhead Time   Equation 25

$$O_T \text{seconds} = T\left(\frac{d_{new}}{\frac{d_{min}}{c_O}}\right) \times t_{min} \text{seconds}$$

Where $c_O$ = Number of output data channels

-continued $$IO_T \text{seconds} = T\left(\frac{d_{new}}{\frac{d_{min}}{c_I}}\right) \times t_{min} \text{seconds} + T\left(\frac{d_{new}}{\frac{d_{min}}{c_O}}\right) \times t_{min} \text{seconds} \quad \text{Equation 26}$$

Automatic, Dynamic Loop Unrolling for Multicore Parallelism

The standard technique for producing parallel code when there are loops in the source code is loop unrolling. Consider (from Looped Pathway Profiling to Determine $T_y($ ) herein) that component pathways from MPT HFD graphs have the input variable attributes that change loop iterations associated with them. Further consider (from Maximum Pathway Speedup herein) that the maximum number of processing elements is given by the scaled input dataset size $$n = \frac{d_{input}}{d_n} = \frac{d_1}{d_n}$$

and $d_n$ is defined when the time complexity polynomial is generated. Also consider (from Multiple Input Variable Attribute Advanced Time Complexity herein) that it is possible to calculate either the processing time or the number of loop iterations given some set of input variable attribute values that affect loop iterations.

It is possible to change pathways such that the number of parallel pathways can automatically vary in response to the input variable attributes that affect loop iteration changes.

Figure 42:
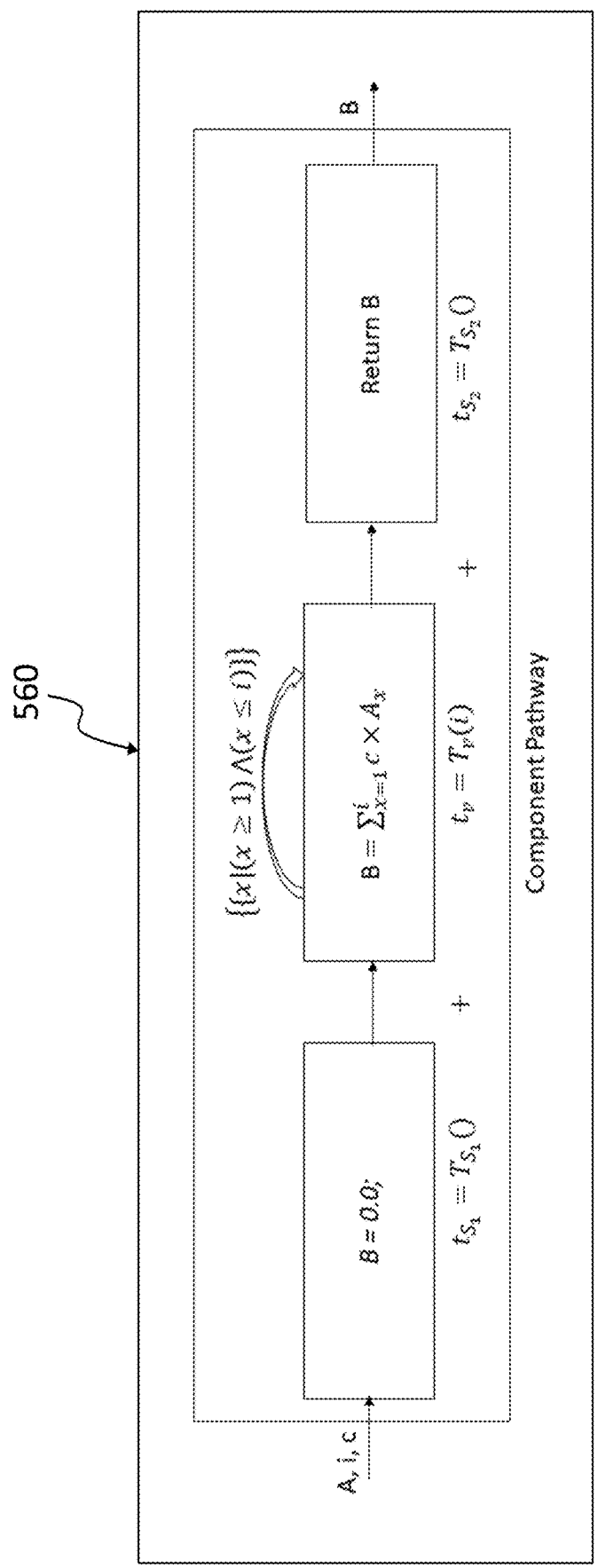
FIG. 42 is a diagram showing an example of a pathway with loop and input variable attributes with variable time, in accordance with embodiments of the present invention.

FIG. 42 is a diagram 560 showing an example of a simple pathway with a single looping structure, a single input variable attribute that affects the number of loop iterations, "i", and the associated advanced time complexity polynomial. This pathway example can automatically be parallelized using the techniques of this invention.

Figure 43:
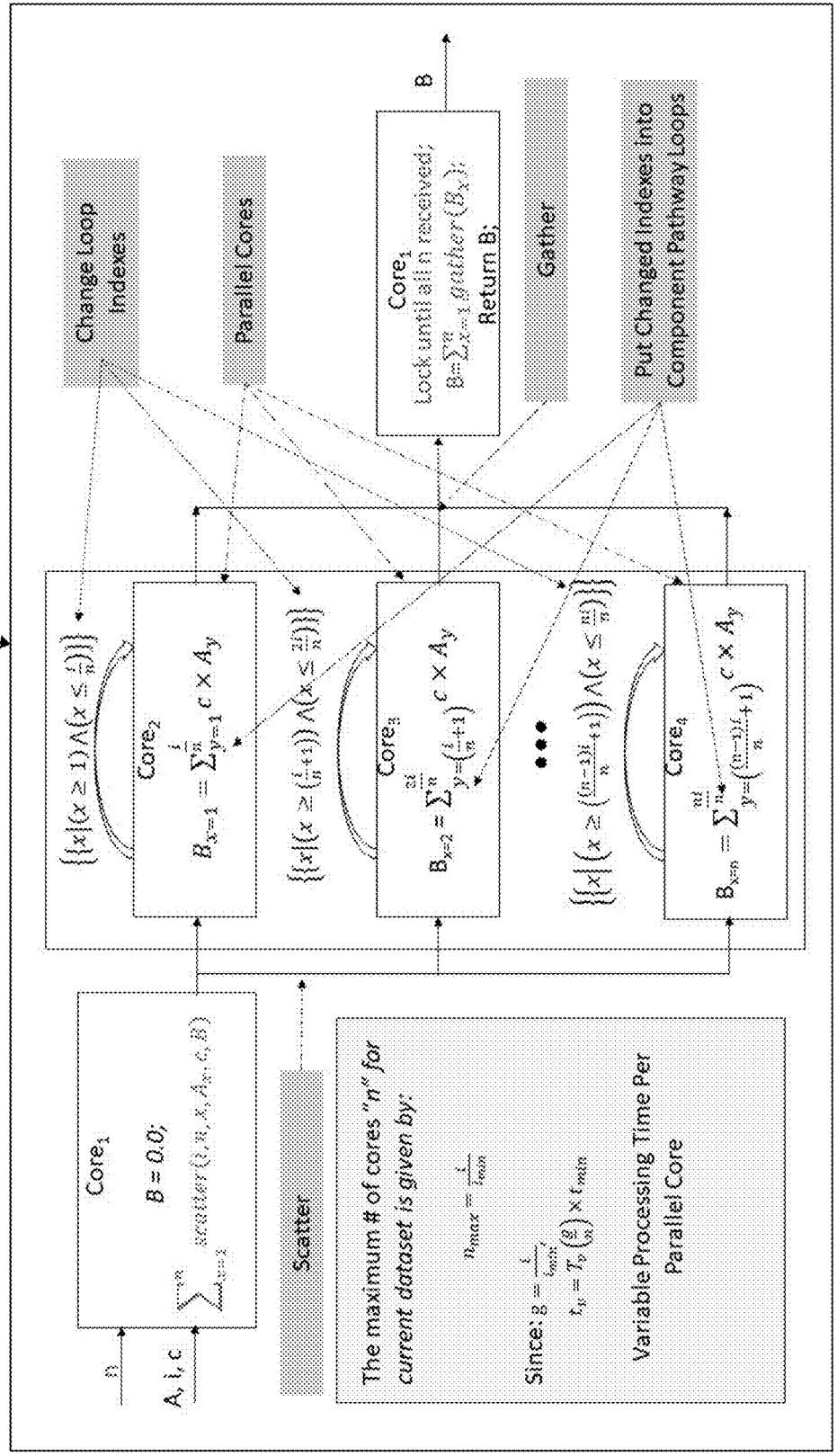
FIG. 43 is a diagram showing an example of dynamic core count loop parallelization depicted as an expanded annotated component pathway, in accordance with embodiments of the present invention.

FIG. 43 is a diagram 570 showing an example of dynamic core count loop parallelization depicted as an expanded annotated component pathway. A thread lock is installed in Core₁ at the gathering point, which is the only location required for a thread lock.

Figure 44:
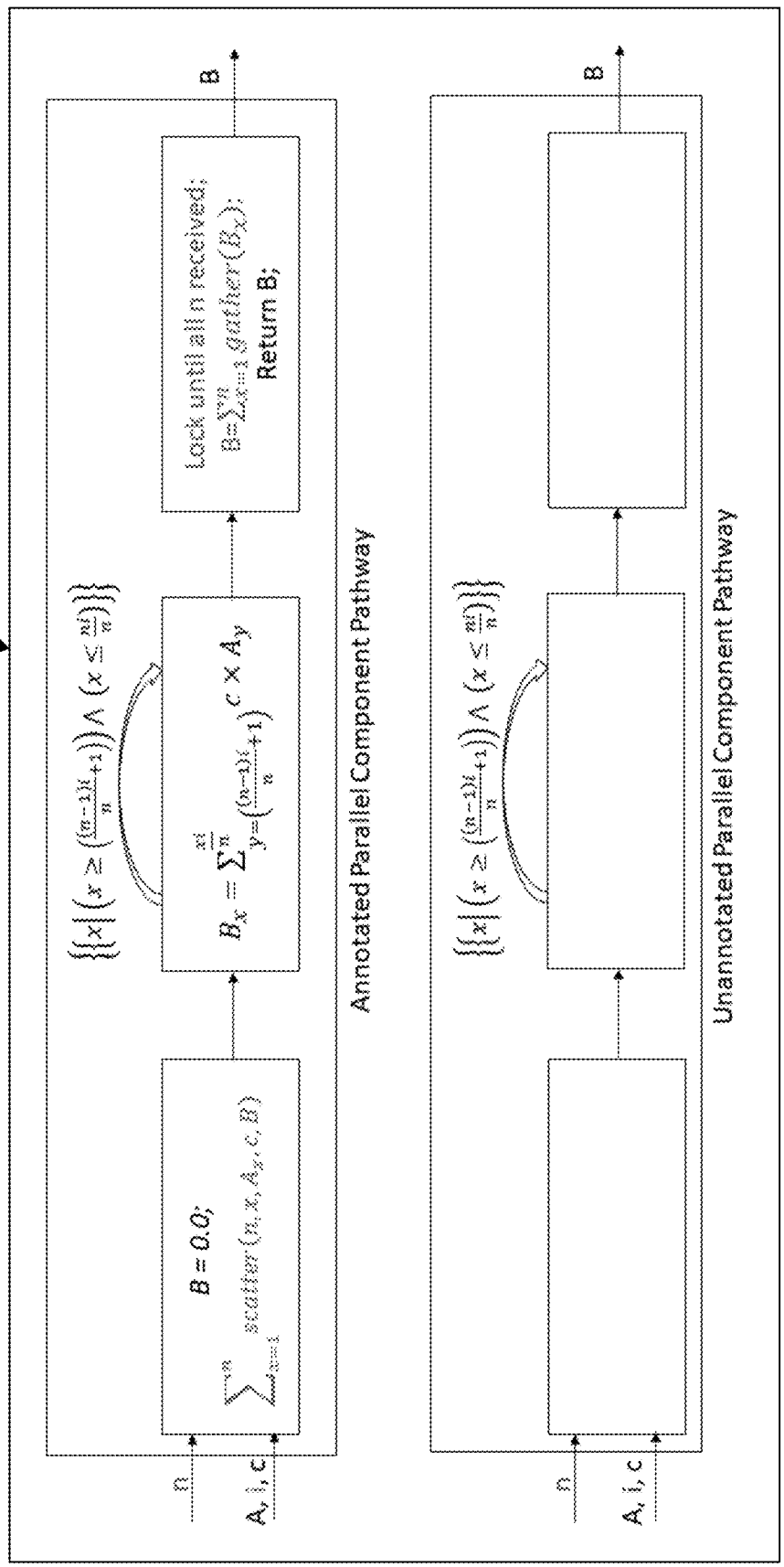
FIG. 44 is a diagram showing an example of dynamic core count loop parallelization depicted as both unexpanded annotated and unannotated component pathways, in accordance with embodiments of the present invention.

FIG. 44 is a diagram 580 showing an example of dynamic core count loop parallelization depicted as both unexpanded annotated and unannotated component pathways. The dynamic loop parallel pathway does not have to be expanded to show the cores. Instead, it can be depicted without the core layout.

The looping structure can be changed to iterate from different starting values to different ending values, thus changing the total number of loop iterations. This allows the looping structure to be processed using different numbers of cores. By being able to change the loop indexes to conform to a given number cores based on the input variable attribute values and the known maximum number of cores possible that will continue to scale, one set of code can be used with different numbers of cores.

Figure 45:
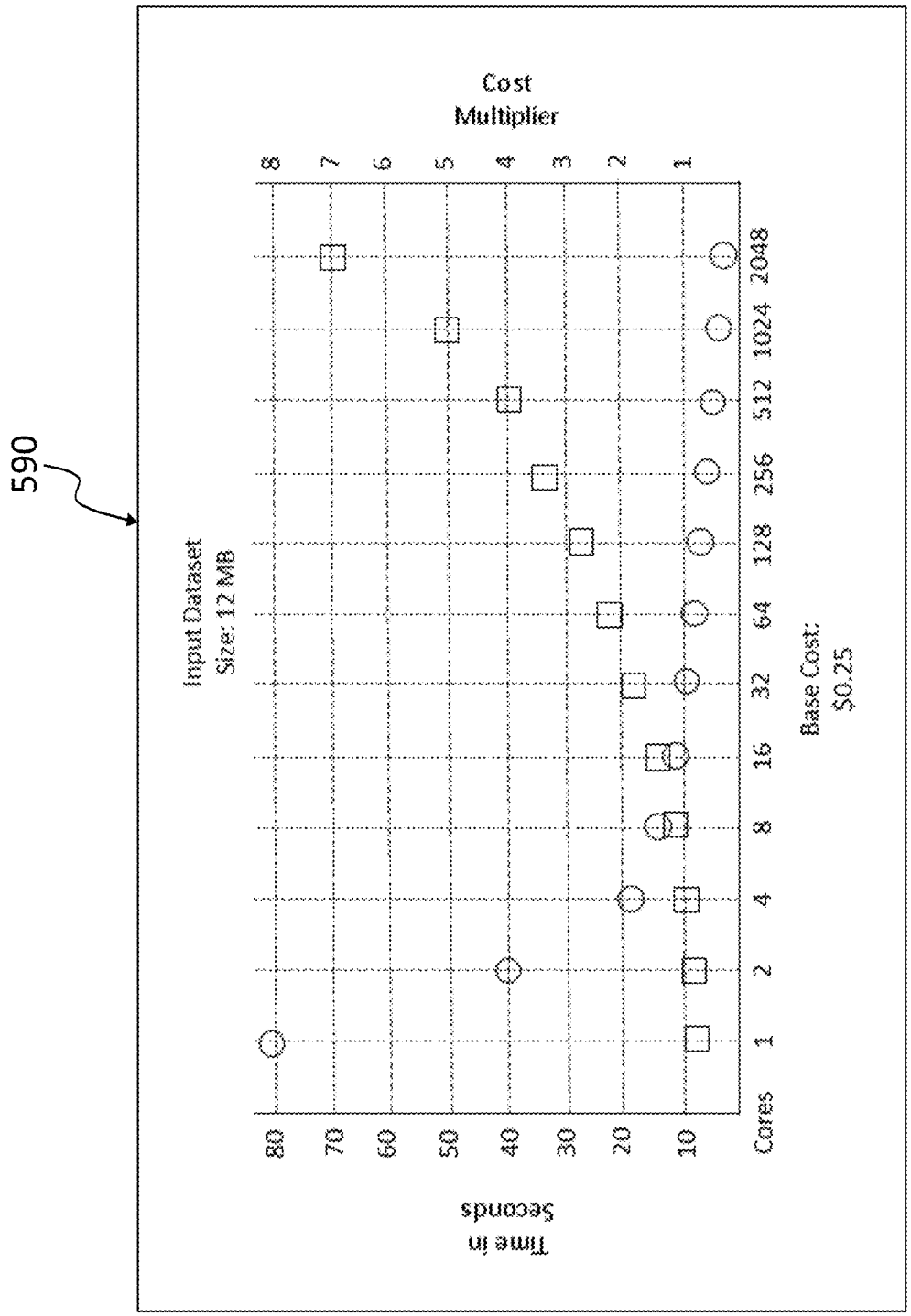
FIG. 45 is an example a price performance graph, in accordance with embodiments of the present invention.

FIG. 45 is an example 590 price performance graph. Since the processing time for some set of input variable attribute values and the number of parallel cores can be calculated dynamically, a performance graph can be generated with attached pricing per job to be performed. This capability can be combined with those taught in U.S. Pat. No. 8,108,512, which is fully incorporated herein by reference, to dynamically show and charge for increased performance.

Figure 46:
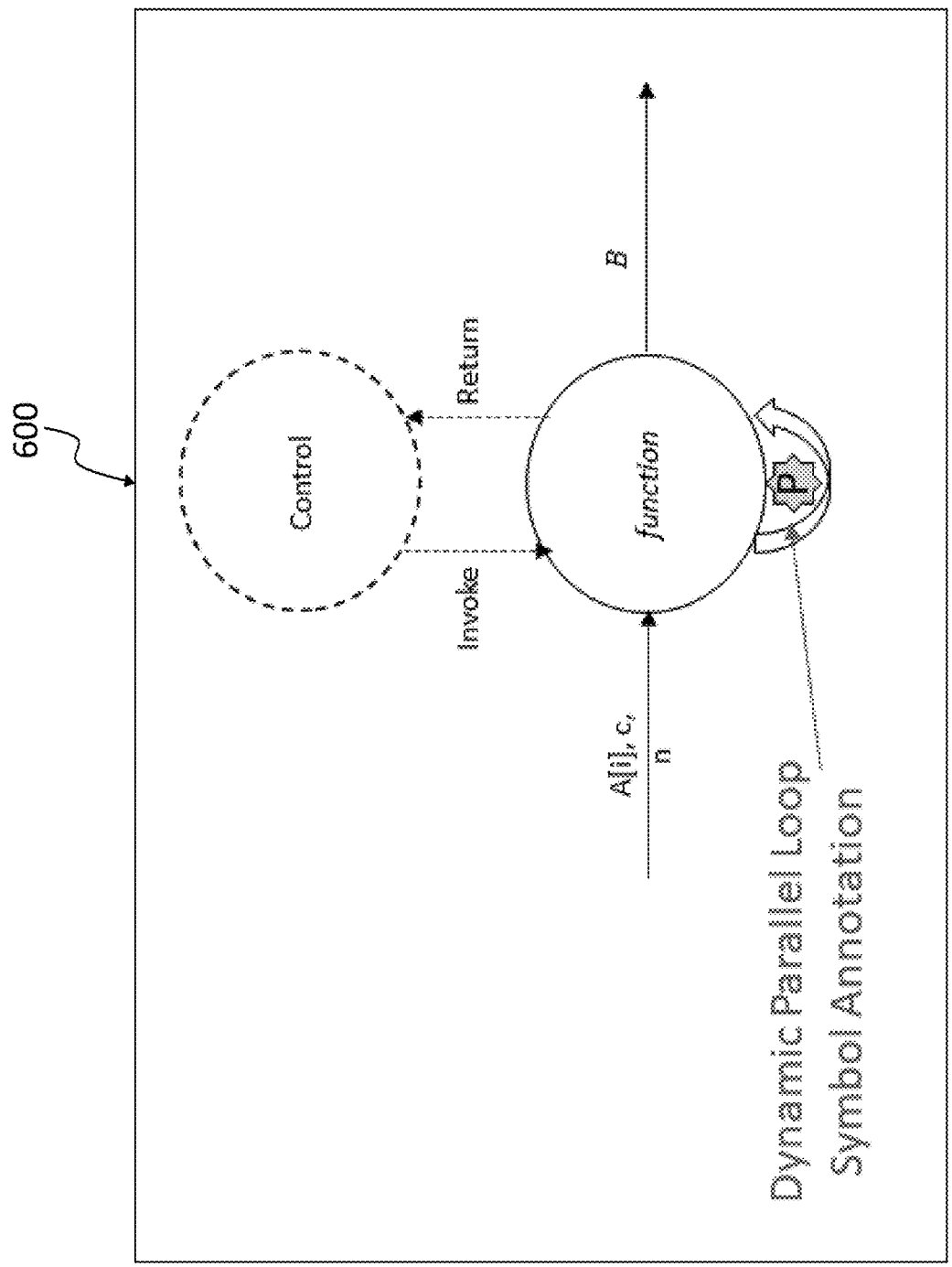
FIG. 46 is a diagram showing an example of MPT HFD graph parallel loop symbol annotation, in accordance with embodiments of the present invention.

FIG. 46 is a diagram 600 showing an example of MPT HFD graph parallel loop annotation. The MPT HFD graph's high level design components can be annotated to indicate where parallelism in the design can be found.

Parallel Pathway Power Consumption Prediction

In the serial processing regime, a pathway with O(n) performance uses far less power than another pathway with $O(n^2)$ performance. Because Amdahl's law predicts, at best, linear performance gains from parallel processing then the power consumption disparity at best remains the same in the parallel regime. Since it is known that the performance in the parallel regime can be a function of advanced time complexity, which can give linear, sublinear, or super-linear performance, it is possible for a slower serial pathway to have an advantage over a faster serial pathway when both are executed in the parallel regime. In line with the performance gains, there can be an associated linear, sublinear, or super-linear power consumption gain. Since power (in watts, W) equals the number of joules per second, the average processing power consumption under computational load for the current number of processing elements, n, whose total power consumption is P joules per second gives (from equations 7, 8, and 9):

Average Parallel Component Pathway Energy Consumption        Equation 27

$$W = T_v\left(\frac{\left(\frac{a_1}{a_{min}}\right)}{n}\right) \times t_{min} \times P\frac{\text{joules}}{\text{second}}$$

Figure 47:
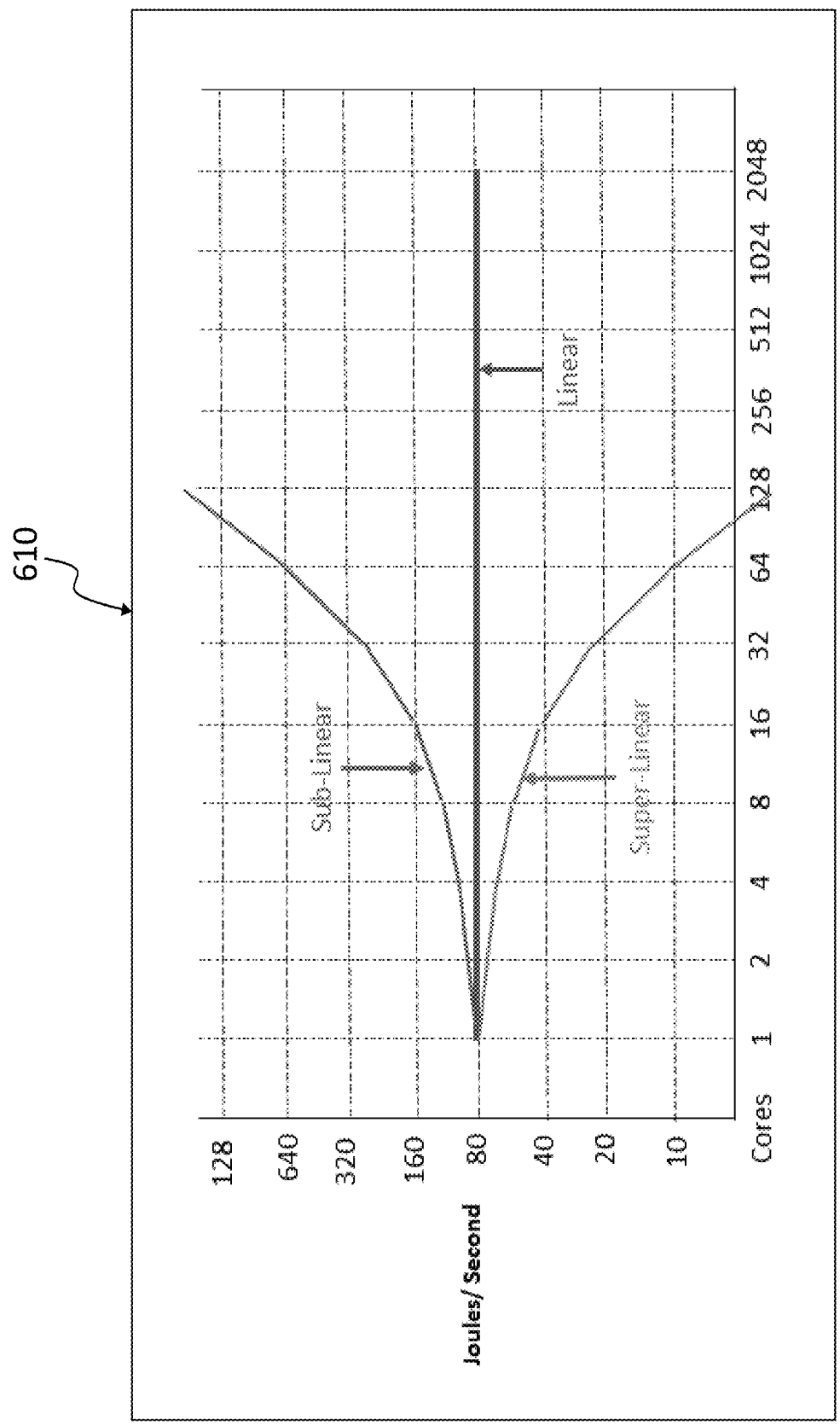
FIG. 47 is an example pathway power consumption comparison graph, in accordance with embodiments of the present invention.

FIG. 47 is an example of a pathway power consumption graph 610 showing linear, sublinear, superlinear power consumption.

Figure 48:
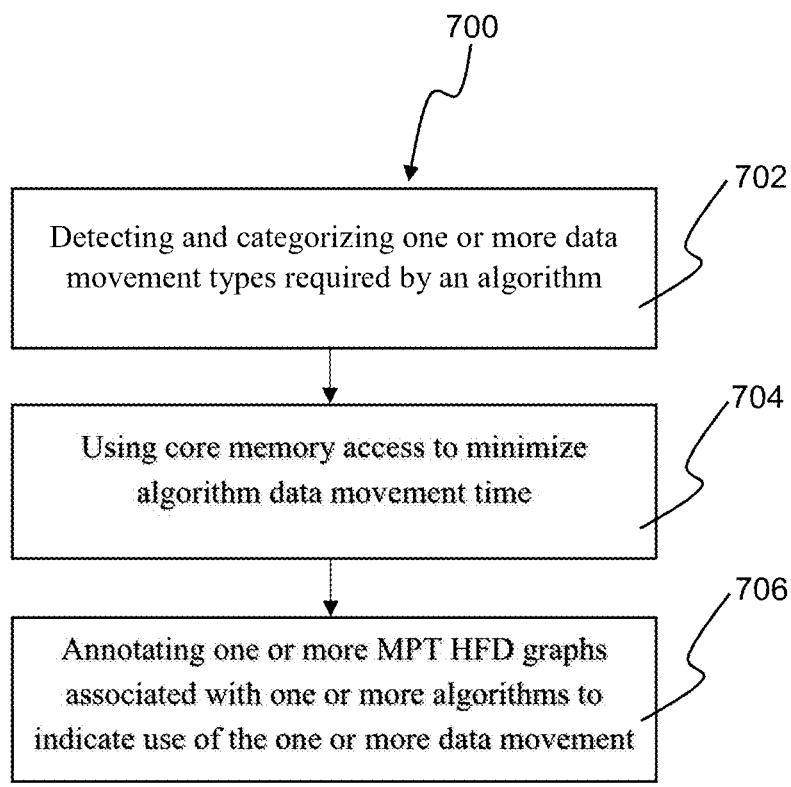
FIG. 48 shows a flow chart of an example software system and method of using inherent access to cache memory of one or more associated processing cores, in accordance with embodiments of the present invention.

Referring to FIG. 48, with this and other concepts, systems, and methods of the present invention, software systems and methods 700 of using inherent access to cache memory of one or more associated processing cores comprise detecting and categorizing one or more data movement types required by an algorithm (step 702), using core memory access to minimize algorithm data movement time (step 704), and annotating one or more MPT HFD graphs associated with one or more algorithms to indicate use of the one or more data movement types (step 706). One or more computing devices can include a program code stored in memory, wherein one or more processors or processing elements can execute the program code to perform all of the actions, steps, and methods described above, below, or otherwise herein.

In various embodiments, the method further comprises converting one or more elements of the annotated one or more MPT HFD graphs to a detailed software design.

In various embodiments, the detailed software design comprises one or more associated source codes and one or more associated component pathways.

In various embodiments, the one or more associated component pathways comprise one or more order irrelevant pathways.

In various embodiments, two or more of the one or more irrelevant pathways are serially linked in time.

In various embodiments, the method further comprises detecting left data exchange and displaying notation of the left data exchange on the one or more MPT HFD graphs.

In various embodiments, the method further comprises detecting right data exchange and displaying notation of the right data exchange on the one or more MPT HFD graphs.

In various embodiments, the method further comprises annotating parallel loop indication on the one or more MPT HFD graphs.

In various embodiments, the one or more data movement types comprise physical data movement.

In various embodiments, the one or more data movement types comprise transposition without physically moving data elements.

Figure 49:
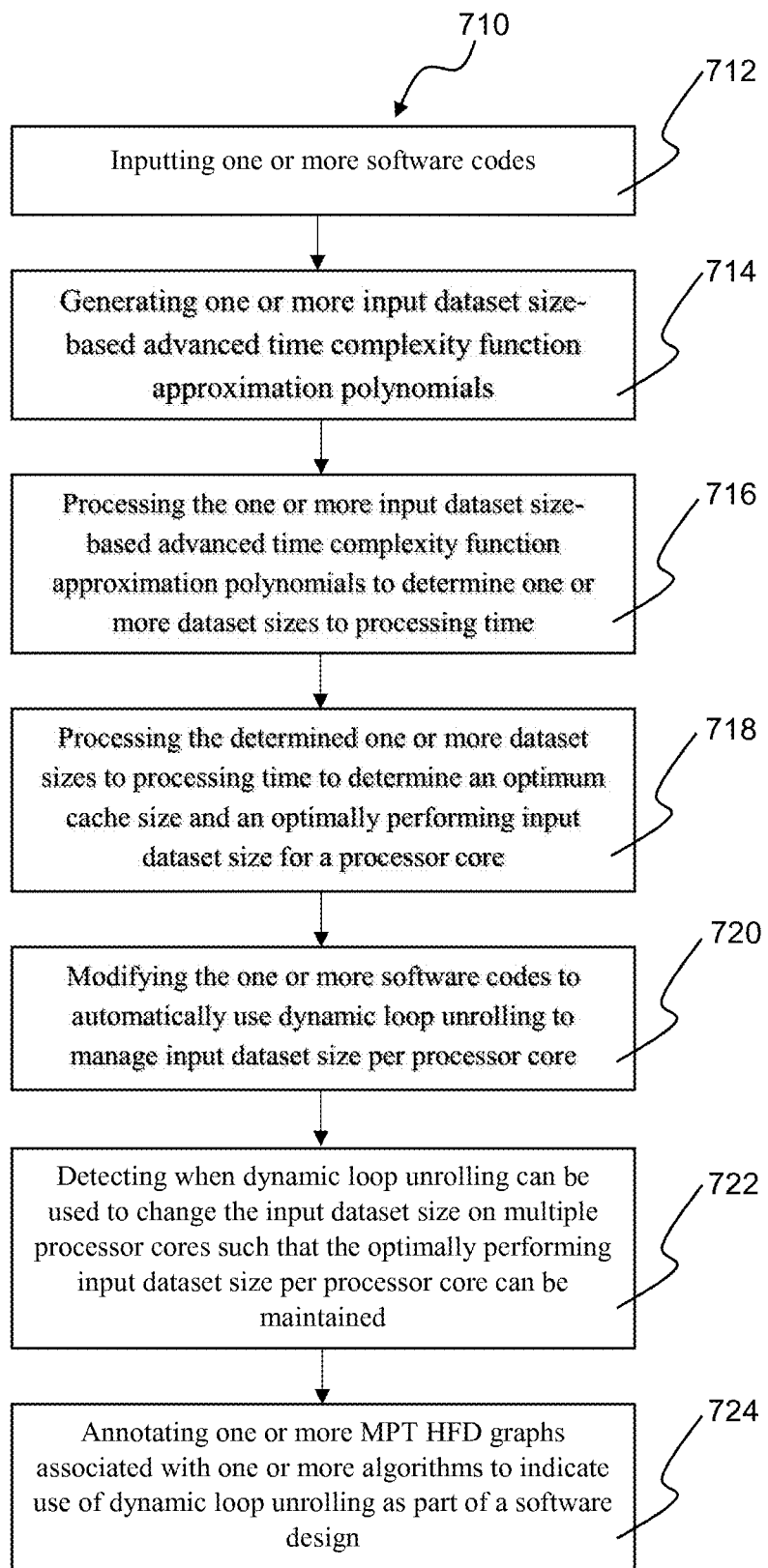
FIG. 49 shows a flow chart of an example software system and method of managing cache memory allocation per algorithm for optimum algorithm performance, in accordance with embodiments of the present invention.

Referring to FIG. 49, with this and other concepts, systems, and methods of the present invention, software systems and methods 710 of managing cache memory allocation per algorithm for optimum algorithm performance comprise inputting one or more software codes (step 712), generating one or more input dataset size-based advanced time complexity function approximation polynomials (step 714), processing the one or more input dataset size-based advanced time complexity function approximation polynomials to determine one or more dataset sizes to processing time (step 716), processing the determined one or more dataset sizes to processing time to determine an optimum cache size and an optimally performing input dataset size for a processor core (step 718), modifying the one or more software codes to automatically use dynamic loop unrolling to manage input dataset size per processor core (step 720), detecting when dynamic loop unrolling can be used to change the input dataset size on multiple processor cores such that the optimally performing input dataset size per processor core can be maintained (step 722), and annotating one or more MPT HFD graphs associated with one or more algorithms to indicate use of dynamic loop unrolling as part of a software design (step 724). One or more computing devices can include a program code stored in memory, wherein one or more processors or processing elements can execute the program code to perform all of the actions, steps, and methods described above, below, or otherwise herein.

In various embodiments, the software design comprises one or more associated source codes and one or more associated component pathways.

In various embodiments, annotating the one or more MPT HFD graphs comprises annotating the one or more MPT HFD graphs with one or more transpose rules.

In various embodiments, the method further comprises determining contiguous memory usage or discontiguous memory usage.

In various embodiments, the method further comprises automatically performing transposition without physically moving data elements if contiguous memory usage is determined.

In various embodiments, the method further comprises automatically performing transposition with physical data element movement if discontiguous memory usage is determined.

Considering the disclosure, aspects, and examples disclosed above and herein, in various embodiments, aggregate, function aggregate, and component pathways can be parallelized in one or more of the following ways:
 1) Order irrelevant.
 2) From control conditions.
 3) Pathway loop unrolling.
 4) Dynamic pathway loop unrolling.

In various embodiments, code blocks can be parallelized using one or more of the following techniques:
 1) Automatic independent code blocks without control conditions task-like determination.
 2) Automatic multiple looping independent code blocks loop unrolling-like determination.
 3) Automatic dependent code block loop unrolling.
 4) Automatic dependent code block dynamic loop unrolling.

In various embodiments, pathways can be automatically decomposed to determine one or more of the following:
1) Total processing time.
2) Variable processing time.
3) Static processing time.

In various embodiments, each pathway with loops that use inputs that affect the number of loop iterations can be analyzed in one or more of the following ways:
1) Automatic time complexity polynomial determination using dataset size.
2) Automatic speedup determination using standard time complexity.
3) Automatic speedup continuum location determination using standard time complexity.
4) Automatic maximum number of dataset groups determination.
5) Automatic processing time determination given input dataset size and number of cores.
6) Automatic loop iteration count performed per core given input dataset size and number of cores.
7) Automatic maximum time complexity prediction error determination.
8) Automatic time complexity performance-match comparison graph using dataset sizes to compare pathway performances.
9) Automatic advanced time complexity polynomial determination using a single input variable attribute value that affects loop iterations.
10) Automatic speedup determination using a single input variable attribute value that affects loop iterations.
11) Automatic speedup continuum position determination using a single input variable attribute value that affects loop iterations.
12) Automatic determination of the maximum number of groups into which a single input variable attribute value that affects loop iterations can be split.
13) Automatic processing time determination given a single input variable attribute value that affects loop iterations and number of cores.
14) Automatic loop iteration count performed per core given a single input variable attribute value and number of cores.
15) Automatic maximum advanced time complexity prediction error determination from a single input variable attribute value that affects loop iterations.
16) Automatic advanced time complexity performance-match comparison graph using single input variable attribute values that affect time to compare pathway performances.
17) Automatic advanced time complexity polynomial determination using multiple input variable attribute values that affect loop iterations.
18) Automatic speedup determination using multiple input variable attribute values that affect loop iterations.
19) Automatic speedup continuum position determination using multiple input variable attribute values that affect loop iterations.
20) Automatic determination of the maximum number of like groups into which each of multiple input variable attribute values that affect loop iterations can be split.
21) Automatic processing time determination given multiple input variable attribute values that affect loop iterations and number of cores.
22) Automatic loop iteration count performed per core given multiple input variable attribute values that affect loop iterations and number of cores.
23) Automatic maximum advanced time complexity prediction error determination from multiple input variable attribute values that affect time.
24) Automatic advanced time complexity performance-match comparison graph using multiple input variable attribute values that affect loop iterations to compare pathway performances.

In various embodiments, static processing for each pathway can be analyzed in one or more of the following ways:
1) Automatic extraction of static time loops and code blocks from a pathway.
2) Automatic separation of static time loops and code blocks as an initialization pathway.
3) Automatic independent measurement of static time.
4) Automatic independent measurement of initialization time.

In various embodiments, each pathway with loops that use inputs that affect the number of loop iterations can be analyzed, ignoring static processing time, in one or more of the following ways to find variable processing time:
1) Automatic separation of variable time loops and code blocks from static time loops and code blocks for a pathway.
2) Automatic time complexity polynomial determination using dataset size.
3) Automatic speedup determination using standard time complexity.
4) Automatic speedup continuum location determination using standard time complexity.
5) Automatic maximum number of dataset groups determination.
6) Automatic processing time determination given input dataset size and number of cores.
7) Automatic loop iteration count performed per core given input dataset size and number of cores.
8) Automatic maximum time complexity prediction error determination.
9) Automatic time complexity performance-match comparison graph using dataset sizes to compare pathway performances.
10) Automatic advanced time complexity polynomial determination using a single input variable attribute value that affects loop iterations.
11) Automatic speedup determination using a single input variable attribute value that affects loop iterations.
12) Automatic speedup continuum position determination using a single input variable attribute value that affects loop iterations.
13) Automatic determination of the maximum number of groups into which a single input variable attribute value that affects loop iterations can be split.
14) Automatic processing time determination given a single input variable attribute value that affects loop iterations and number of cores.
15) Automatic loop iteration count performed per core given a single input variable attribute value and number of cores.
16) Automatic maximum advanced time complexity prediction error determination from a single input variable attribute value that affects loop iterations.
17) Automatic advanced time complexity performance-match comparison graph using single input variable attribute values that affect time to compare pathway performances.
18) Automatic advanced time complexity polynomial determination using multiple input variable attribute values that affect loop iterations.

19) Automatic speedup determination using multiple input variable attribute values that affect loop iterations.
20) Automatic speedup continuum position determination using multiple input variable attribute values that affect loop iterations.
21) Automatic determination of the maximum number of like groups into which each of multiple input variable attribute values that affect loop iterations can be split.
22) Automatic processing time determination given multiple input variable attribute values that affect loop iterations and number of cores.
23) Automatic loop iteration count performed per core given multiple input variable attribute values that affect loop iterations and number of cores.
24) Automatic maximum advanced time complexity prediction error determination from multiple input variable attribute values that affect time.
25) Automatic advanced time complexity performance-match comparison graph using multiple input variable attribute values that affect loop iterations to compare pathway performances.

In various embodiments, memory determination can include one or more of the following:
1) Automatic cache size check trigger.
2) Automatic L1 cache size determination for optimum multicore performance.
3) Automatic L1 pre-fetch size determination for optimum multicore performance.
4) Automatic L2 cache size determination for optimum multicore performance.
5) Automatic L2 pre-fetch size determination for optimum multicore performance.
6) Automatic L3 size determination for optimum multicore performance.
7) Automatic discontiguous memory data grouping for increased performance.

In various embodiments, communication exchanges for cores can include one or more of the following:
1) Automatic single core transpose determination.
2) Automatic single core-assisted transpose optimization.
3) Automatic multicore transpose optimization.
4) Automatic single core left exchange determination.
5) Automatic single core-assisted left exchange optimization.
6) Automatic multicore left exchange optimization.
7) Automatic single core right exchange determination.
8) Automatic single core-assisted right exchange optimization.
9) Automatic multicore right exchange optimization.
10) Automatic single core up exchange determination.
11) Automatic single core-assisted up exchange optimization.
12) Automatic multicore up exchange optimization.
13) Automatic single core down exchange determination.
14) Automatic single core-assisted down exchange optimization.
15) Automatic multicore down exchange optimization.
16) Automatic single core next neighbor exchange determination (scatter).
17) Automatic single core-assisted next neighbor exchange optimization.
18) Automatic multicore next neighbor exchange optimization.
19) Automatic single core reverse next neighbor exchange determination (gather).
20) Automatic single core-assisted reverse next neighbor exchange optimization.
21) Automatic multicore reverse next neighbor exchange optimization.
22) Automatic single core next-n-neighbor exchange determination (scatter).
23) Automatic single core-assisted next-n-neighbor exchange optimization.
24) Automatic multicore next-n-neighbor exchange optimization.
25) Automatic single core reverse next-n-neighbor exchange determination (gather).
26) Automatic single core-assisted reverse next-n-neighbor exchange optimization.
27) Automatic multicore reverse next-n-neighbor exchange optimization.
28) Automatic single core all-to-all exchange determination (scatter-gather).
29) Automatic single core-assisted all-to-all exchange optimization.
30) Automatic multicore all-to-all exchange optimization.
31) Automatic input time determination.
32) Automatic output time determination.
33) Automatic I/O time determination.

In various embodiments, one or more of the following processes and aspects can be included and employed as well:
1) Automatic high level design graph annotation for communication exchanges.
2) Automatic parallelization determination.
3) Automatic parallel design determination.
4) Automatic detailed design annotation creation and display.
5) Automatic processing time-to-cost graph creation from time complexity and advanced time complexity.

While various embodiments have been described above, it should be understood that they have been presented by way of example only, and not limitation. Thus, the breadth and scope of the present disclosure should not be limited by any on the above-described embodiments or examples. Moreover, any combination of the above-described elements in all possible variations thereof is encompassed by the disclosure unless otherwise indicated herein or otherwise clearly contradicted by context.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While the present invention has been described in connection with various aspects and examples, it will be understood that the present invention is capable of further modifications. This application is intended to cover any variations, uses or adaptation of the invention following, in general, the principles of the invention, and including such departures from the present disclosure as come within the known and customary practice within the art to which the invention pertains.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A method of using inherent access to cache memory of one or more associated processing cores, comprising:
   detecting and categorizing one or more data movement types required by an algorithm;
   using core memory access to minimize algorithm data movement time; and
   annotating one or more Massively Parallel Technologies Hierarchical Functional Decomposition (MPT HFD) graphs associated with one or more algorithms to indicate use of the one or more data movement types.

2. The method of claim 1, further comprising converting one or more elements of the annotated one or more MPT HFD graphs to a detailed software design.

3. The method of claim 2, wherein the detailed software design comprises one or more associated source codes and one or more associated component pathways.

4. The method of claim 3, wherein the one or more associated component pathways comprise one or more order irrelevant pathways.

5. The method of claim 4, wherein two or more of the one or more irrelevant pathways are serially linked in time.

6. The method of claim 1, further comprising detecting left data exchange and displaying notation of the left data exchange on the one or more MPT HFD graphs.

7. The method of claim 1, further comprising detecting right data exchange and displaying notation of the right data exchange on the one or more MPT HFD graphs.

8. The method of claim 1, further comprising annotating parallel loop indication on the one or more MPT HFD graphs.

9. The method of claim 1, wherein the one or more data movement types comprise physical data movement.

10. The method of claim 1, wherein the one or more data movement types comprise transposition without physically moving data elements.

11. A method of managing cache memory allocation per algorithm for optimum algorithm performance, comprising:
    inputting one or more software codes;
    generating one or more input dataset size-based advanced time complexity function approximation polynomials;
    processing the one or more input dataset size-based advanced time complexity function approximation polynomials to determine one or more dataset sizes to processing time;
    processing the determined one or more dataset sizes to processing time to determine an optimum cache size and an optimally performing input dataset size for a processor core;
    modifying the one or more software codes to automatically use dynamic loop unrolling to manage input dataset size per processor core;
    detecting when dynamic loop unrolling can be used to change the input dataset size on multiple processor cores such that the optimally performing input dataset size per processor core can be maintained; and
    annotating one or more Massively Parallel Technologies Hierarchical Functional Decomposition (MPT HFD) graphs associated with one or more algorithms to indicate use of dynamic loop unrolling as part of a software design.

12. The method of claim 11, wherein the software design comprises one or more associated source codes and one or more associated component pathways.

13. The method of claim 11, wherein annotating the one or more MPT HFD graphs comprises annotating the one or more MPT HFD graphs with one or more transpose rules.

14. The method of claim 11, further comprising determining contiguous memory usage or discontiguous memory usage.

15. The method of claim 14, further comprising automatically performing transposition without physically moving data elements if contiguous memory usage is determined.

16. The method of claim 14, further comprising automatically performing transposition with physical data element movement if discontiguous memory usage is determined.

17. A software system of managing cache memory allocation per algorithm for optimum algorithm performance, comprising:
    a memory; and
    a processor operatively coupled to the memory, wherein the processor is configured to execute program code to:
       input one or more software codes;
       generate one or more input dataset size-based advanced time complexity function approximation polynomials;
       process the one or more input dataset size-based advanced time complexity function approximation polynomials to determine one or more dataset sizes to processing time;
       process the determined one or more dataset sizes to processing time to determine an optimum cache size and an optimally performing input dataset size for a processor core;
       modify the one or more software codes to automatically use dynamic loop unrolling to manage input dataset size per processor core;
       detect when dynamic loop unrolling can be used to change the input dataset size on multiple processor cores such that the optimally performing input dataset size per processor core can be maintained; and
       annotate one or more Massively Parallel Technologies Hierarchical Functional Decomposition (MPT HFD) graphs associated with one or more algorithms to indicate use of dynamic loop unrolling as part of a software design.

18. The system of claim 17, wherein the processor is further configured to execute the program code to determine contiguous memory usage or discontiguous memory usage.

19. The system of claim 18, wherein the processor is further configured to execute the program code to automatically perform transposition without physical data element movement if contiguous memory usage is determined.

20. The system of claim 18, wherein the processor is further configured to execute the program code to automatically perform transposition with physical data element movement if discontiguous memory usage is determined.

* * * * *